United States Patent
Nakano et al.

(10) Patent No.: US 8,375,334 B2
(45) Date of Patent: Feb. 12, 2013

(54) PORTABLE INFORMATION TERMINAL, DISPLAY CONTROL DEVICE, DISPLAY CONTROL METHOD, AND COMPUTER READABLE PROGRAM THEREFOR

(75) Inventors: Masao Nakano, Kanagawa (JP); Masao Nakazawa, Kanagawa (JP); Yoshio Sasaki, Kanagawa (JP); Eiji Takeuchi, Kanagawa (JP); Yosuke Miho, Kanagawa (JP); Hajime Ishikawa, Kanagawa (JP); Takeo Kobayashi, Kanagawa (JP); Tomoki Myoi, Kanagawa (JP); Hiroshi Kasakawa, Kanagawa (JP); Akiko Watanabe, Kanagawa (JP); Shinsuke Sato, Kanagawa (JP)

(73) Assignee: Kyocera Corporation, Takedatobadono-cho, Fushimi-ku, Kyoto-shi, Kyoto (JP)

( * ) Notice: Subject to any disclaimer, the term of this patent is extended or adjusted under 35 U.S.C. 154(b) by 1286 days.

(21) Appl. No.: 10/435,709

(22) Filed: May 9, 2003

(65) Prior Publication Data

US 2004/0100479 A1    May 27, 2004

(30) Foreign Application Priority Data

May 13, 2002  (JP) ................................. 2002-137465
May 13, 2002  (JP) ................................. 2002-137525
Jul. 30, 2002  (JP) ................................. 2002-221746
Jul. 30, 2002  (JP) ................................. 2002-221747

(51) Int. Cl.
    *G06F 3/048* (2006.01)
(52) U.S. Cl. ........ 715/848; 715/810; 715/829; 715/830; 715/831; 715/835; 715/836; 715/850; 715/852

(58) Field of Classification Search .................... 715/848
    See application file for complete search history.

(56) References Cited

U.S. PATENT DOCUMENTS 5,359,703 A * 10/1994 Robertson et al. ............. 345/419
5,546,529 A *  8/1996 Bowers et al. ................. 715/848

(Continued)

FOREIGN PATENT DOCUMENTS

| JP | 3-168693 | 7/1991 |
| JP | 06 324833 | 11/1994 |

(Continued)

OTHER PUBLICATIONS

Japanese Office Action dated Mar. 4, 2010, App. No. 2002-221747.

*Primary Examiner* — Alvin Tan
(74) *Attorney, Agent, or Firm* — John C. Garces; Schulte Roth & Zabel

(57) ABSTRACT

Predetermined travel locuss are set in a three-dimensional virtual space. Menu panels displaying menu items are arranged along the travel locuss assuming a display position set as a local origin so that the normal to each LCD panel will face a virtual camera. The transparency of a menu panel is raised in accordance with its distance to the virtual camera. A scroll operation moves menu panels along the travel locuss connecting display positions P until a selected specific menu panel reaches the display position P0. A display screen is drawn with the virtual camera and menu panels are three-dimensionally displayed in rolls.

By sliding a stylus pen on the LCD panel, the menu screen displayed on the LCD panel scrolls at a velocity corresponding to the drag velocity. When the stylus pen is released from the LCD panel, an application program corresponding to the menu display entity (crosshatched) is activated.

35 Claims, 51 Drawing Sheets

U.S. PATENT DOCUMENTS

| | | | |
|---|---|---|---|
| 5,621,874 A * | 4/1997 | Lucas et al. | 715/500 |
| 5,621,906 A * | 4/1997 | O'Neill et al. | 715/848 |
| 5,898,433 A | 4/1999 | Hijikata | |
| 5,977,975 A * | 11/1999 | Mugura et al. | 715/822 |
| 6,028,600 A * | 2/2000 | Rosin et al. | 715/718 |
| 6,070,176 A * | 5/2000 | Downs et al. | 715/234 |
| 6,091,031 A | 7/2000 | Lee et al. | |
| 6,211,856 B1 | 4/2001 | Choi et al. | |
| 6,266,098 B1 * | 7/2001 | Cove et al. | 348/563 |
| 6,466,237 B1 * | 10/2002 | Miyao et al. | 715/838 |
| 6,473,751 B1 * | 10/2002 | Nikolovska et al. | 707/3 |
| 6,577,330 B1 | 6/2003 | Tsuda et al. | |
| 6,710,771 B1 * | 3/2004 | Yamaguchi et al. | 345/184 |
| 6,819,344 B2 * | 11/2004 | Robbins | 715/848 |
| 6,880,132 B2 * | 4/2005 | Uemura | 715/848 |
| 6,978,472 B1 * | 12/2005 | Nashida et al. | 725/52 |
| 6,989,819 B2 * | 1/2006 | Hinckley et al. | 345/163 |
| 7,152,210 B1 * | 12/2006 | Van Den Hoven et al. | 715/723 |
| 7,296,242 B2 * | 11/2007 | Agata et al. | 715/793 |
| 7,600,192 B1 * | 10/2009 | Hashimoto et al. | 715/802 |
| 2001/0030648 A1 * | 10/2001 | Deering | 345/426 |

FOREIGN PATENT DOCUMENTS

| | | |
|---|---|---|
| JP | 07-021007 A | 1/1995 |
| JP | 8263255 | 10/1996 |
| JP | 9-22340 | 1/1997 |
| JP | 9-258949 | 10/1997 |
| JP | 10-312391 | 11/1998 |
| JP | 11-39132 | 2/1999 |
| JP | 11-65806 | 3/1999 |
| JP | 11065806 | 3/1999 |
| JP | 11095968 | 4/1999 |
| JP | 2000010702 | 1/2000 |
| JP | 2000 231371 | 8/2000 |
| JP | 2001 069223 | 3/2001 |
| JP | 2001-222354 A | 8/2001 |
| JP | 2001-222614 A | 8/2001 |
| JP | 2001-282415 | 10/2001 |
| JP | 2001291119 | 10/2001 |
| JP | 2001-306375 | 11/2001 |
| JP | 2002-082887 A | 3/2002 |
| JP | 2002-207562 A | 7/2002 |
| KR | 2001-0018568 | 5/2001 |
| WO | WO 98/47063 | 10/1998 |
| WO | WO 0033571 | 8/2000 |

* cited by examiner

| DISPLAY POSITION INFORMATION | 522 | 522-1 |
|---|---|---|
| DISPLAY MODE | ① ROUND TYPE | 522-2 |
| TRAVEL PATH FUNCTION | f1, f2, f3 | 522-3 |
| DISPLAY POSITION | UPWARD/DOWNWARD DIRECTION ANGLE | TRAVEL PATH FUNCTION APPLIED |
| P0 | θ0 | f1 |
| P1 | θ1 | f1 |
| P2 | θ2 | f1 |
| : | : | : |

522a — DISPLAY MODE
522b — TRAVEL PATH FUNCTION
522c — (header row)
522d — (UPWARD/DOWNWARD DIRECTION ANGLE column)

| MENU ITEM NUMBER | COORDINATES OF LOCAL ORIGIN POSITION | COORDINATE VALUES OFF TO THE UPPER LEFT | COORDINATE VALUES OFF TO THE LOWER RIGHT |
|---|---|---|---|
| 1 | P4 | $(X_{11}, Y_{11}, Z_{11})$ | $(X_{21}, Y_{21}, Z_{21})$ |
| 2 | P3 | $(X_{12}, Y_{12}, Z_{12})$ | $(X_{22}, Y_{22}, Z_{22})$ |
| 3 | P2 | $(X_{13}, Y_{13}, Z_{13})$ | $(X_{23}, Y_{23}, Z_{23})$ |
| ⋮ | ⋮ | ⋮ | ⋮ |

523a, 523b, 523c, 523

| MENU ITEM NUMBER | ICON | MENU NAME | ATTRIBUTE |
|---|---|---|---|
| 1 | ▭ | ...... | ...... |
| 2 | ▭ | ...... | ...... |
| 3 | ▭ | ...... | ...... |
| ⋮ | ▭ | ...... | ...... |

524a, 524b, 524c, 524d, 524

| | CAMERA PATH FUNCTION | | fc | | |
|---|---|---|---|---|---|
| | | MENU ITEM NUMBER | POSITION COORDINATES | ROTATION | VIEWING ANGLE |
| INITIAL SETTING | | 1 | Xc1, Yc1 | $\theta x1, \theta y1$ | $\delta c1$ |
| | | max | Xc3, Yc3 | $\theta x3, \theta y3$ | $\delta c3$ |

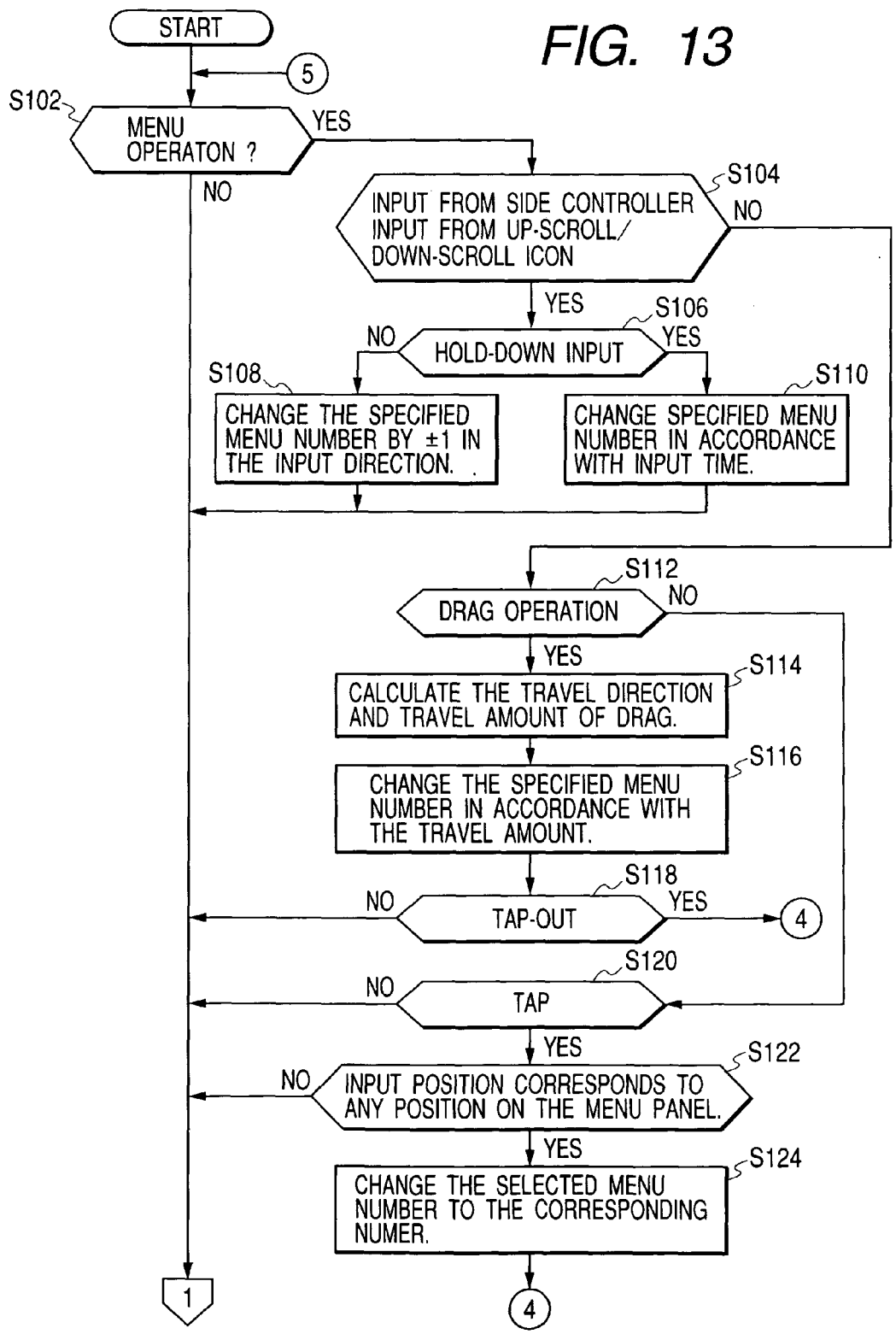

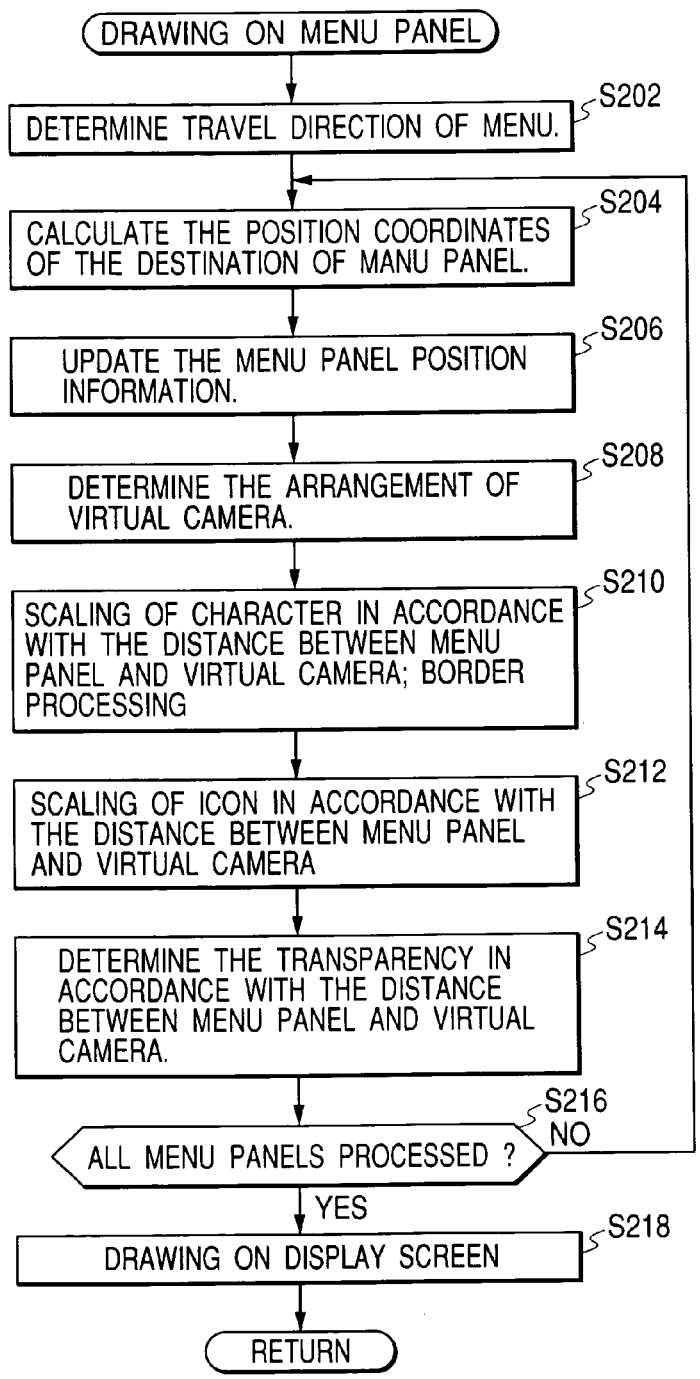

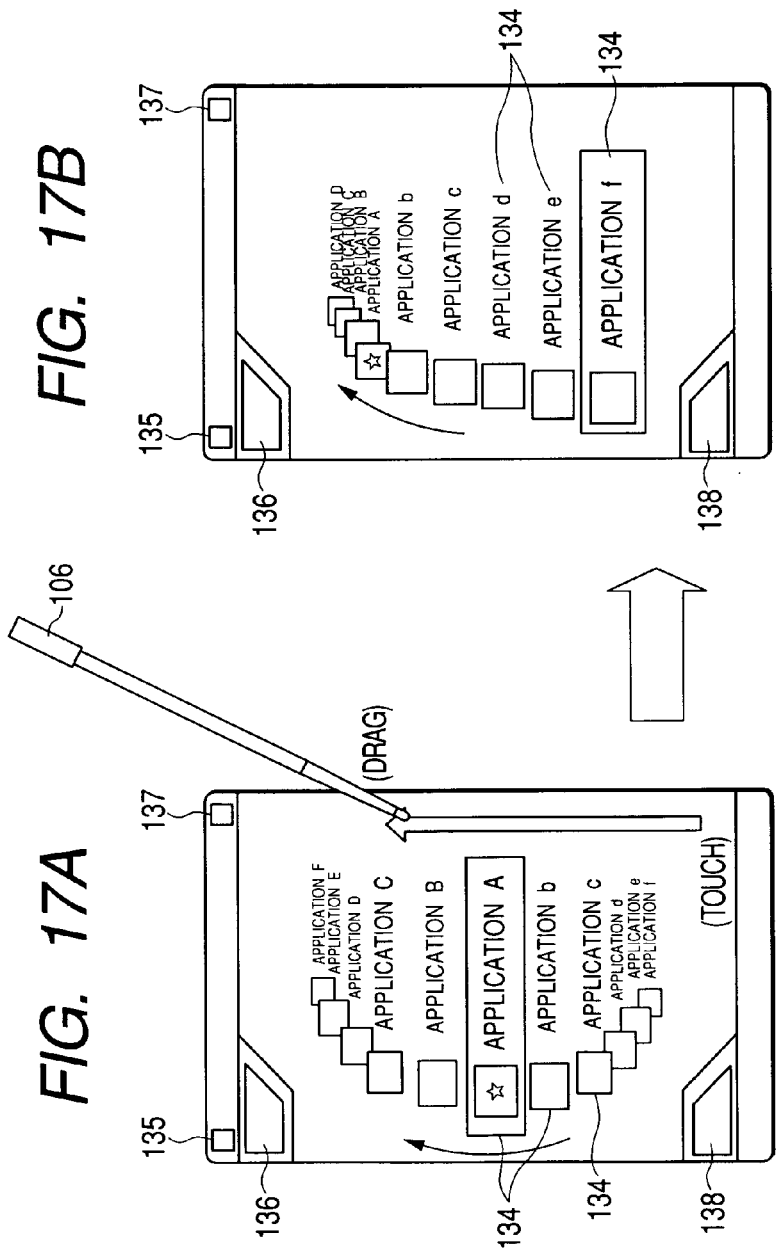

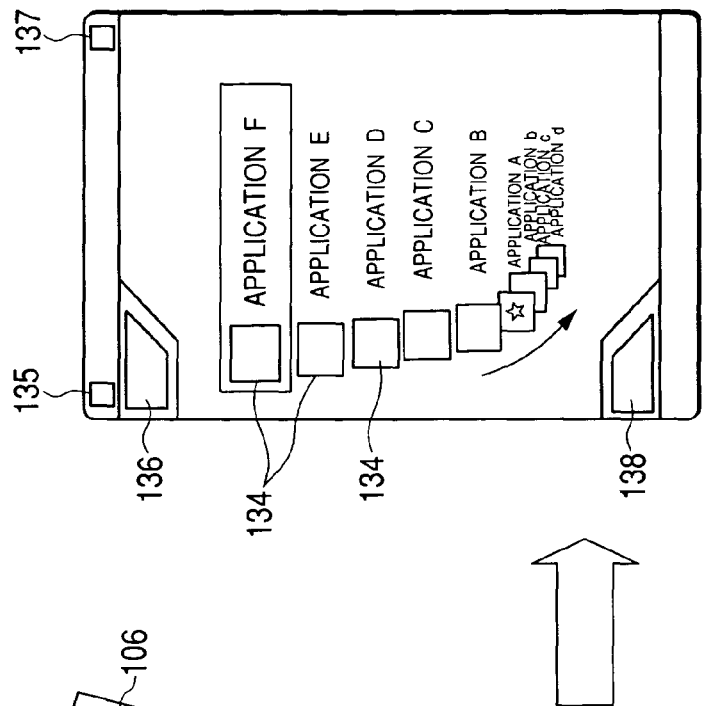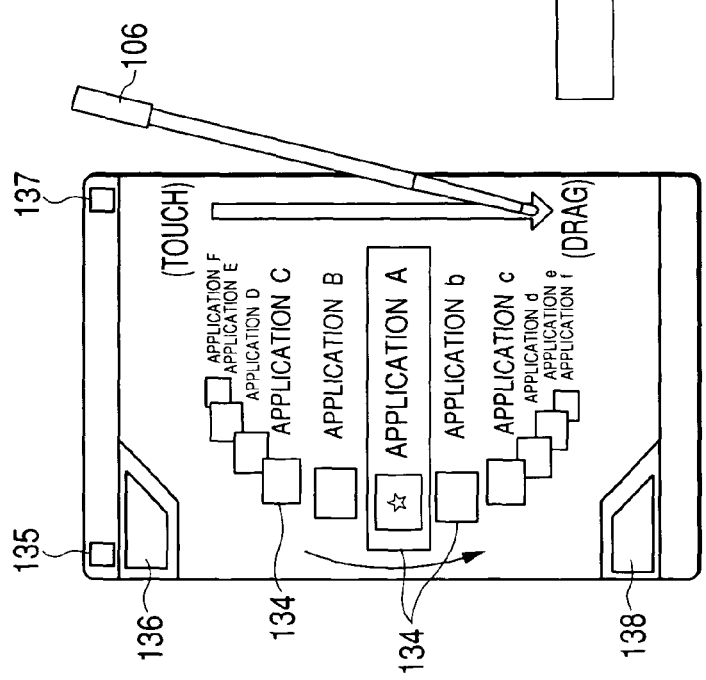

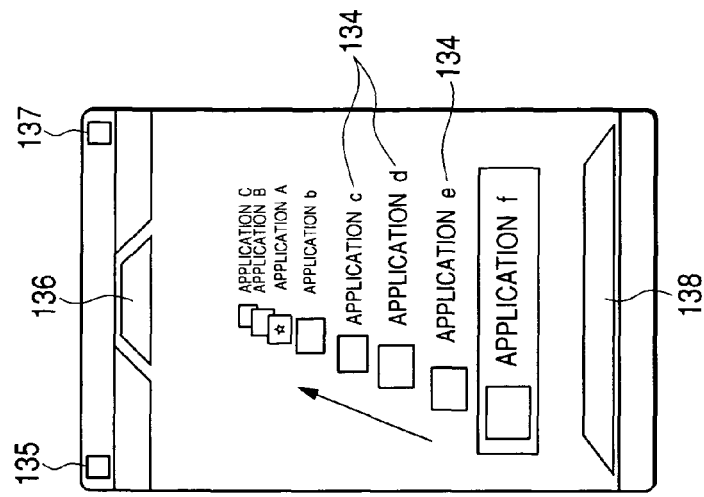
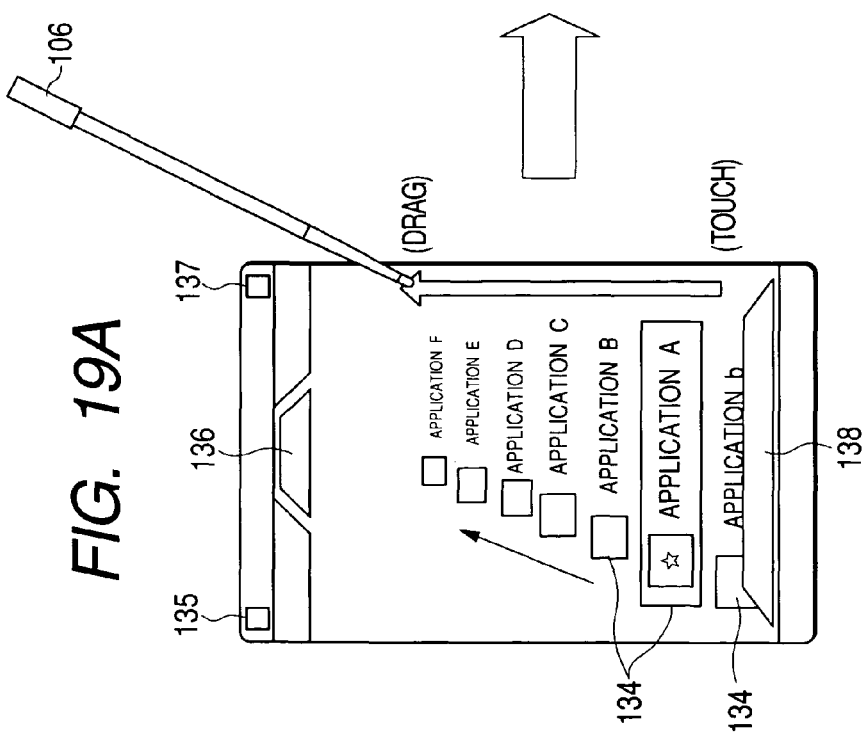

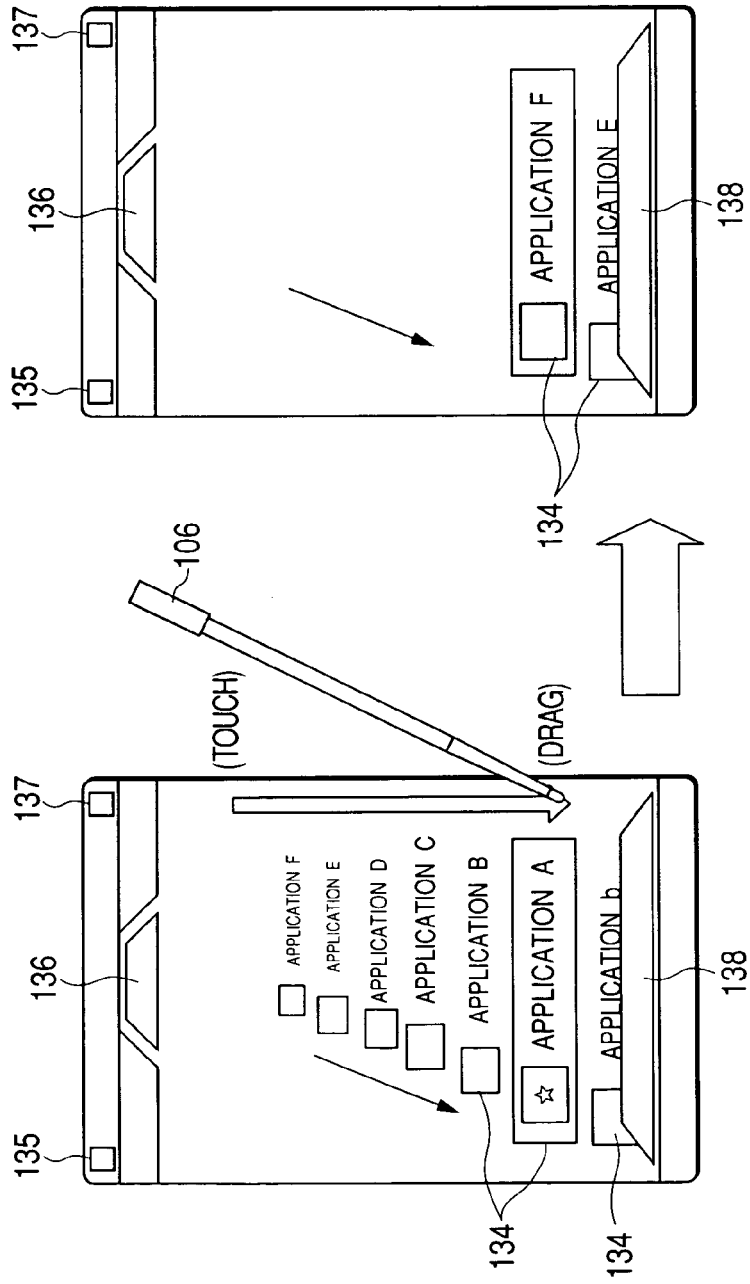

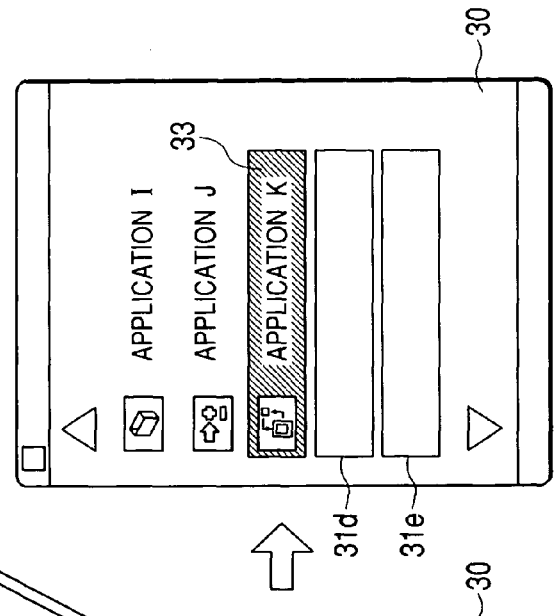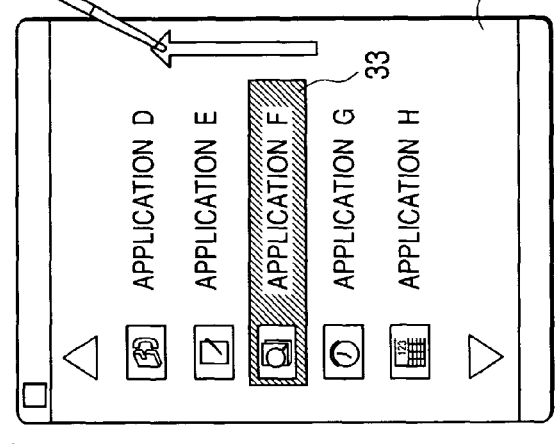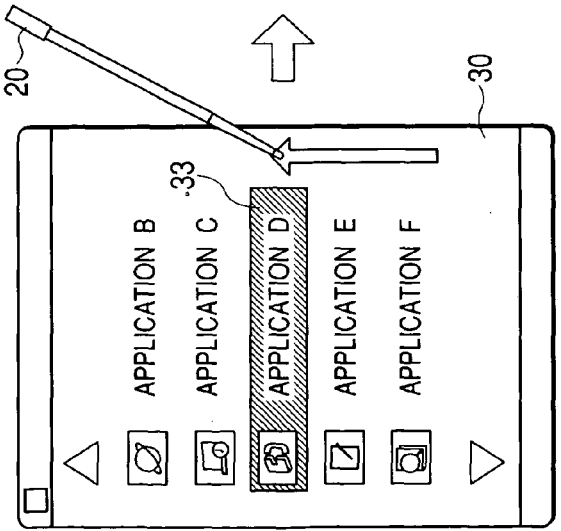

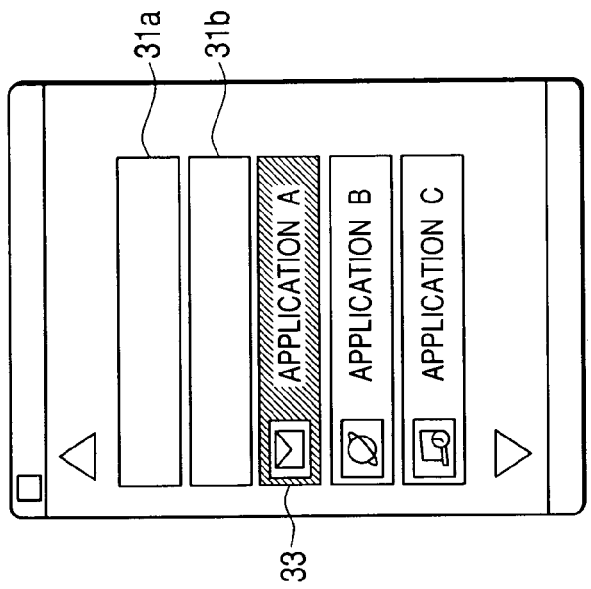
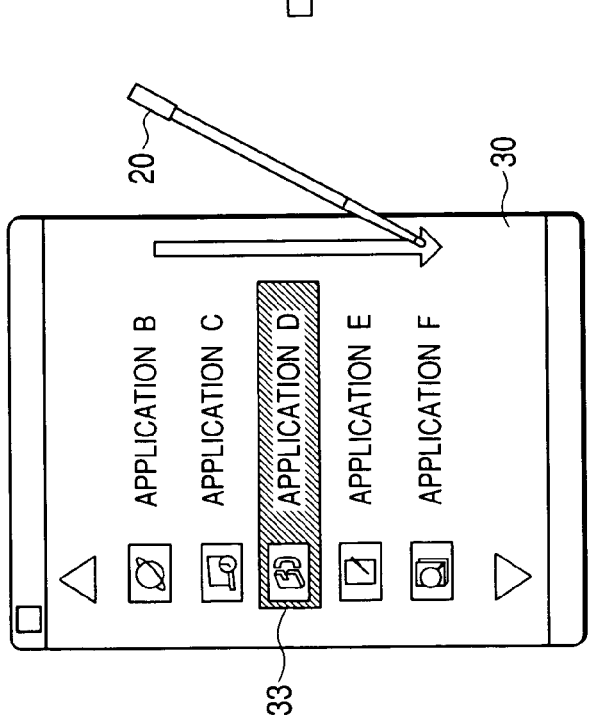

FIG. 32

|  | DRAG DIRECTION | TRAVEL DISTANCE $\Delta Y$ |
|---|---|---|
| $Y_n > Y_{n-1}$ | DOWNWARD | $Y_n - Y_{n-1}$ |
| $Y_n = Y_{n-1}$ | N/A | 0 |
| $Y_n < Y_{n-1}$ | UPWARD | $Y_{n-1} - Y_n$ |

FIG. 33

| DRAG DIRECTION | TRAVEL DIRECTION OF DESTINATION POINTER |
|---|---|
| DOWNWARD | UPWARD |
| UPWARD | DOWNWARD |
| N/A | N/A |

| SIDE CONTROLLER INPUT DIRECTION | TRAVEL DIRECTION OF DESTINATION POINTER |
|---|---|
| DOWNWARD | DOWNWARD |
| UPWARD | UPWARD |
| N/A | N/A |

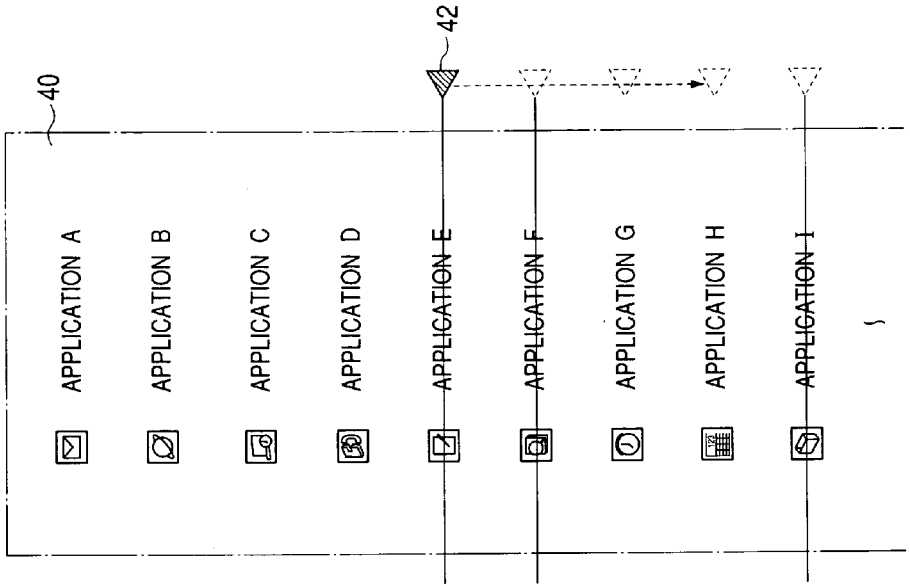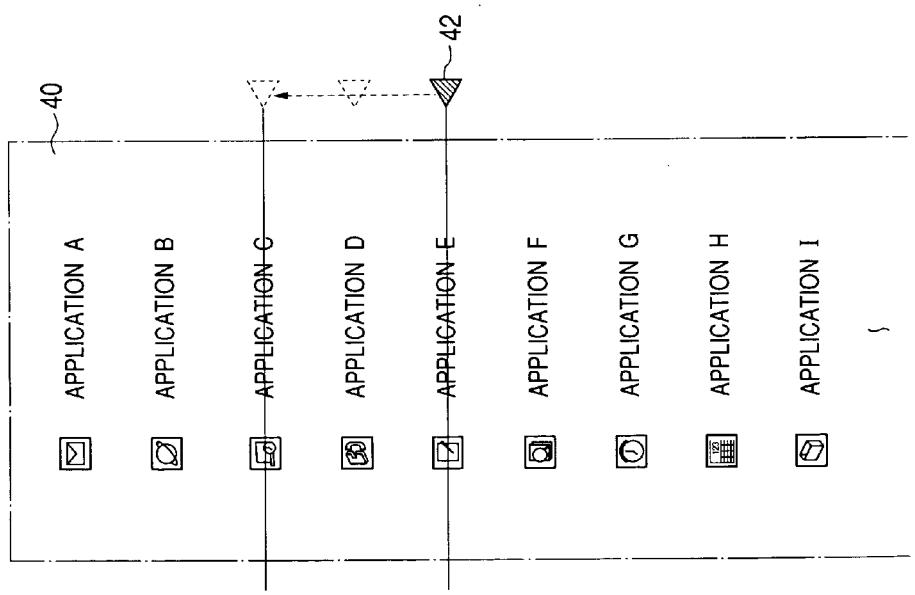

FIG. 42

MENU DISPLAY ENTITY DATA

| MENU NUMBER | ICON | MENU NAME |
|---|---|---|
| 1 | | |
| 2 | | |
| ⋮ | ⋮ | ⋮ |

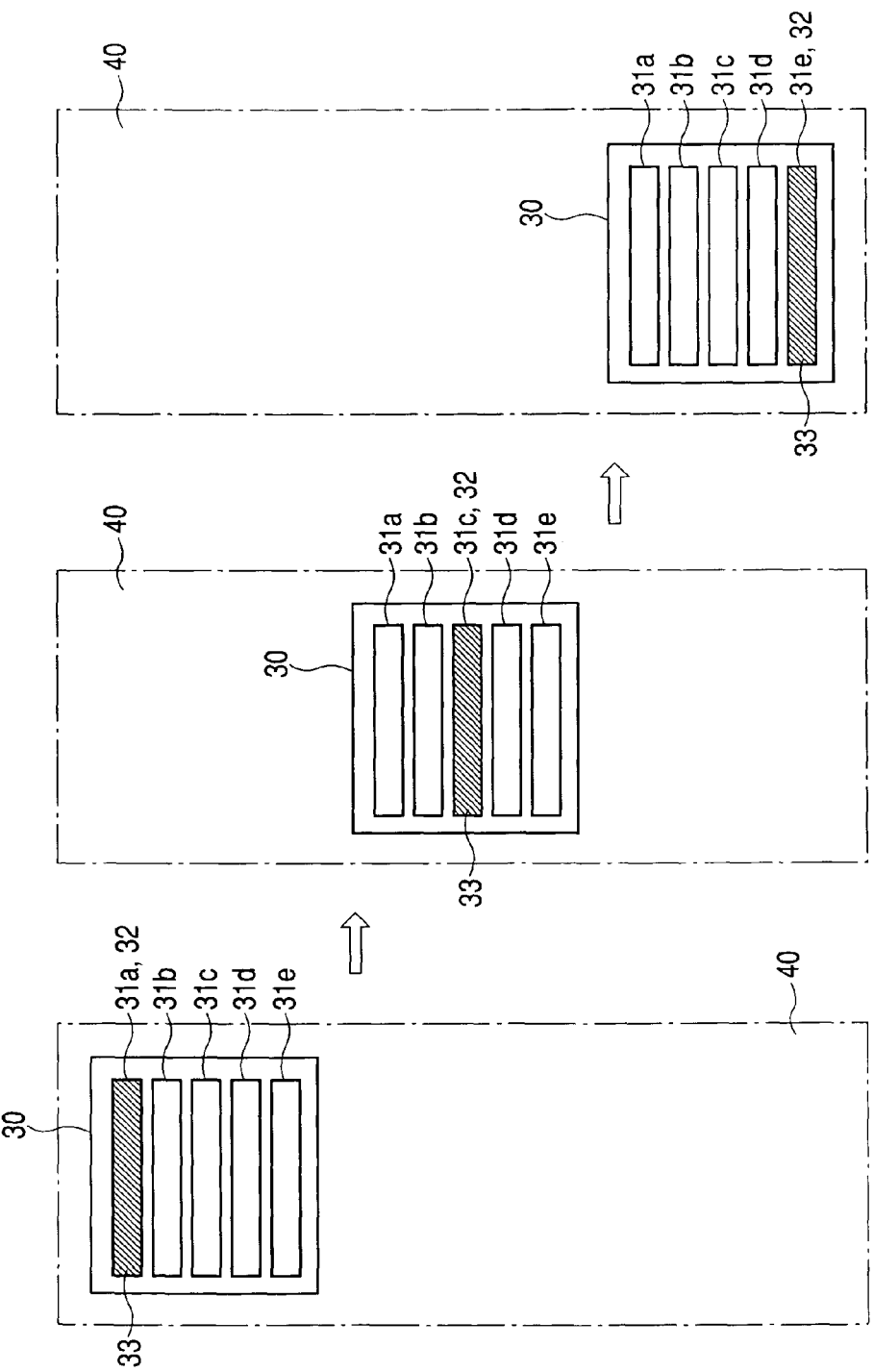

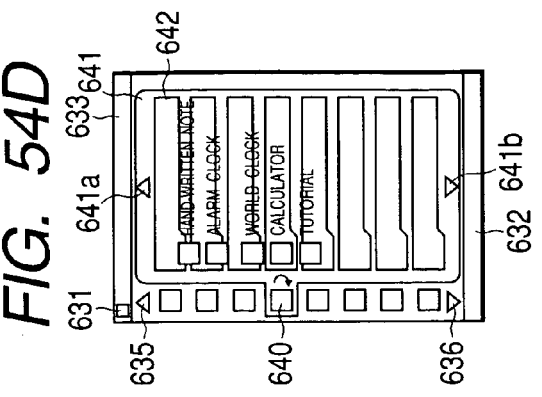
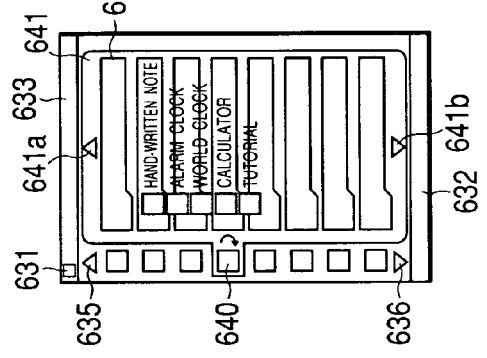
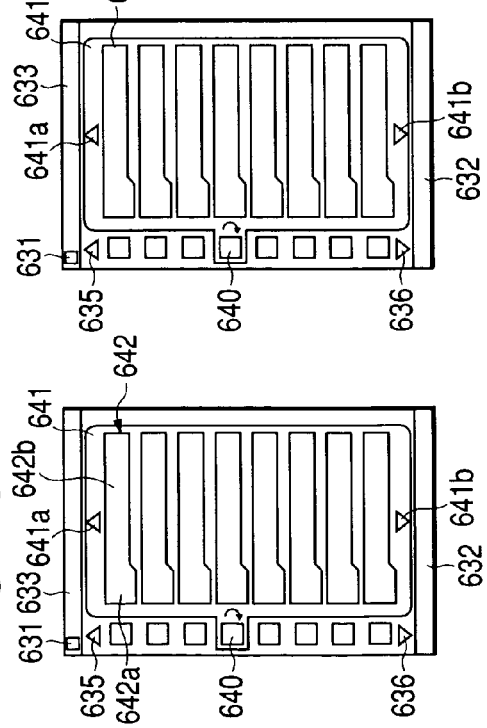
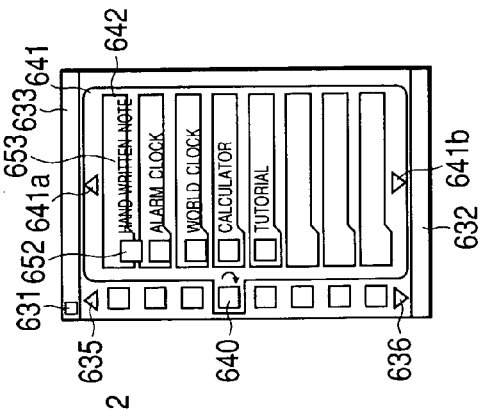
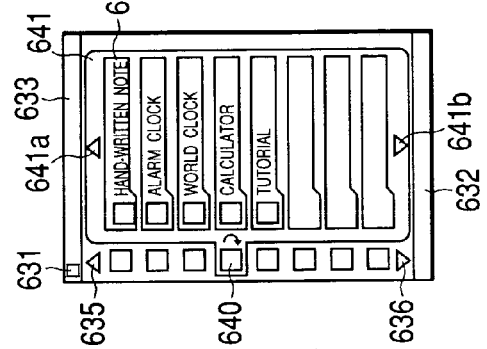
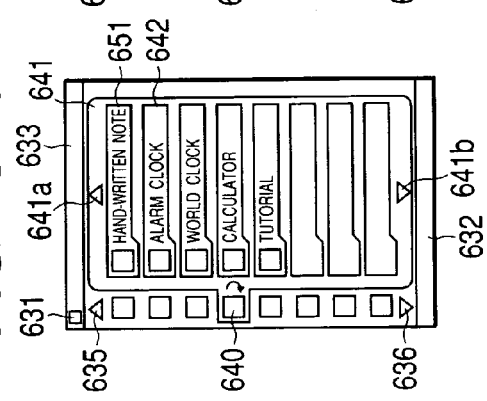

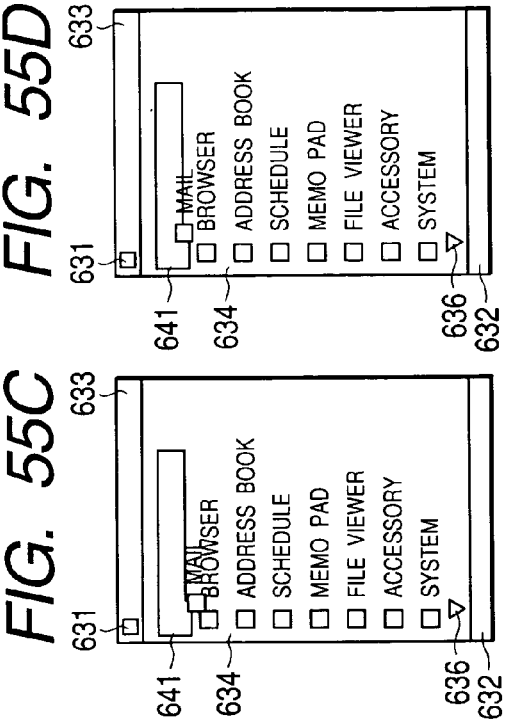
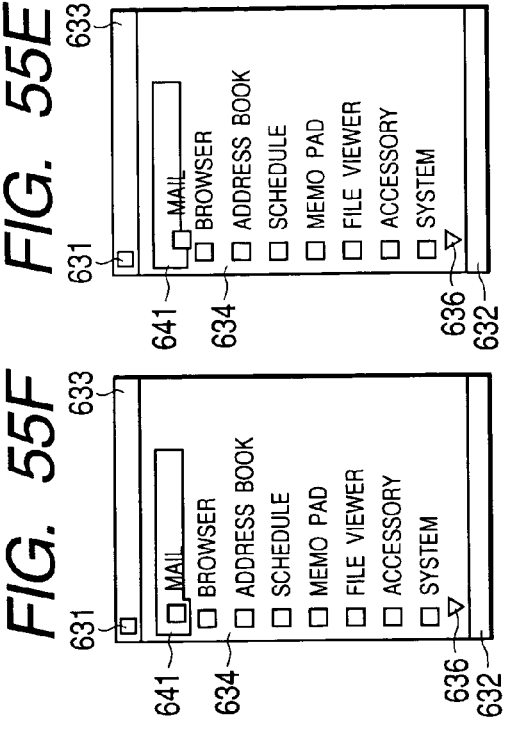
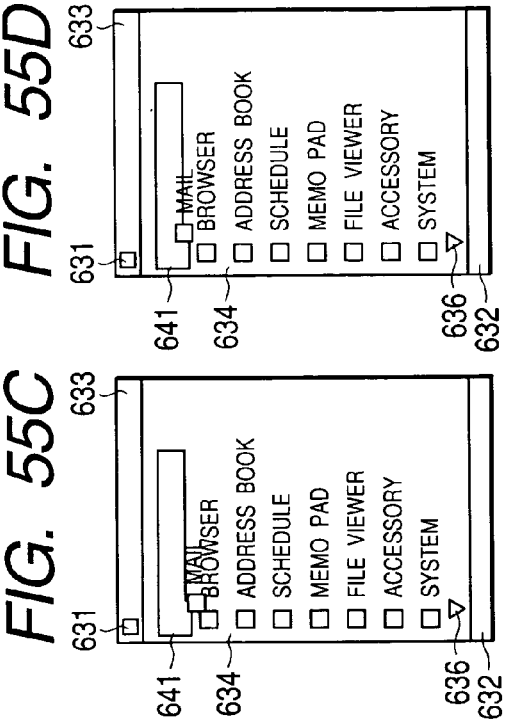
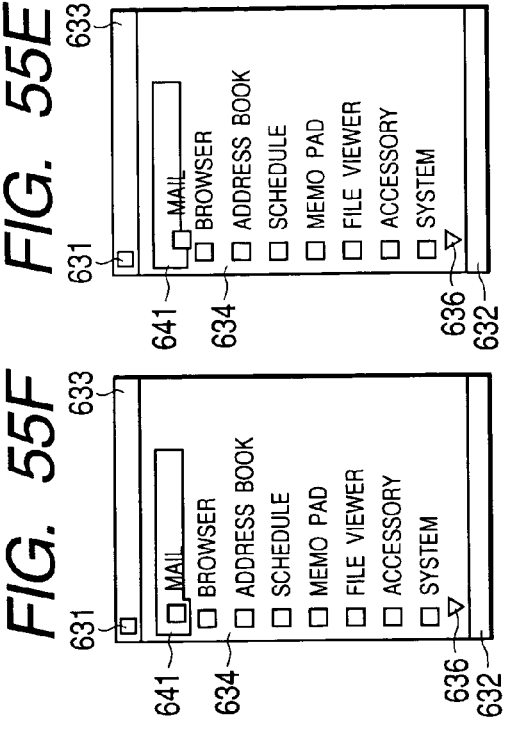
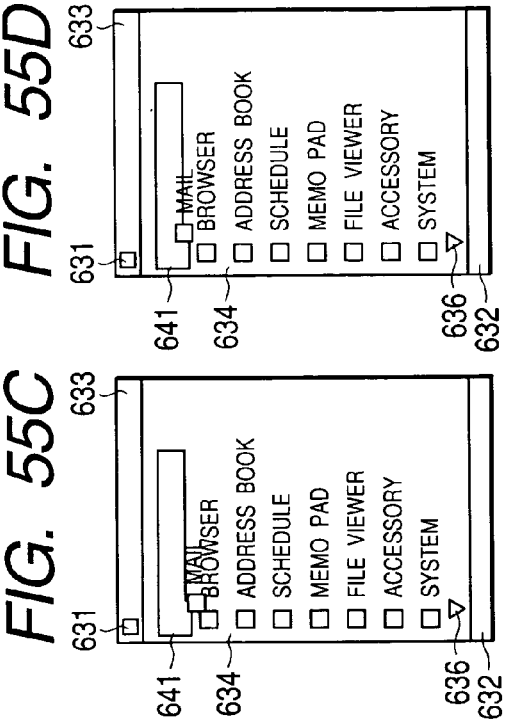
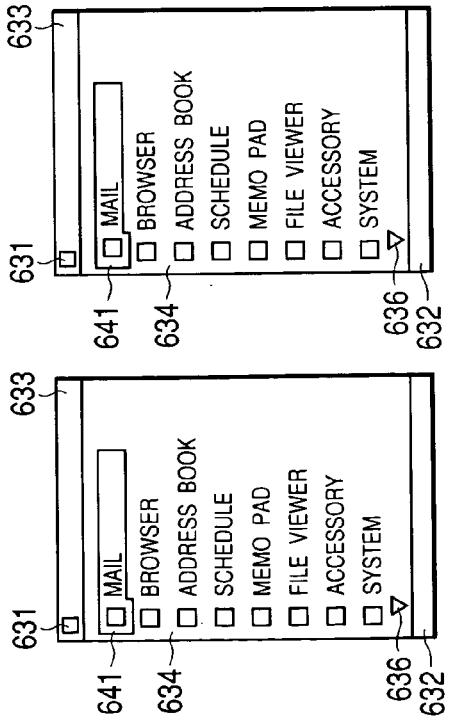
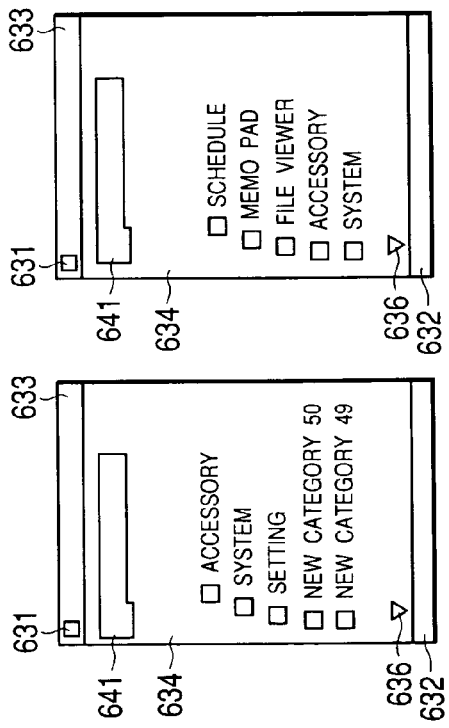

PORTABLE INFORMATION TERMINAL, DISPLAY CONTROL DEVICE, DISPLAY CONTROL METHOD, AND COMPUTER READABLE PROGRAM THEREFOR

BACKGROUND OF THE INVENTION

The present invention relates to a display control device for performing display control of menu display, portable information terminal, and display control information and a display control method for allowing a computer to perform display control of menu display.

BACKGROUND ART

As an example of portable information terminal which allows the user to carry along various personal information as digital information, a so-called Personal Digital Assistant (PDA) equipped with a touch panel is known.

The PDA can execute a plurality of application software programs (also referred to as simply "applications") by way of arithmetic operation by a built-in CPU. Application software includes schedule software, address book software, memo pad software, word processing software, calculator software, electronic mail software, web browser software, music playback software, graphics viewer software, and clock display software.

Operation of selection and execution of application software is controlled by the application management program called "launcher". With application software programs and/or documents registered in advance, the application software programs and/or documents are displayed on a menu by the launcher, and directly started via simple input operation.

In the related art menu display by the launcher, icons representing application software programs and/or documents and their names are displayed in sets (the sets are hereinafter referred to as "menu items"), arranged like tiles on a plane. The user selects any menu item by way of operation of a button such as a lever and across-hair key, or selection using a pointing device such as a stylus pen or a tracking pad.

The size of a physical display screen of the PDA is limited, for example, within the palm of a hand of an adult in order to focus on the portability. Thus, a menu display entity which extends off screen must be displayed by scrolling through the screen. The scroll operation is made though operation of a button such as a lever or tapping operation on a specific position using a stylus pen. To be more specific, in case the user holds a PDA in his/her left hand, the user uses a finger of his/her left hand, for example the thumb, to operate the PDA. Or, the user performs tapping operation on a specific position (scroll target position) with a stylus pen in his/her right hand.

However, in a scroll operation and selection of a menu display entity, at least two operations are required. The scroll operation on a touch panel is the same as the mouse operation, for example tapping operation, on an ordinary PC.

As a method for solving such problems, a method for displaying more menu items on the screen via three-dimensional menu display is disclosed, for example in the Japanese Patent Laid-Open No. 391232/1999, Japanese Patent Laid-Open No. 65806/1999, Japanese Patent Laid-Open No. 95968/1999, and Japanese Patent Laid-Open No. 2001-291119.

Even according to the method disclosed in each of the publications, a menu arranged in a virtual space does not always faces a virtual camera and the visibility of the resulting menu is poor. It is difficult to find which part of the registered menu items is currently displayed by glancing at the screen. The user must look for the target menu item by way of icons. Such operation is very inconvenient.

For example, display control of a menu screen is described in the Publication No. WO00/33571 (hereinafter referred to as the related art example) is known. In this method, an icon is selected from a menu screen where icons are arranged. Display is switched via a transition screen in switchover to the information screen for the selected icon. In the transition screen, the selected icon is gradually scaled up. The scaled-up icon gradually turns fainter to perform switchover to the information screen.

In the related art example, when the information screen is switched to the menu screen, the scale-up icon display is gradually scaled down to select the menu screen from the scale-up icon display.

In the Japanese Patent Laid-Open No. 2000-10702, there is described a method where a screen is split to form a plurality of split screen and function menus are assigned to these split screens, and a split screen displaying a desired menu is enlarged in the center of the screen for the user's menu selection in response to a screen key operation.

The Japanese Patent Laid-Open No. 263255/1996 discloses a method for changing the display size of an icon depending on the depth of the layer level. In this method, a predetermined operation specifying a display area of a desired layer provides a doomed-in image of the desired layer.

On the Personal Digital Assistant (PDA), menu items which extend off screen must be displayed by scrolling through the screen. In this practice, it is difficult to find which part of the large number of menu items is currently displayed by glancing at the screen. The user must look for the target menu item by way of icons.

While the display screen is scaled up or down through zoom-in or zoom-out operation in the related art examples, it is difficult to find which part of the large number of menu items is currently displayed by glancing at the screen. For a device with a small display size such as a PDA, simply arranging menu items on a plane provides poor visibility. Also, it is difficult to properly arrange a large number of menu items to enhance the operability.

SUMMARY OF THE INVENTION

The invention has been accomplished in order to solve the aforementioned problems and aims at providing easy-to-use menu display which allows easy understanding of arrangement of menu items used for a portable information terminal.

The invention also aims at enhancing the operability of menu display used for a portable information terminal equipped with a touch panel.

In order to solve the problems, the invention provides a display control device for performing display control, the display control device comprising: virtual space setting means for setting a virtual space (for example a menu display controller 24 in FIG. 5); virtual face setting means (for example the menu display controller 24 in FIG. 5) for setting a virtual face (for example a travel locus Lf4 in FIG. 4, a virtual entity 160a in FIG. 21) in a predetermined plane in the virtual space; display entity arrangement means (for example a display position setting section 240, a menu arrangement section 241 in FIG. 5) for arranging a plurality of plane-shaped information display entities parallel with each other (for example a menu panel 134 in FIG. 2) at least in a column so that the planes will differ from the predetermined plane; camera setting means (for example a camera setting section 245 in FIG. 5) for setting a virtual camera whose line of sight is oriented to face the virtual face; input means (for example a touch panel 104, a stylus pen 106, a side controller 108 in FIG. 1, a scroll-up icon 136, a scroll-down icon 138 in FIG. 2, an operation input section 10, a menu item selector 22 in FIG. 5) for inputting a scroll direction; movement means (for example a menu movement controller 24 in FIG. 5) for moving one or both of the virtual face and the virtual camera by way of the input means; and control means (for example a menu arrangement section 241 in FIG. 5) for controlling the arrangement of the plurality of information entities on the virtual face so that a plane orthogonal to the line of sight of the virtual camera will be parallel with the planes of the plurality of information display entities in accordance with the movement by the movement means; characterized in that the display control device performs information display by displaying, in whole or in part, the information display entities seen from the virtual camera among the plurality of information display entities.

The invention provides a display control method for the display control device, the display control method comprising: a virtual space setting step of setting a virtual space; a virtual face setting step for setting a virtual face in a predetermined plane in the virtual space; a display entity arrangement step of arranging a plurality of plane-shaped information display entities parallel with each other at least in a column so that the planes will differ from the predetermined plane; a camera setting step for setting a virtual camera whose line of sight is oriented to face the virtual face; an input step of inputting a scroll direction; a movement step of moving one or both of the virtual face and the virtual camera by way of an input in the input step; and a control step of controlling the arrangement of the plurality of information entities on the virtual face so that a plane orthogonal to the line of sight of the virtual camera will be parallel with the plane of the plurality of information display entities in accordance with the movement in the movement step; characterized in that the display control method causes the display control device to perform information display by displaying, in whole or in part, the information display entities seen from the virtual camera among the plurality of information display entities.

The information display entity is a model arranged in a third-dimensional virtual space and defined with vertex coordinates and curves. The display control information is information equivalent to a program used for processing by an electronic calculator (computer) such as a portable information terminal.

According to the invention, the information display entity is arranged three-dimensionally in a virtual space and its plane always faces a virtual camera. Thus it is possible to efficiently display more information display entities. It is also possible to provide easy-to-see display of the information displayed in the information display entities. Thus it is easy to identify an information display entity even on a relatively small display screen thereby enhancing the operability.

The invention provides a display control device for performing display control, the display control device comprising: virtual space setting means for setting a virtual space (for example a menu display controller 24 in FIG. 5) in which are arranged a rotation axis (for example the X axis in FIG. 3), a virtual face comprising a locus of an arbitrary curve (for example travel locuss Lf1 through LF3 in FIG. 3) orthogonal to the rotation axis obtained when the curve moves in parallel with the rotation axis, and a plurality of plane-shaped information display entities parallel with each other; display entity arrangement means (for example a display position setting section 240, a menu arrangement section 241 in FIG. 5) for arranging the plurality of plane-shaped information display entities at least in a column so that an arbitrary line on the virtual face parallel with the rotation axis will be shared; camera setting means for setting a virtual camera whose line of sight is oriented to face the virtual face; input means for inputting a scroll direction; and movement means (for example a menu display controller 24 in FIG. 5) for rotating one or both of the virtual face and the virtual camera about the rotation axis; characterized in that the display control device performs information display by displaying, in whole or in part, the information display entities seen from the virtual camera among the plurality of information display entities.

The invention provides a display control device for performing display control, the display control device comprising: virtual space setting means for setting a virtual space; virtual entity setting means for setting a body-of-rotation-shaped virtual entity (for example a virtual entity 160b in FIG. 22) in the virtual space; display entity arrangement means for arranging a plurality of plane-shaped information display entities parallel with each other at least in a column on a virtual face as one face of the virtual entity; camera setting means for setting a virtual camera whose line of sight is oriented to face the virtual face; input means for inputting a scroll direction; and movement means for rotating one or both of the virtual face and the virtual camera about the rotation axis of the virtual entity; characterized in that the display control device performs information display by displaying, in whole or in part, the information display entities seen from the virtual camera among the plurality of information display entities.

The invention provides a display control method for the display control device, the display control method comprising: a virtual space setting step of setting a virtual space in which are arranged a rotation axis, a virtual face comprising a locus of an arbitrary curve orthogonal to the rotation axis obtained when the curve moves in parallel with the rotation axis, and a plurality of plane-shaped information display entities parallel with each other; a display entity arrangement step of arranging the plurality of plane-shaped information display entities at least in a column so that an arbitrary line on the virtual face parallel with the rotation axis will be shared; a camera setting step of setting a virtual camera whose line of sight is oriented to face the virtual face; an input step of inputting a scroll direction; and a movement step of rotating one or both of the virtual face and the virtual camera about the rotation axis of the virtual entity; characterized in that the display control method causes the display control device to perform information display by displaying, in whole or in part, the information display entities seen from the virtual camera among the plurality of information display entities.

The invention provides a display control method for the display control device, the display control device comprising: a virtual space setting step of setting a virtual space; a virtual entity setting step of setting a body-of-rotation-shaped virtual entity in the virtual space; a display entity arrangement step for arranging a plurality of plane-shaped information display entities parallel with each other at least in a column on a virtual face as one face of the virtual entity; a camera setting step of setting a virtual camera whose line of sight is oriented to face the virtual face; an input step of inputting a scroll direction; and a movement step of rotating one or both of the virtual face and the virtual camera about the rotation axis of the virtual entity; characterized in that the display control method causes the display control device to perform information display by displaying, in whole or in part, the information display entities seen from the virtual camera among the plurality of information display entities.

The arbitrary curve will be a closed curve or a segment. Thus, on a virtual face is formed an extruded face in the direction of a rotation axis having an arbitrary curve as a cross section. For example, a lateral face of a cylinder is formed.

According to the invention, an information display entity is three-dimensionally arranged in a virtual space and changes its topology as the display is scrolled through. Thus, from the difference between topologies, it is possible to readily recognize which part of a plurality of information display entities is currently displayed.

The display control device is characterized by further comprising control means (for example a menu display controller 24 in FIG. 5) for controlling the arrangement of the plurality of information display entities on the virtual face so that the so that a plane orthogonal to the line of sight of the virtual camera will be parallel with the plane of the plurality of information display entities in accordance with the movement by the movement means. It is thus possible to always arrange the face of an information display entity to face a virtual camera, thus making the display of an information display entity more visible.

The display control device is characterized by further comprising camera movement means (for example a camera setting section 245 in FIG. 5) for moving the virtual camera in the travel direction or in a direction opposite to the direction. By moving the virtual camera in the direction opposite to the travel direction of the information display entity, high-velocity scrolling is provided.

By moving the virtual camera in the same direction as the travel direction of the information display entity, it is possible to change as appropriate the position of the information display entity closest to the virtual camera on the display screen. For example, in case the head of the line of an information display entity is in a position closest to the virtual camera, moving the virtual camera so as to display the information display entity on the upper area of the screen efficiently uses the screen and allows as many information display entities as possible subsequent to the information display entity to be displayed.

When moving the both (a virtual face or a virtual entity, and a virtual camera), the movement means may move both at travel velocities different from each other. As a result, it is possible to prevent a camera sickness (a sense similar to dizziness or sickness caused by watching fluctuations on the display screen or succession of sudden movement) caused by the relative difference in the travel velocity between the virtual face or virtual entity and the virtual camera.

The display control device may further comprise line-of-sight direction change means (for example a camera setting section 245 in FIG. 5) for gradually changing the direction of the line of sight of the virtual camera in accordance with the travel amount of the virtual camera by the camera movement means. By appropriately changing the direction of line of sight, it is possible to efficiently use the display screen at any time thus allowing more information display entities to be displayed.

The display control device is characterized by further comprising display change means (for example a menu display controller 24 in FIG. 5) for displaying at least one information display entity displayed in a predetermined position in the display of the display controller as an information display entity being a candidate for selection differently from other information display entities. This allows an information display entity as a candidate for selection to be prominent with improved visibility even in case a plurality of information display entities are displayed on the display screen.

The display control device is characterized by changing the display position of an information display entity as the candidate for selection in accordance with the movement by the movement means. As a result, for example, as an information display entity being a candidate for selection approaches the head of a line, the information display entity is displayed on the upper area of the screen. Conversely, as the information display entity being a candidate for selection approaches the tail of the line, the information display entity is displayed on the lower area of the screen.

Thus, the user can visually recognize which information display entity in which part is a candidate for selection among a plurality of information display entities from the position of the information display entity as a candidate for selection on the screen.

The display control device is characterized by further comprising transparency setting means (for example a transparency setting section 244) for setting the transparency of each information display entity in accordance with the distance between the virtual cameras and the information display entity. As a result, by changing the transparency of an information display entity in accordance with the distance between the information display entity and a virtual camera, further three-dimensional appearance is provided.

The display control device is characterized in that the transparency setting means reduces the transparency of an information display entity which is away from the virtual camera by a predetermined distance or more from the virtual camera.

As a result, an information display entity appears from one side of the screen and disappears into the other side using a visual effect of merging into a background image. Thus it is possible to provide a crisp display of a range close to the virtual camera and a faint display an information display entity distant from the virtual camera. This indirectly presents a range to be noticed by the user thus providing the three-dimensional appearance of the information display and the visibility of the display.

The display control device is characterized in that the transparency setting means sets the transparency of the information display entity by changing the weight amount relative to a background and the information display entity displayed on the display control device. The background is an image which is so-called wallpaper. The weight amount relative to the background and the information display entity is a value indicating the change ratio of the transparency of the information display entity in accordance with the characteristics of the background.

It is thus possible to change the weight in accordance with the characteristics of the background and the information display entity and provide appropriate transparency. For example, in case the lightness of the background is low (that is, dark) and the lightness of the information display entity is high (that is, bright), the weight amount is changed to raise the transparency in order to avoid a state where the information display entity is more prominent than the desired appearance. In case the lightness of each of the background and the information display entity is high, the weight amount is set so as to reduce the transparency thus avoiding a state where the information display entity is less prominent than the desired appearance. It is thus possible to keep proper the appearance of an information display entity by way of the background thereby enhancing the visibility.

The invention provides a display control method for a portable information terminal which displays a plurality of information display entities in a vertical line on the display section, characterized in that the display control method comprises: a size setting step of setting the size of an information display entity so that the size of the information display entity to be displayed will be gradually scaled down in accordance with the distance between the information display entity and a predetermined display position of the display; an interval setting step of setting the display interval of information display entities to be displayed in accordance with the distance between each of the information display entities and the predetermined display position; a transparency setting step of setting the transparency of an information display entity to be displayed in accordance with the distance between each of the information display entities and the predetermined display position; and a scroll step of scrolling through the plurality of information display entities based on the setting in the size setting step, the interval setting step, and the transparency setting step.

According to the invention, an information display entity is arranged so that the information display entity will appear smaller and more transparent and the interval will be smaller as it moves upward from the predetermined position.

The invention provides a portable information terminal (for example a PDA 1 in FIG. 24) comprising a display section (for example an LCD panel 11 in FIG. 14) integral with a touch panel, the portable information terminal displaying, in whole or in part, the information display entities arranged in a predetermined order in a predetermined display area (for example a main display area 11*a* in FIG. 24) of the display, characterized in that the portable information terminal further comprises: setting means (for example a menu display controller 310 in FIG. 41) for setting a position of a candidate for selection (for example a menu display area in FIG. 25) in the predetermined display area; scroll means (for example a scroll display controller 314 in FIG. 41) for scrolling through information display entities in case a drag operation is made; and first determination means (for example a menu display controller 310 in FIG. 41) for determining the information display entity displayed in the position of a candidate for selection as a candidate for selection; characterized in that a drag operation is available across the predetermined display area.

The invention provides a display control method for causing, a portable information terminal comprising a display integral with a touch panel, a drag operation being available across the predetermined display area of the display, to display, in whole or in part, the information display entities arranged in a predetermined arrangement in the predetermined display area, characterized in that the method comprises: a setting step of setting a position of a candidate for selection in the predetermined display area; a scroll step of scrolling through information display entities in case a drag operation is made; and a first determination step of determining as a candidate for selection the information display entity displayed in the position of a candidate for selection.

Here, display control information refers to information equivalent to a program used for processing by an electronic calculator (computer) such as a portable information terminal.

The drag operation refers to operation of drawing a line on a touch panel with a stylus pen of a finger of the user. In the drag operation, a moment a stylus pen comes into contact with a touch panel is referred to as a "tap-in" and a moment a stylus pen is released from a touch panel after moving the stylus pen with the stylus pen kept in contact with the touch panel is referred to as a "tap-out". The operation of causing a stylus pen to come into contact with a touch panel instantaneously and release the stylus pen is called a "tap". According to this invention, a drag operation is available across a predetermined display area where a plurality of information display entities are displayed. Scroll display of information display entities is executed by a drag operation. Thus, the user has only to perform a drag operation like drawing an arbitrary line in order to perform scroll operation. The display screen of a personal information terminal device is small so that the predetermined display area may be set to the entire display screen of the display. For example, a menu display entity may be used as an information display entity and in case a menu screen is to be displayed, the entire display screen may be used to display the menu screen, and a scroll operation (or a drag operation) is allowed across the screen. Further, as a result of scroll, an information display entity (menu display entity) displayed in the position of a candidate for selection is selected as a candidate for selection. Thus, a single drag operation serves as a scroll operation instruction and selection of an information display entity (menu display entity).

The invention provides a portable information terminal comprising a display integral with a touch panel, the portable information terminal displaying, in whole or in part, a virtual face (for example a menu display entity group 40) where a plurality of information display entities are arranged in a predetermined display area of the display, characterized in that the portable information terminal further comprises: setting means (for example a menu display controller 310 in FIG. 41) for setting a position of a candidate for selection in the predetermined display area; scroll means (for example a scroll display controller 314 in FIG. 41) for scrolling through information display entities by moving at least either the virtual camera and the virtual face in case a drag operation is made; and first determination means (for example a menu display controller 310 in FIG. 41) for determining the information display entity displayed in the position of a candidate for selection as a candidate for selection; characterized in that a drag operation is available across the predetermined display area.

The invention provides a display control method for causing, a portable information terminal comprising a display integral with a touch panel, a drag operation being available across the predetermined display area of the display, to display, in whole or in part, a virtual face where a plurality of information display entities are arranged as seen from a virtual camera in the predetermined display area, characterized in that the method comprises: a setting step of setting a position of a candidate for selection in the predetermined display area; a scroll step of scrolling through information display entities by moving the virtual camera in case a drag operation is made; and a first determination step of determining the information display entity displayed in the position of a candidate for selection as a candidate for selection.

According to the invention, the following advantage is obtained. Information display entities are arranged on a virtual face. Scroll display is allowed by moving a virtual camera whose line of sight faces the virtual face, thus more readily allowing scroll control in a virtual space.

A virtual face for a portable terminal device may be a curved surface. The virtual face is a curved surface, so that the size of an information display entity displayed changes and the size changes by way of scroll also. For example, in case the virtual face is the lateral face of a cylinder and the cylinder is rotated about its axis by way of scrolling through the virtual face or a virtual camera moves along the direction of the lateral face of the cylinder, the size of an information display entity changes thus allowing display of a three-dimensional information display entity.

The invention provides a portable information terminal characterized by further comprising: storage means (for example a storage section 400 in FIG. 41) for storing a plurality of programs corresponding to, in whole or in part, the plurality of information display entities; and activation means (for example an application activation controller 320 in FIG. 41) for activating, if any, a program corresponding to the information display entity determined as a candidate for selection by the first determination means.

According to the invention, it is possible to activate a program corresponding to an information display entity determined as a candidate for selection by a drag operation. A single drag operation serves as a series of operations such as scroll display and selection and activation, thereby enhancing its operability.

The invention provides a portable information terminal characterized by further comprising: storage means (for example a storage section 400 in FIG. 41) for storing a plurality of programs corresponding to, in whole or in part, the plurality of information display entities; tap-out determination means (for example an input determination section 311 in FIG. 41) for determining tap-out on the touch panel; and activation means (for example an application activation controller 320 in FIG. 41) for automatically activating a program corresponding to the information display entity determined as a candidate for selection by the first determination means, if any, based on the tap-out determination by the tap-out determination means.

According to the invention, it is possible to prevent inadvertent activation of a program through a drag operation thus enhancing the operability. Making tap-out operation within a predetermined period after the completion of scroll display does not activate a program corresponding to the information display entity determined as a candidate for selection. In case tap-out operation is made past the predetermined period after the completion of scroll display, the program is activated. This prevents an unexpected program from being activated due to a drag operation for scroll display. Meanwhile, by delaying a tap-out following a drag operation (performing a tap-out past a predetermined period), it is possible to activate a desired program.

This allows scroll display and selection by way of a single operation thus enhancing its operability.

The invention provides a portable information terminal characterized by further comprising second determination means (for example a menu display controller 310 in FIG. 18) for determining as a candidate for selection the information display entity displayed in the tap position instead of an information display entity determined as a candidate for selection by the first determination means.

According to the invention, a tap operation may be used, on top of a drag operation, to select a desired information display entity. A method for selecting an information display entity may be switched as appropriate, such as using a drag operation in case a desired information display entity is not displayed in the predetermined display area, and a tap operation in case one is displayed. In any case, it is possible to readily select a desired information display entity thus enhancing its operability.

In case determination is made by the second determination means, the activation means may activate a program corresponding to an information display entity determined as a candidate for selection by the second determination means, if any.

According to the invention, a tap operation may be used to activate an application program corresponding to a selected information display entity. That is, a single tap operation directly activates a desired application thus enhancing its operability.

The scroll means of the portable information terminal device may gradually accelerate the scroll display in case the drag velocity of the drag operation exceeds a predetermined velocity.

According to the invention, scroll velocity is gradually increased in accordance with the drag velocity of the drag operation. Thus, in case the position of a desired information display entity in the whole information display entities is estimated, the drag velocity may be increased for quick display. This enhances its operability.

The invention provides a portable information terminal characterized by further comprising: target scroll amount setting means for setting a target scroll amount in accordance with the operation amount of the drag operation; and target scroll amount change means for changing the target scroll amount determined by the target scroll amount setting means in accordance with the operation amount of the drag operation; characterized in that the scroll means controls the scroll display velocity in accordance with the remaining scroll amount as a difference between the target scroll amount changed by the target amount change means and the current scroll amount.

According to the invention, the target scroll amount is set in accordance with the drag operation amount, that is, the travel distance of a drag. Thus, by making control so that the scroll velocity is reduced as the remaining scroll amount is reduced as a result of scroll, it is possible to obtain a smooth feel of halt. Moreover, the target scroll amount can be changed in accordance with the drag velocity. That is, it is possible to reflect the component of the drag velocity on the scroll display velocity.

The invention provides a display control device comprising: item display control means for displaying a plurality of items on an image display section; window frame display control means for displaying a plurality of window frames in accordance with the plurality of items; a first screen which can be displayed on the image display section including a first plurality of items; a second screen which can be displayed on the image display section including a second plurality of items and the plurality of window frames, the second screen located in a lower layer than the first screen; and screen display control means for selectively switching between the first screen and the second screen and displaying the first screen or the second screen on the image display section; characterized in that, in switchover from the first screen to the second screen by the screen display control means, the item display control means makes display control by gradually scaling up the second plurality of items so as to position the items in the window frames corresponding to the items.

The invention provides a display control device comprising: first operation means and second operation means, both of the means instructing selective display between the first screen and the second screen by way of the image display control means, characterized in that, in switch over from the first screen to the second screen by the operation means by way of the first screen display control means, the item display control means makes display control by gradually scaling up the second plurality of items so as to position the items in the window frames corresponding to the items, and that in switchover from the first screen to the second screen by the second operation means by way of the image display control means, the item display control means makes display control so as to promptly position the second plurality of items in the window frames corresponding to the items.

The invention provides a display control device comprising a switch section which is oscillatable or rotatable and can be pressed, characterized in that the display control device selects an arbitrary item from the plurality of items in the first screen by way of oscillation or rotation of the switch section and that, by way of a push on the switch section, the image display means makes switchover from the first screen to the second screen as a lower-layer screen related to the selected item.

The invention provides a display control program used for the display control device, the program comprising: a step of displaying a first screen including a first plurality of items on an image display section; a step of selecting an arbitrary item from the plurality of items in accordance with the oscillation or rotation of a switch section which is oscillatable or rotatable and can be pressed; a step of determining the selected item by way of a push on the switch section; a step of determining whether decision of an item is made by way of a push on the switch section within a predetermined period after selection of the item by way of oscillation or rotation of the switch section; and a step of selectively performing display control of, in switching from the first screen to the second screen as a lower-layer screen related to the selected item, the second screen including a second plurality of items and a plurality of window frames, gradually scaling up the second plurality of items in accordance with the determination in the determining step so as to position the items in the window frames corresponding to the items, or display control of promptly positioning the second plurality of items in the window frames corresponding to the items.

The invention provides a display control device which can display at least partially a plurality of items on a display section, the display control device comprising scroll display control means for scrolling the items on the display section, characterized in that the scroll display control means scales up the items in a direction opposite to the scroll direction of the scroll display among the items to be displayed on the display, and displays the scaled-up items in accordance with the scroll operation.

The invention provides a display control device which can display at least partially a plurality of items on a display section, the display control device comprising scroll display control means for displaying the plurality of items on the display section as well as scrolling the items rightward or leftward, or upward or downward on the display section in accordance with a scroll operation, characterized in that the scroll display control means scales up at least partially the items to be displayed on the display section in a different fashion between the rightward, leftward, upward and downward scroll operations, and displays the scaled-up items The invention provides a display control device which can display at least partially a plurality of items on a display section, the display control device comprising scroll display control means for displaying in a first size the plurality of items on the display section as well as scrolling the items on the display section in accordance with a scroll operation, characterized in that the scroll display control means gradually scales up at least partially the items to be displayed on the display section from a size smaller than the first size to the first size and displays the scaled-up items in accordance with the scroll operation.

The invention provides a display control device which can display on a display section an image of a plurality of items arranged in a virtual space, the plurality of items projected onto a predetermined plane, the display control device comprising scroll display control means for scrolling the plurality of items on the display section by moving the plurality of items in the virtual space in accordance with a scroll operation, characterized in that the scroll display control means scales up at least partially the plurality of items and displays the scaled-up items by moving the plurality of items in a position distant from the predetermined plane to a position close to the plane.

The invention provides a display control device which can display an image of a plurality of items arranged in a virtual space, the plurality of items shot with a virtual camera arranged in the virtual space, the display control device comprises scroll display control means for scrolling on the display section at least either the plurality of items or the virtual camera by moving at least either the plurality of items or the virtual camera in the virtual space, characterized in that the scroll display control means scales up at least partially the plurality of items and displays the scaled-up items by moving at least either part of the plurality of items or the virtual camera so that the distance between the plurality of items and the virtual camera will be reduced.

BRIEF DESCRIPTION OF THE DRAWINGS

FIG. 13 is a flowchart illustrating a flow of menu item selection;

FIG. 16 is a flowchart illustrating a flow of drawing on a menu panel;

FIGS. 17A and 17B show an example of a menu display in the mode "1".

FIGS. 18A and 18B show another example of a menu display in the mode "1";

FIGS. 19A and 19B show an example of a menu display in the mode "1";

FIGS. 20A and 20B show another example of a menu display in the mode

FIGS. 26A to 26C show a display example of a menu screen;

FIGS. 27A and 27B show a display example of a menu screen;

FIG. 32 shows the relationship between an indicated position and a drag direction or a travel distance Δw;

FIG. 33 shows the relationship between the drag direction and the travel direction of a destination pointer;

FIGS. 38A and 38B illustrate the movement of the destination pointer;

FIG. 42 shows the structure of menu display entity data;

FIGS. 50A to 50C illustrates another variation of this embodiment;

FIG. 54A shows the transition of display of menu items in an accessory operation screen as a lower-layer menu screen of the launcher screen;

FIG. 54B shows the transition of display of menu items in an accessory operation screen as a lower-layer menu screen of the launcher screen;

FIG. 54C shows the transition of display of menu items in an accessory operation screen as a lower-layer menu screen of the launcher screen;

FIG. 54D shows the transition of display of menu items in an accessory operation screen as a lower-layer menu screen of the launcher screen;

FIG. 54E shows the transition of display of menu items in an accessory operation screen as a lower-layer menu screen of the launcher screen;

FIG. 54F shows the transition of display of menu items in an accessory operation screen as a lower-layer menu screen of the launcher screen;

FIG. 54G shows the transition of display of menu items in an accessory operation screen as a lower-layer menu screen of the launcher screen;

FIG. 55A shows the transition of display of menu items in other display control of menu items by way of a scroll operation in the third mode shown in FIG. 53C;

FIG. 55B shows the transition of display of menu items in other display control of menu items by way of a scroll operation in the third mode shown in FIG. 53C;

FIG. 55C shows the transition of display of menu items in other display control of menu items by way of a scroll operation in the third mode shown in FIG. 53C;

FIG. 55D shows the transition of display of menu items in other display control of menu items by way of a scroll operation in the third mode shown in FIG. 53C;

FIG. 55E shows the transition of display of menu items in other display control of menu items by way of a scroll operation in the third mode shown in FIG. 53C;

FIG. 55F shows the transition of display of menu items in other display control of menu items by way of a scroll operation in the third mode shown in FIG. 53C;

FIG. 55G shows the transition of display of menu items in other display control of menu items by way of a scroll operation in the third mode shown in FIG. 53C;

FIG. 55H shows the transition of display of menu items in other display control of menu items by way of a scroll operation in the third mode shown in FIG. 53C.

DETAILED DESCRIPTION OF THE EMBODIMENTS

First Embodiment

A first embodiment of the invention will be described referring to FIGS. 1 through 20. This embodiment explains a case where this invention is applied to a PDA.

Application of the invention is not limited to this example. The invention may be applied to other electronic devices and information terminal devices which provides menu display, such as a portable game device, a multifunctional cell phone, a laptop PC, and a set-top box.

Explanation of External Configuration

Figure 1:
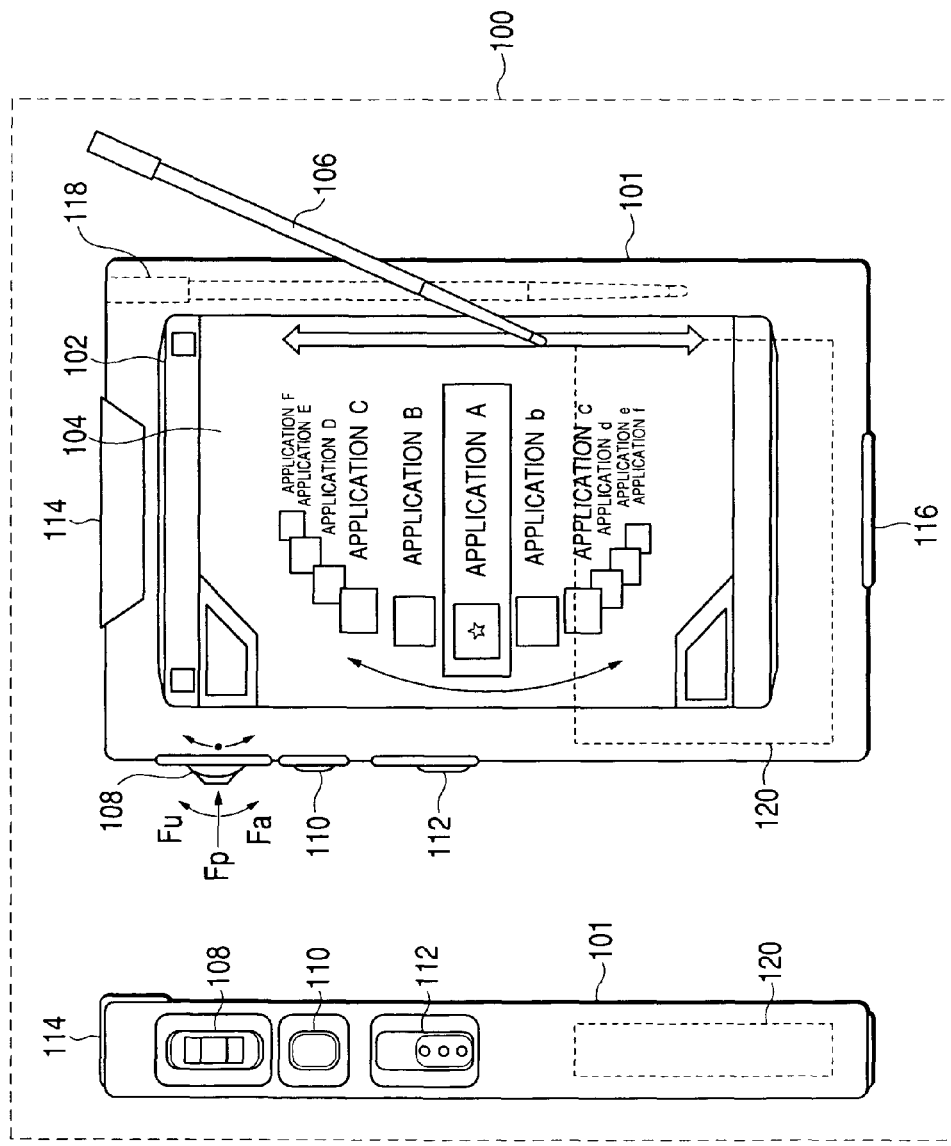
FIG. 1 shows a front view and a side view of a PDA according to a second embodiment of the invention.

FIG. 1 shows a front view and a side view showing an example of external appearance of a PDA to which the invention is applied.

As shown in FIG. 1. A PDA 100 comprises an LCD (Liquid Crystal Display) 102, a touch panel 104, a stylus pen 106, a side controller 105, an ESC (escape) button 110, a power button 112, a compact memory flash card slot 114, an interface connector 116, a stylus pen storage unit 118, a control unit 120, and a built-in power unit (not shown). These components are installed in an enclosure 101.

The LCD 102 is an image display device which can display various information such as a text and an image. The LCD 102 may be another display unit such as an ELD (Electronic Luminescent Display) or DDF (Plasma Display Panel). On the top of the LCD 102 is provided the touch panel 104, which the user can touch with the stylus pen 106 to perform various operation and input.

The side controller 108 is an input lever which tilts upward (arrow Fu) and downward (arrow Fa), and a push (arrow Fp). The user operates the side controller 108 for example with his/her fingers. When not operated, the side controller 108 returns to the state in FIG. 1, or no-input state by way of actuation by a spring. Thus, from the side controller 108, the four states can be input: upward/downward direction, push and non input.

The escape button 110 is a button switch for inputting an operation meaning cancellation or escape in the operation input.

The compact memory flash card slot 114 is an extension slot conforming to the standard for a compact flash memory card using a flash memory. The interface connector 116 is an extension slot to connect to an external device such as a digital camera, a PC, a cell phone, and a cradle for input/output of information. Standards for the compact memory flash card slot 114 and the interface connector 116 may be set as appropriate.

The control unit 120 controls the functions of the PDA 100 and is implemented by way of hardware such as a CPU (Central Processing Unit), a RAM, a ROM, an ASIC (Application Specific Integrated Circuit) and software such as various programs and data. The LCD 102, touch panel 104, side controller 108, escape button 110, compact memory flash card slot 114 and interface connector 116 are connected to the control unit to allow signal communications and centrally controlled.

In this embodiment, three menu selecting operations are available. The first method is input with the side controller 108. Inputting some direction by tilting the side controller 108 in the upward/downward direction deselects the menu items in the selection state (state where an item is recognized as a candidate for selection). Then, in accordance with the number of time the lever is tilted or duration the lever is tilted, the user can specify a menu item in the upward or downward direction (upward/downward direction on the display screen). When the menu under moving display, that is, when a menu item specified with scroll is in the selection state, that selection is determined by pushing the side controller 108.

The second method is an input with the touch panel 104 and the stylus pen 106. In the display screen are displayed a scroll-up icon 136 and a scroll-down icon 138. When the user touches the touch panel 106 with the stylus pen 106 with an intention to touch an icon, menu items in the selection state are deselected. Then, in accordance with the number of time the lever is tilted or duration the lever is tilted, the user can place the menu under moving display in the upward or downward direction (upward/downward direction on the display screen). The user then taps (patting on the touch panel 104 with the stylus pen 106).

The third method is an input in accordance with a drag with the stylus pen 106. By causing the stylus pen 106 to touch the touch panel 104 and dragging the stylus pen 106, or sliding the stylus pen 106 with its tip in contact with the touch panel 104 in the upward/downward direction deselects the menu items currently in the selection state. The user can specify a menu item distant by the number of items according to the travel amount of the drag in the upward or downward direction according to the drag direction. Once the menu is under moving display and the specified menu item is in the selection state, the user releases the stylus pen 106 to determine the selection.

Explanation of Menu Display

Next, the screen display, specifically speaking, the menu display will be described.

FIG. 2 shows a screen of the outline of menu display by a launcher. As shown in FIG. 2, the PDA 100 in this embodiment has three display states (display modes) for menu display on the background image (not shown).

Figure 2A:
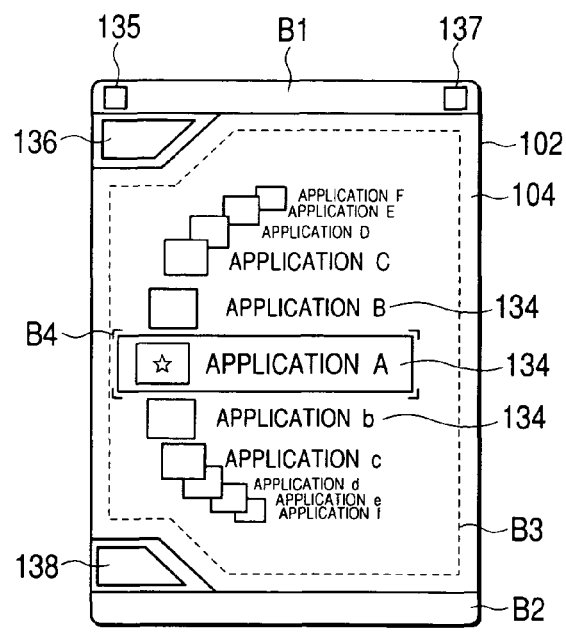
FIGS. 2A to 2C show screens of menu display patterns in the PDA to which the invention is applied.
Figure 2B:
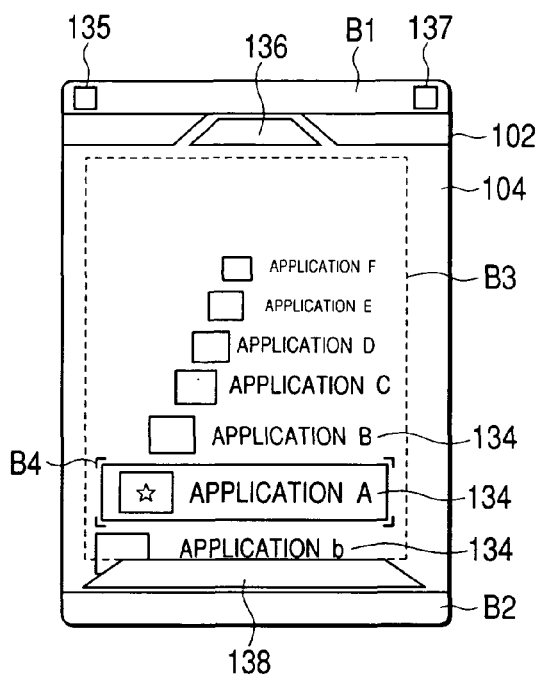
Figure 2C:
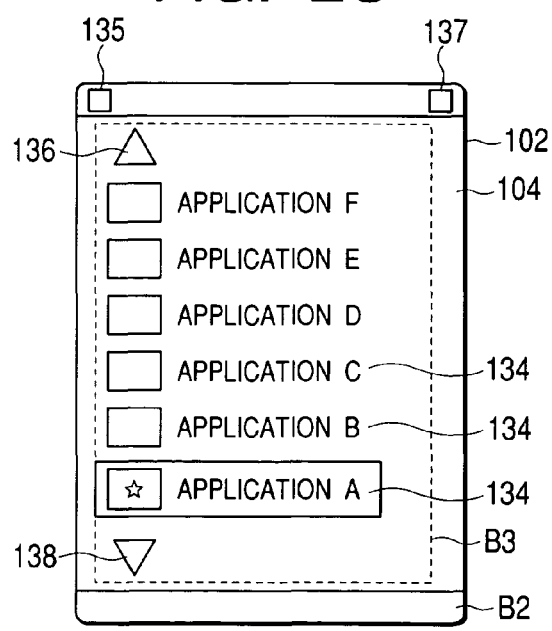

FIGS. 2A, 2B and 2C show the mode "1" where menu items are displayed in an arc, the mode "2" where menu items are displayed in flat plates slanted in the direction of depth in the screen, and the mode "3" where menu items are arranged in a plane. Details of each mode will be given later. In the mode "1", the menu is under moving display to rotate in an arc, and in the mode "2", the menu is under moving display in the direction of depth, in accordance with the menu selection by the user.

Switching between display modes is made by selecting a mode switching icon 135, for example in the sequence of the mode "1", mode "2", mode "3", and mode "1" back again.

In either mode, in both vertical ends of the display screen are provided a control bar B1, B2 to display the mode switching icon 135 and a background switching icon 137, and capacity display of a built-in power source as well as a clock display (not shown) The menu display is given in a main display area B3.

Figure 2D:
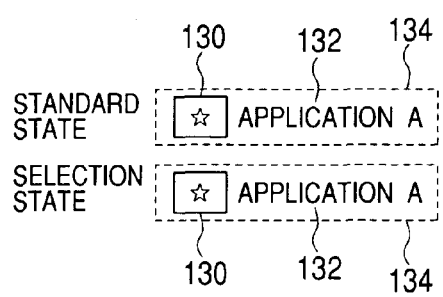
FIG. 2D shows a menu item.

In the menu display, a single menu item or a plurality of menu items are displayed. A menu item has an icon 130 and a menu name 132 as shown in FIG. 2D for example, and an icon and a menu name are handled as a set, or a menu panel 134. A menu item in a predetermined position B4 is a candidate for selection, which shows that the menu is in the selection state by way of a different display form of the menu panel 134 (the display form is hereinafter referred to as the "selection display"). To be more specific, the area surrounding the icon 132 and the menu name 132 corresponding to the ground of the menu panel 134) is filled in with a color different from that of the menu panel 134 in the non-selection state. While in this embodiment, the menu panel 134 is a rectangle where the horizontal direction in the screen is the longitudinal direction, any other shape may be used. The menu panel 134 may display only the icon 130 or the menu name 132.

Figure 3:
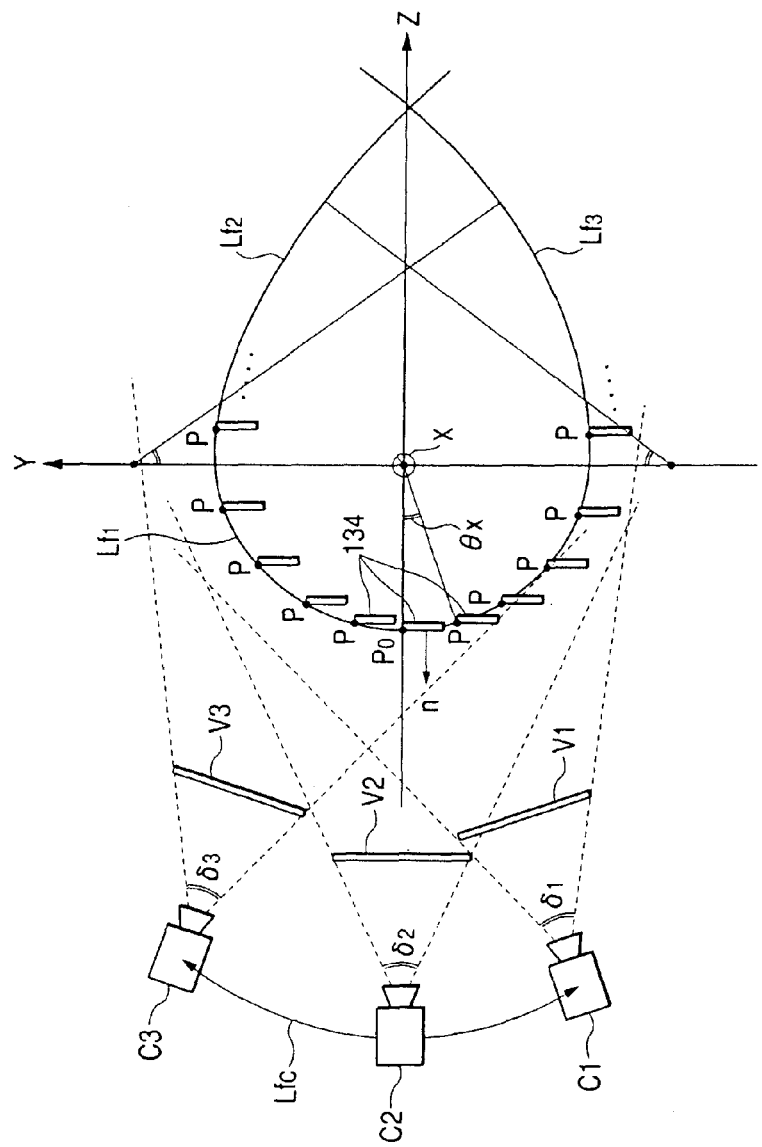
FIG. 3 is a conceptual drawing of a YZ plane in a virtual space illustrating an example of a menu display alignment in the mode "1"
Figure 4:
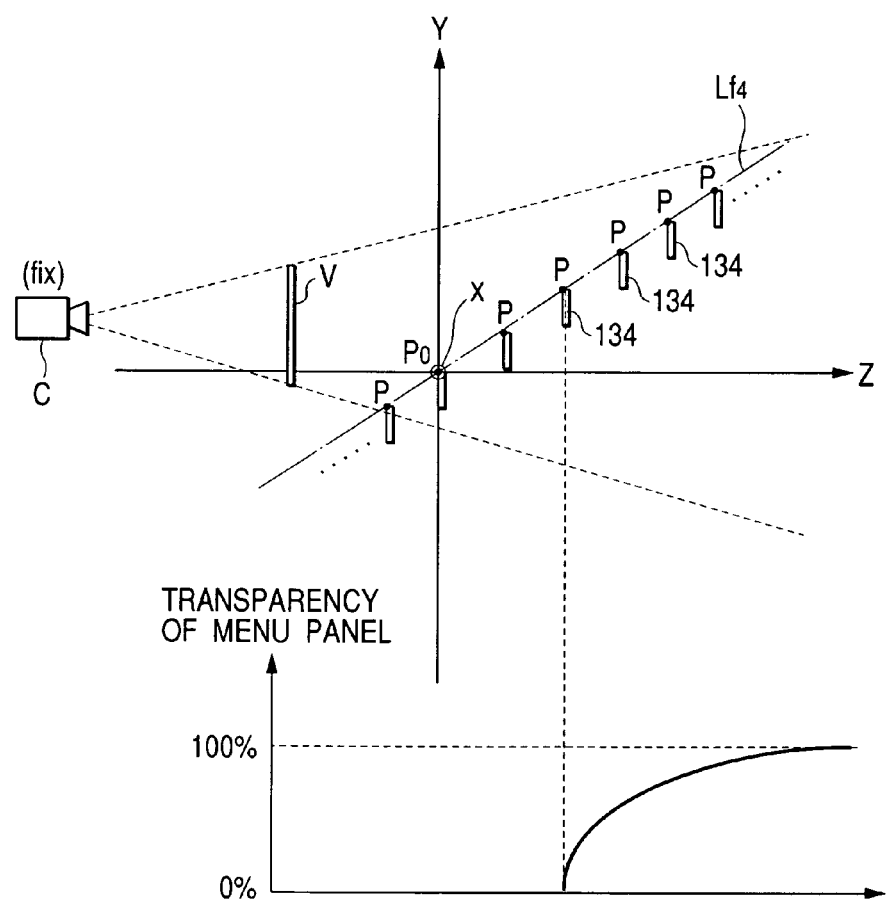
FIG. 4 is a conceptual drawing of a YZ plane in a virtual space illustrating an example of a menu display alignment in the mode "2"

FIG. 3 is a conceptual drawing showing a YZ plane in a virtual space illustrating an example of menu display topology in the mode "1". FIG. 4 is a conceptual drawing showing a YZ plane in a virtual space illustrating an example of menu display topology in the mode "2".

In the world coordinate in a virtual space, the horizontal direction in the screen (as seen from the virtual camera C) is assumed for example as the X axis, the upward/downward direction the Y axis, and the depth direction the Z axis.

As shown in FIGS. 3 and 4, in the mode "1" and mode "2", the menu panel 134 arranged on predetermined travel locuss Lf1-LF3, Lf4 in a virtual space is generated as an image in a screen V as seen from a virtual camera C. The travel locus Lf is a model defined in a virtual space and defined for example as a polygon model or a curve function.

As shown in FIG. 3, the menu panel 134 in the mode "1" has locuss comprising the travel locus Lf1 appearing in convex arc on the side of the virtual camera c in the upper left and lower left quadrants, the travel locus Lf2 in milder arc than the travel locus Lf1 extending in the direction of depth from the upper end of the travel locus Lf1 in the upper right quadrant, and travel locus Lf3 in milder arc than the travel locus Lf1 extending in the direction of depth in the screen from the lower end of the travel locus Lf1 in the lower right quadrant.

The menu panels 134 are arranged so that the normal to each of the travel locuss Lf1 through Lf3 will face the virtual camera C assuming as a local origin the display position P previously set on the travel locuss Lf1 through Lf3.

In the mode "1", when a menu item is selected, the menu panel 134 moves to occupy the display positions P at a predetermined pitch along the travel locuss Lf1 through Lf3 in the upward/downward direction in the screen (direction of rotation about X axis in the figure). That is, the menu panel 134 moves to slide along the travel locuss Lf1 through Lf3. The display panel 134 located in a display position P0 (also called the "home position") is assumed as a candidate for selection and displayed for selection. The display position P0 corresponds to the predetermined position B4 (see FIG. 2A). Thus, the menu panel 134 appears to rotate in arc on the display screen. The menu panel 134 closest to the virtual camera C is assumed as a candidate for selection and displayed for selection.

In the mode "1", the position of the virtual camera C is also changed. The virtual camera C moves along a predetermined virtual camera travel locus Lfc in the upper left quadrant and lower left quadrant in association with the movement of the menu display. In this practice, in case the menu panel 134 located in the display position P0 is at the head of the menu (having the smallest menu number in this embodiment), control is made for a virtual camera C1 to take a posture (for example the rotation angle with respect to the local origin) so that the home position (display position P0) will be located above the screen V1 as seen from the position of the virtual camera C1, and the viewing angle will be δ1. In case the menu panel 134 located in the display position P0 is at the tail of the menu (having the largest menu number in this embodiment), control is made for a virtual camera C3 to take a posture (for example the rotation angle with respect to the local origin) so that the home position (display position P0) will be located below the screen V3 as seen from the position of the virtual camera C3, and the viewing angle will be δ3. As shown in FIG. 3, when the home position is normal, n, to the screen V2 as seen from the position of the virtual camera C2 the viewing angle will be δ2.

The locuss formed by the travel locuss Lf1 through Lf3 are not limited to those shown in FIG. 3 but may be other shapes having a convex shape such as a circle and an ellipse as faced with the virtual camera C.

In the mode "2", when a menu item is selected, the menu panel 134 moves to occupy the display positions P at a predetermined pitch, and is displayed as if it moved away or closer in one-point perspective. In the mode "2", the home position is fixed in the lower area of the screen and the menu panel 134 located in a home position is in the selection state. Movement between menu items is executed until the menu item specified based on the selection by the user reaches the home position, same as the mode "1".

For the mode "3", operation is the same as the related art so that the description is omitted.

In case the selected menu item is a folder, the menu items contained in the folder, or in the lower layer of the folder may be displayed on a menu.

On a PDA 100, the background switching icon 137 is displayed in any display mode. By selecting the icon, it is possible to change the background screen.

Description of Functional Blocks

Next, the functional blocks will be described.

Figure 5:
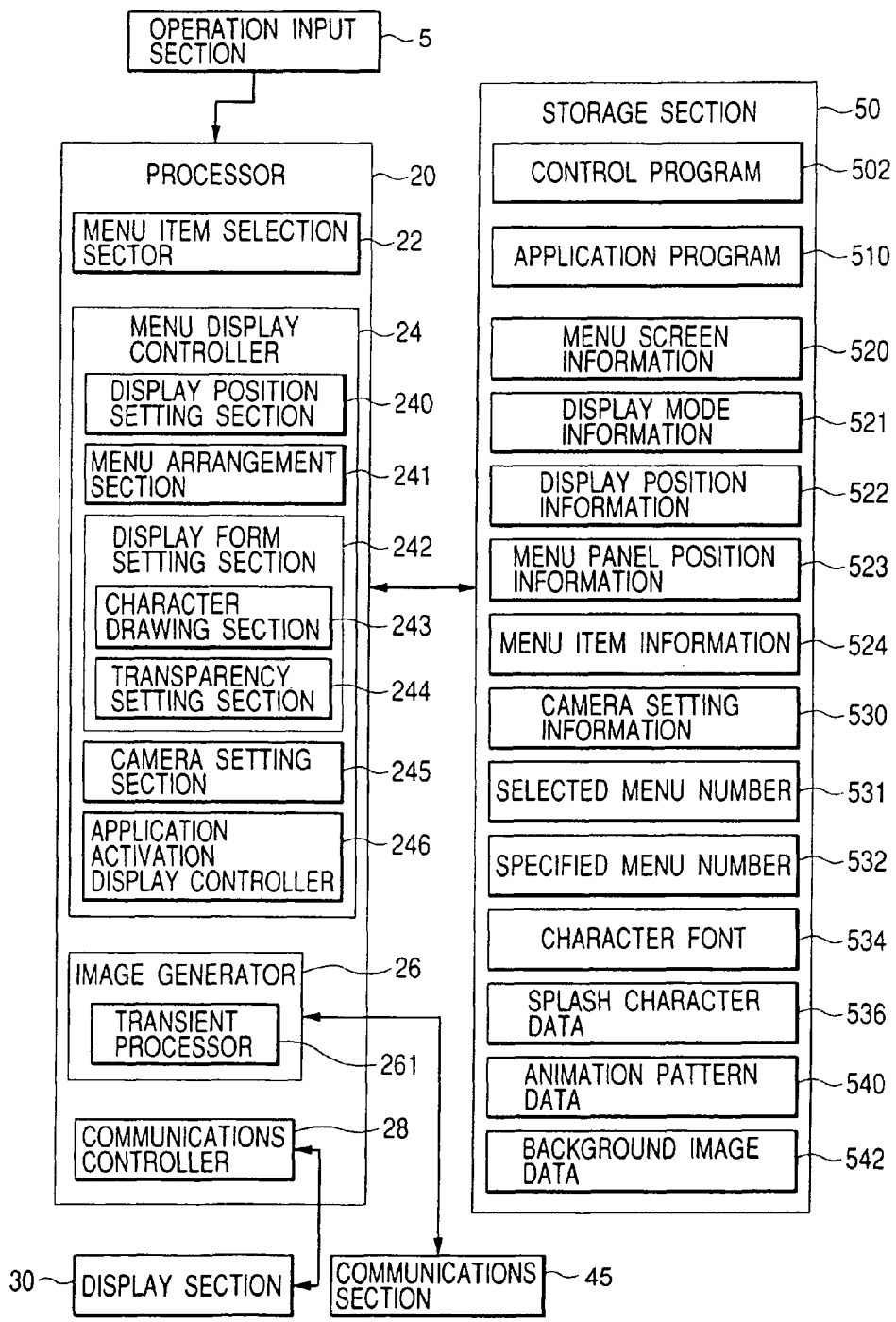
FIG. 5 is a functional block diagram showing an example of functional configuration.

FIG. 5 is a functional block diagram showing an example of functional configuration in this embodiment. As shown in FIG. 5, the PDA 100 comprises an operation input section 10 a processor 20, a display section 30, a communications section 45, and a storage section 50.

The operation input section 5 is implemented for example by a button, a lever, a mouse, a track pad, or a keyboard (including a soft keyboard), and accept various operation inputs from the user and outputs an operation input signal to the processor 20. In the example of FIG. 1, the operation input section 5 comprises a touch panel 104, a slide controller 108 and an escape button 110.

The operation input section 10 is implemented for example by a button, a lever, a mouse, a track pad, or a keyboard (including a soft keyboard), and accept various operation inputs from the user and outputs an operation input signal to the processor 20. In the example of FIG. 1, the operation input section 10 comprises a touch panel 104, a side controller 108 and an escape button 110.

The processor 20 performs arithmetic operation in accordance with programs to make centralized control of the PDA 100 as well as execute a launcher or various application programs for the PDA 100.

The processor 20 is, for example, hardware such as a CPU, various IC memories, an ASIC, and a driver circuit and their control programs. In the example of FIG. 1, the processor 20 comprises a control unit 120, and a driver circuit of an LCD 102 or a touch panel 104 (not shown).

The processor 20 comprises a menu item selector 22, a menu display controller 24, an image generator 26 for generating image data of the display screen and displays the data on the screen, and a communications controller 28 for establishing a connection with an external information storage medium and controlling data communications.

The menu item selector 22 specifies a menu item from a plurality of menu items based on an operation input signal from the operation input section 10. The specified menu item is stored into the storage section 50 as a specified menu item 531 (detailed below).

To be more specific, for example, in case the selecting operation is a short titling (click) of the side controller 180 in the upward/downward direction or tapping on the scroll-up icon 136 or down-scroll icon 138, a menu item positioned in the upward/downward direction the number of operations away from the menu item currently selected is specified.

In case the selecting operation is a hold-down input by continuous titling of the side controller 180 in the upward or downward direction or a drag operation of the stylus pen 106, a menu item positioned in the upward/downward direction away from the menu item currently selected is specified, in accordance with the direction and duration of hold-down input or the drag direction and travel amount of the stylus pen 106.

Thus, the specified menu item is not necessarily a menu item next to the menu item currently in the selection state.

Assuming the number of the menu item in the selection state is Mn, the number of the specified menu item is Mn+α (a≧1 or a≦−1).

The menu display controller 24 controls a virtual space to control menu display. The menu display controller 24 further comprises a display position setting section 240, a menu arrangement section 241, a display form setting section 242, a camera setting section 245, and an application activation display controller 246.

The display position setting section 240 sets as a virtual entity a travel locus Lf in the virtual space and sets a display position P.

The menu arrangement section 241 determines position coordinates where menu panels 134 are arranged on the travel locus Lf. To be more specific, for example, the menu arrangement section 241 divides the distance between display positions P into a plurality of equal pitches and determines the position coordinates of the local origin in units of pitches until the menu item specified by the menu item selector 22 reaches the home position (display position P). The menu arrangement section 241 determines the vertex coordinates of the menu panel 134 so that the normal to the menu panel 134 will face the virtual camera C.

The display form setting section 242 determines a specific display form in order to draw a menu item on the menu panel 134. As mentioned earlier, the menu panel 134 is drawn as an information display entity model. Thus the size of the menu panel 134 shrinks as it moves in the direction of depth in the screen.

The display form setting section 242 thus comprises a character display drawing section 243 which changes the size of character display of the menu name 132 and a transparency setting section 244 for controlling the transparency of the menu panel 134 (including the icon 130 and the menu name 132).

Figure 6:
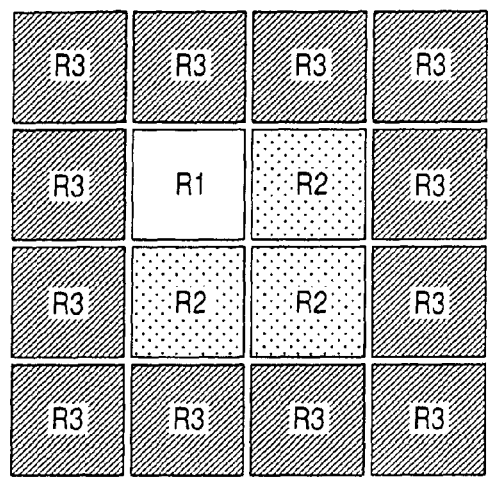
FIG. 6 is a conceptual drawing illustrating the concept of character display control by way of a character drawing section.

FIG. 6 illustrates the concept of character control by way of the character display drawing section 243. A rectangle in the figure represents pixels on the LCD 102.

The 111 243 reads the character font corresponding to the menu name 132 on the menu panel 134, scales up/down the character font based on the distance between the menu panel 134 and the virtual camera C, and obtains pixels R1 of the character to be displayed.

In case the character is scaled down, in case the pixels R1 are displayed as they are, the lines forming the character may adjoin other lines of the same color without gap, or overlap on these lines to produce a so-called "character batter", or a contrast against the background image may be lost. The character display drawing section 243 then borders the pixels R2 next to the pixels R1 on the right side, the pixels R2 off to the lower right of the pixels R1, and the pixels R2 below the pixels R1 with a darker color than the color of the character (for example gray in case the character appears in white). Further, the character display drawing section 243 borders their perimeter with the pixels R3 in a darker color (for example black). This reduces the prominent jaggies of a scaled-up character and the batter of a scaled-down character (hereinafter referred to as "bordering").

Figure 7:
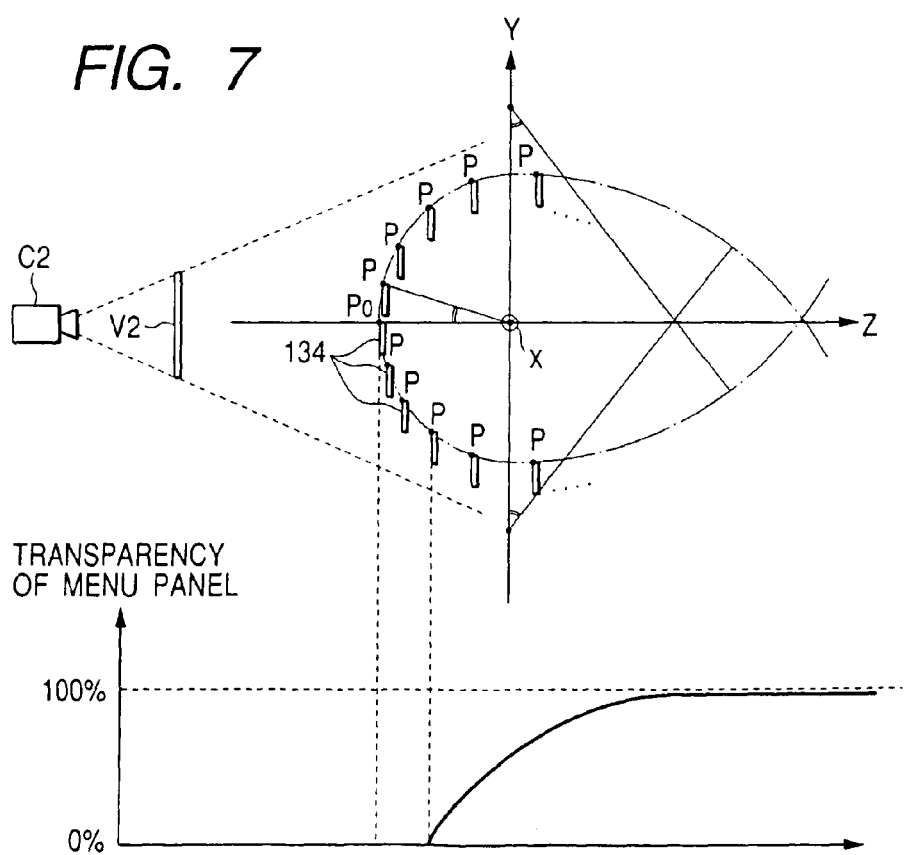
FIG. 7 is a conceptual drawing illustrating the transparency control by way of a transparency setting section.

FIG. 7 illustrates the concept of transparency control by way of the transparency setting section 244.

As shown in the figure, the transparency setting section 244 sets the transparency of the menu panel 134 based on the distance between the menu panel 134 and the virtual camera C. To be more specific, by assuming the transparency at the home position (display position P0) is "0(=opaque)" and increasing the transparency with an increase in the distance, the menu display appears more three-dimensional. As a result, the menu panel 134 is gradually displayed fainter in the direction of depth in the screen. The menu panel 134 arranged in a farther position than a certain point in the screen becomes invisible.

The camera setting section 245 sets the position, posture and the viewing angle of the virtual camera C in the virtual space.

The application activation display controller 246 displays a predetermined image (hereinafter referred to as a "splash image") during a period from reading of an application program to execution of the program in activation of the application program for stage effects of the screen at activation.

The image generator 26 is for example hardware such as a CPU, a DSP (Digital Signal Processor) and an IC memory, or image processing software. The image generator 26 generates image data to be displayed on the LCD 102 based on the display position information or an instruction from the menu display controller 24.

The image generator 26 comprises a transient processor 261. The transient processor 261 executes for example scaling, rotation, overlapping, and wiping of an image in switching between two separate images displayed on the screen. In this embodiment, overlap processing is executed.

The communications controller 28 makes synchronized control of data read/write from/to and data communications with an external information storage medium and protocol control to establish a connection and perform data communications.

The display section 30 displays an image in accordance with an image signal output from the image generator 26. In the example of FIG. 1, the display section 30 is the LCD 102.

The communications section 45 performs data communications with an external information storage medium and an external device in accordance with the control by the communications controller 28. The communications section 45 is for example a slot of various types, a modem, or a TA. In the example of FIG. 1, The communications section 45 comprises the compact memory flash card slot 14 and the extension slot of the interface connector 116.

The storage section 50 stores programs and data. The storage section 50 comprises a variety of information storage media such as an IC memory, a hard disk, an MO, and a CD-ROM.

In the example of FIG. 1, the storage section 50 comprises an information storage medium built into the control unit 120, an information storage medium connected to the compact memory flash card slot 114, and an information storage medium connected via the interface connector 116.

In this embodiment, as programs, an OS (Operating System) or various driver programs and an image processing program used by the image processor (not shown) as well as a control program 502 and an application program 510 are stored.

The control program 502 executes a so-caller "launcher" to work as utility software to help activate the application program 510. The control program 502 comprises processing concerning menu display shown in FIG. 2 and includes a menu item selector 22 and a menu display controller 24 in a processor 20.

The storage section 50 stores, as data, menu screen information 520, display mode information 521, display position information 522, menu panel position information 523, menu item information 524, camera setting information 530, a selected menu number 531, a specified menu number 532, a character font 534, splash image data 536, animation pattern data 540, and background image data 542.

The menu screen information 520 stores various ii required for screen display of a launcher shown in FIG. 2, for example image information on various icons and their display position coordinates. The menu screen information 520 is set per menu display mode. Which mode of menu display is to be used is stored as the display mode 521.

The display position information 522 stores information necessary for the display position setting section 240 to obtain the display position P per display mode.

Figures 8A, 8B:
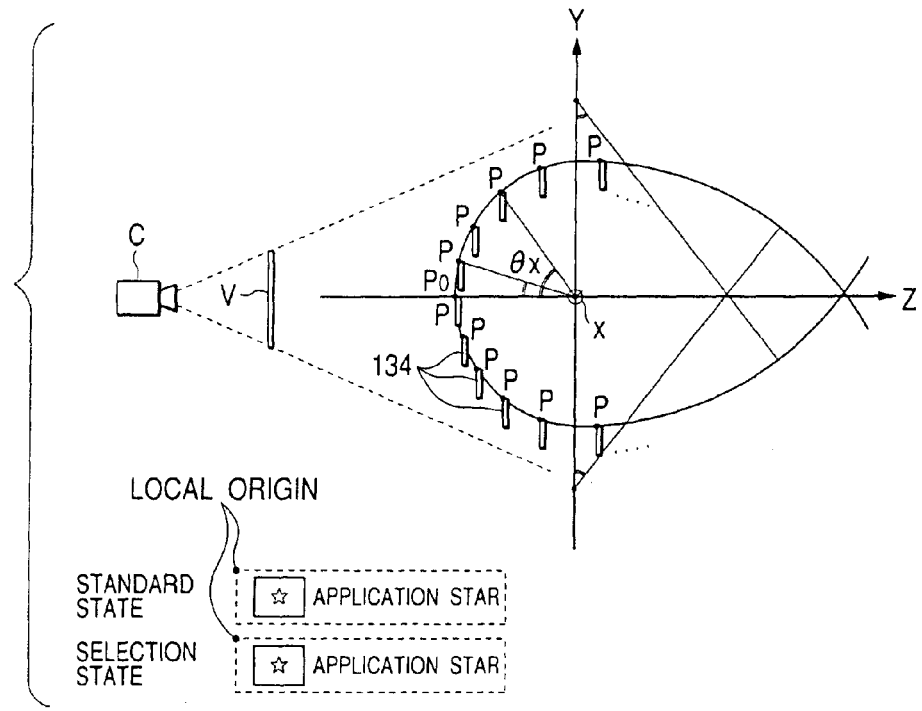
FIG. 8A is a conceptual drawing illustrating the display position P in the menu display mode "1"
FIG. 8B shows an example of data structure of display position information in the menu display mode "1"

FIG. 8A is a conceptual drawing illustrating the display position P in the menu display mode "1". FIG. 8B shows an example of data structure of the display position information 522. A screen displayed on an LCD 102 is generated as an image in a screen V of the menu panel 134 arranged on a predetermined travel locus in a virtual space, the image shot with the virtual camera C. The display position information 522 collectively (and 522-1, 522-2, 522-3, individually) stores, in this embodiment, a display mode 522a, a travel locus function 522b of the travel locuss Lf1 through Lf3, a travel locus function 522c applied per display position P, and an upward/downward direction angle 522d (angle θx with respect to the X axis in the figure). The upward/downward direction angle 522d in the mode "1" is appropriately set so that the menu panels 134 will be arranged without overlapping each other in proximity of the home position and that the display panel arranged farther in the screen will appear as close as possible for better visibility. The angle formed by a line connecting a display position Pn (n being an integer) and the virtual camera C and a line connecting a display position Pn−1 or Pn+1 and the virtual camera becomes larger as the menu panel 134 moves from the home position toward the innermost area of the screen.

The menu panel position information 523 stores specific position coordinates of the menu panel 134 set by the menu arrangement section 241.

Figures 9A, 9B, 10:
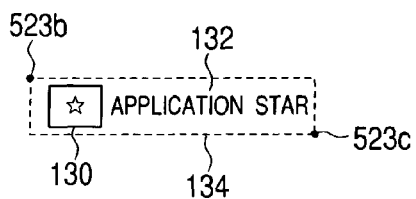
FIG. 9A is a data structure view showing an example of data structure of menu panel position information.
FIG. 9B shows data structure of data stored in menu panel position information and corresponding menu panel positions.
FIG. 10 shows an example of data structure of menu item information.

FIG. 9A shoes an example of data structure of the menu panel position information 523. FIG. 9B shows the data and corresponding menu panel positions. As shown in FIG. 9A, the menu panel position information 523 stores a local origin position 523a of the menu panel 134 and specific coordinate values 523b off to the upper left of the menu panel 134 and coordinate values 523c off to the lower right of the menu panel 134. In case which menu panel 134 is tapped on with the stylus pen 106 is determined, the menu panel position information 523 is referenced.

The menu item information 524 stores setting of the contents to be displayed on each menu panel 134.

FIG. 10 shows an example of the menu item information 524. As shown in FIG. 10, the menu item information 524 stores, per menu item number 524a, the icon 524b of the icon 130, the menu name 524c of the menu name 132, and the attribute 524d of the menu item (for example distinction between an application, a folder and a file)

The menu item information 524 is provided per layer and associated with the menu item information 524 in the upper layers and lower layers. In case the attribute of the menu item is a folder, items contained in the folder can be further displayed in a menu.

The selected menu number 531 stores the menu number of a menu item currently in the selection state. The specified menu number 532 stores the menu items determined by the menu item selector 22 in accordance with the hold-down input from the side controller 108 or the drag direction and travel amount of the stylus pen 106. The menu display moves at a predetermined velocity to assure visibility, until the selected menu number 531 matches the specified menu number 532.

Figures 11A, 11B:
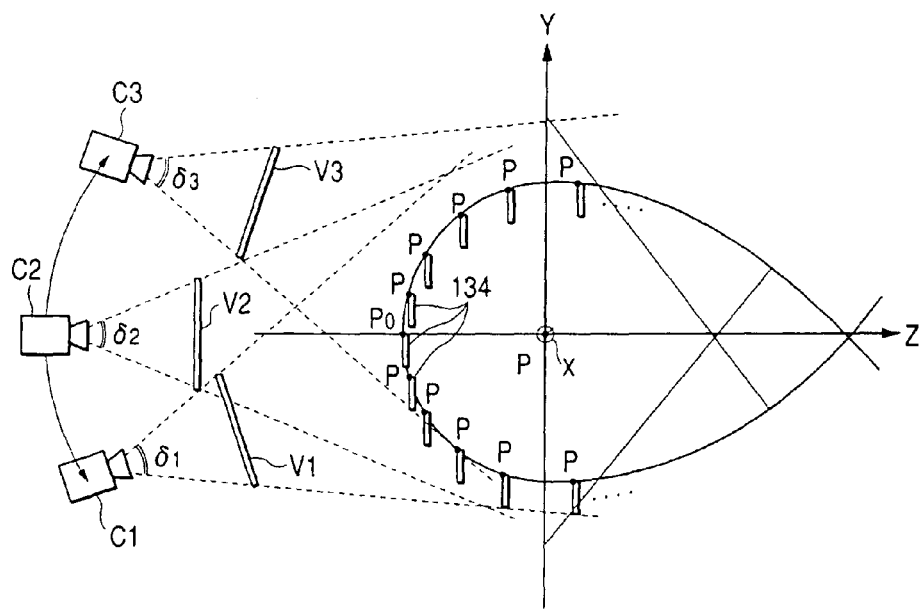
FIG. 11A is a conceptual drawing illustrating the concept of movement of a virtual camera.
FIG. 11B shows an example of data structure of camera setting information.

FIG. 11A illustrates the concept of movement of the virtual camera C. FIG. 11B shows an example of the data structure of the camera setting information 530.

As shown in FIG. 11A, the virtual camera C changes its view point while traveling along a predetermined virtual camera travel locus Lfc as the menu display moves. The camera setting information 530 sets the travel range of the virtual cameras C1 through C3 by setting a virtual camera travel locus function 530a of the virtual camera travel locus Lfc, a menu item number 530b as an initial value, position coordinates 530c, a rotation angle 530d indicating the posture of the virtual camera C, and a viewing angle 530e. Thus, menu items other than the first one and the last one are used by calculating the position coordinates, rotation angle, and viewing angle of the virtual camera Cn (n being an integer) by way of, for example, proportional calculation of the total number of the menu items in the menu item information 524 and the selected menu number 531. In case the middle area of the menu items is selected, the virtual camera is in the position of the virtual camera C2 facing the Z axis of the world coordinate Z.

Figure 12A:
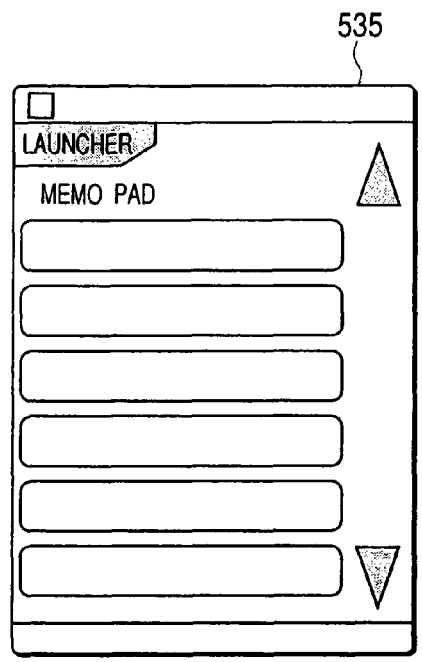
FIG. 12A shows an example of a splash image screen on activation of an application.
Figure 12B:
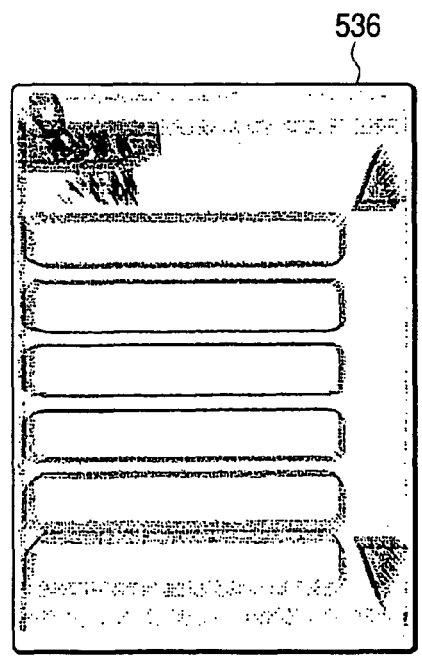
FIG. 12B shows an example of splash image.

FIGS. 12A and 12B show an example of splash image. FIG. 12A shows an example of application activation screen while FIG. 12B shows an example of splash image.

The splash image data 536 is an image (FIG. 12B) processed so that the application activation screen 535 shown in FIG. 12A will be rapidly zoomed closer on the screen (rapidly scaled up). The splash image which appears from when a menu item is selected and determined by a launcher to when an application program corresponding to the menu item is activated, produces a three-dimensional screen effect whereby the menu item appears as if it popped up from the menu.

The splash image data 536 is stored in association with the application program 510.

The animation pattern data 540 stores information on an animation pattern to be displayed in case an application is terminated or menu display is arbitrarily called using a launcher. The animation pattern data 540 has a meaning which is paired with that of the splash image data 536 from the viewpoint of screen stage effects.

In this embodiment, for example, the animation pattern data 540 stores the information on the change in the viewing angle δ from zooming in on the icon 130 of the application to rapid zoom-out to a predetermined menu display (the state in FIG. 2).

The background image data 542 stores a plurality pieces of image data which can be displayed in the background of menu display. A flag for identification is set to the image data currently selected as background information.

Description of Processing Flow

Next, the processing flow in this embodiment will be described. In this example, assuming that a launcher has been activated, the flow starting with menu display of a registered application and ending with selection of a menu item followed by activation of the application will be described.

Figure 14:
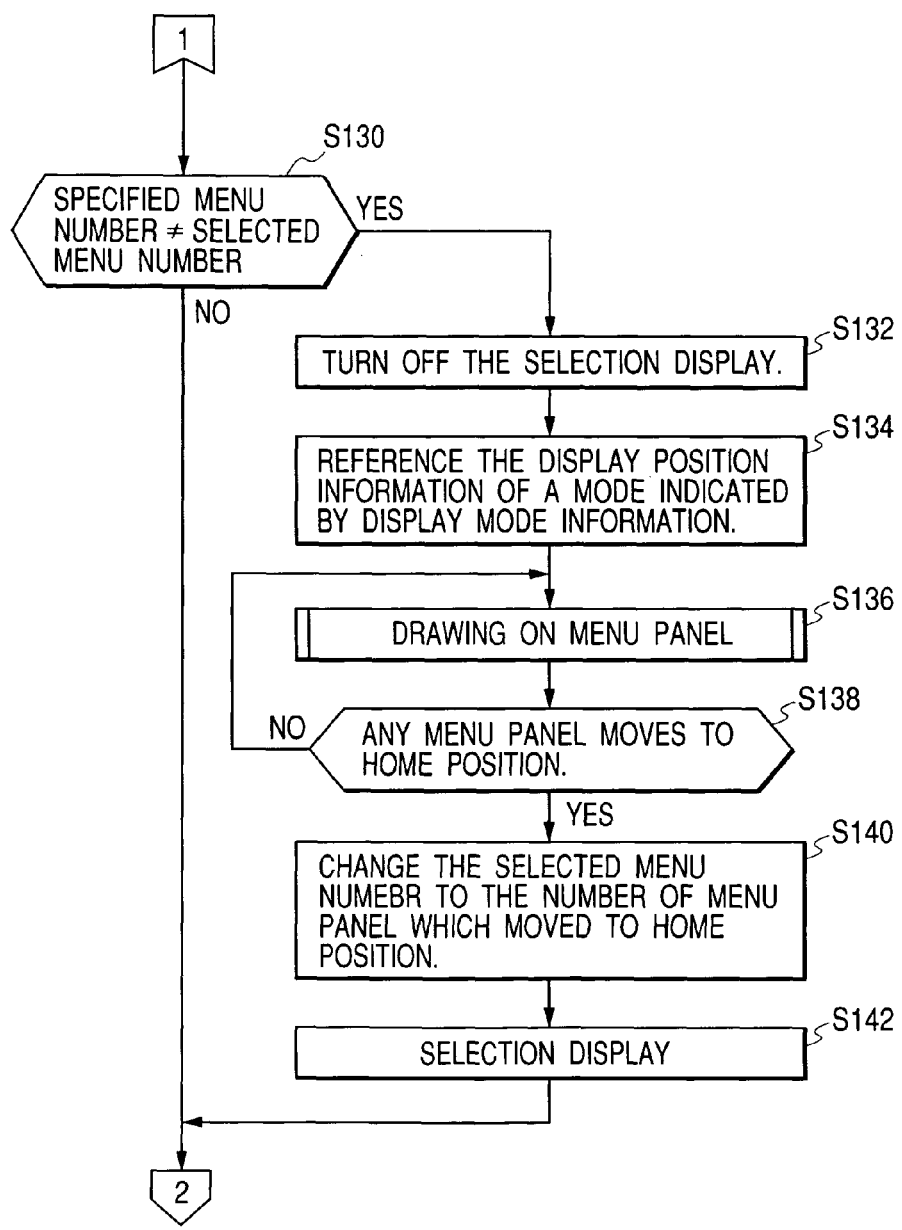
FIG. 14 is a flowchart illustrating a flow of menu moving display.
Figure 15:
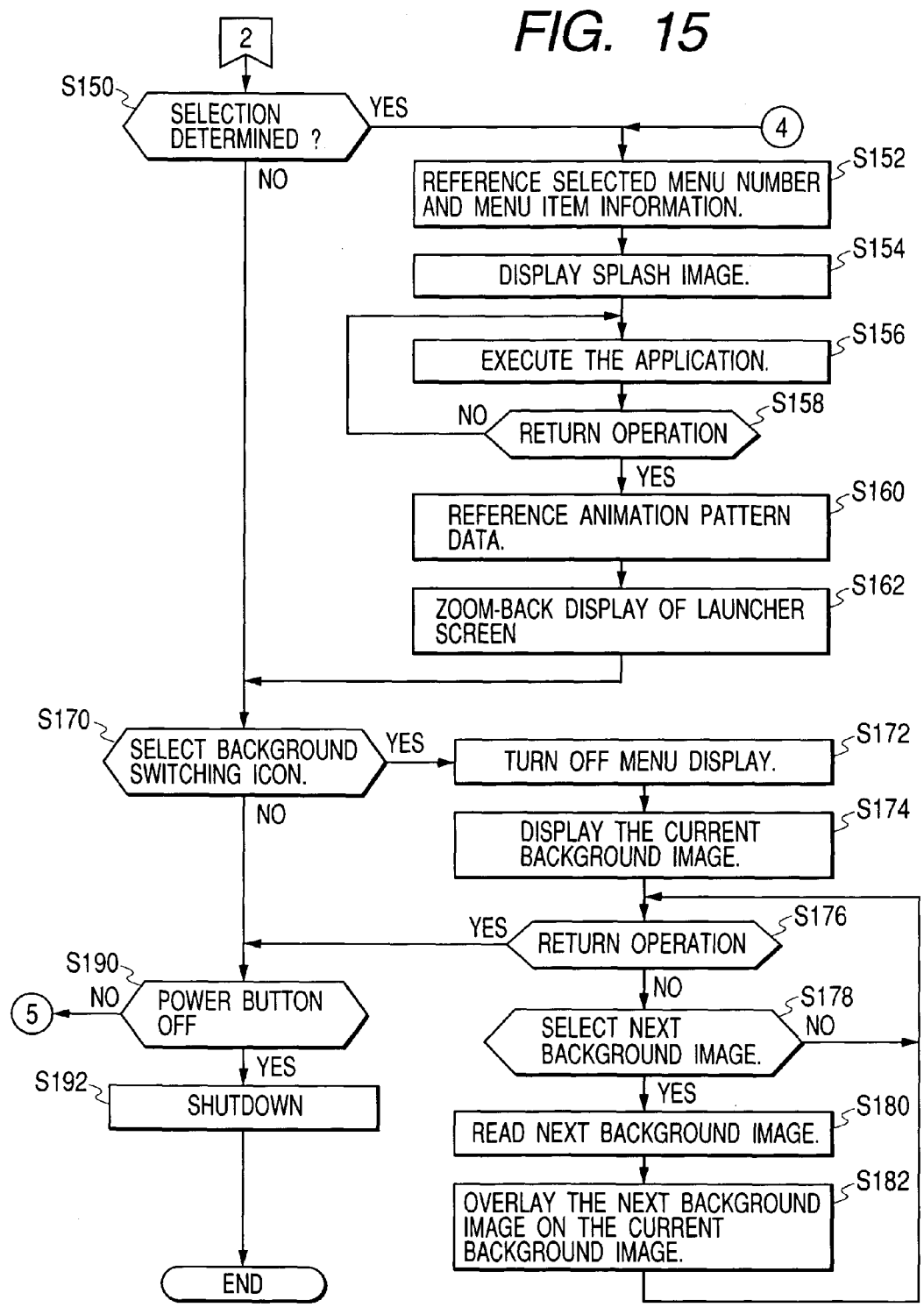
FIG. 15 is flowchart illustrating a flow of selection/determination through activation of an application.

FIGS. 13 through 15 are flowcharts illustrating the flow of processing from selection of an item to activation of an application in this embodiment.

FIG. 13 is a flowchart specifically illustrating the flow of selection of a menu item. As shown in FIG. 13, in case operation is input from the side controller 108 or touch panel 104 YES in step S102), a menu item selector 22 executes selection of a menu item and determines a specified menu number 532.

To be more specific, in the case of an input from the side controller 108, or scroll-up icon 136 or scroll-down icon 138 (YES in step S104), the menu item selector 22 changes the specified menu number 532 in accordance with the input duration (step S110). Except for a hold-down input (NO in step S106), the menu item selector 22 increments the specified menu number 532 by "1" in the input direction in accordance with the specification (step S108).

In the case of a drag operation using the stylus pen 106 (YES in step S112), the menu item selector 22 calculates the travel direction and the travel amount of the drag (step S114) and changes the specified menu number 532 in accordance with the travel direction and the travel amount (step S116).

In case the stylus pen is released from the touch panel 104, a so-called tap-out operation is made (YES in step S118), execution proceeds to activation of an application described later.

In case a tap input is made with the stylus pen 106 (YES in step S120), the menu item selector 22 determines whether any menu panel 134 includes the position coordinates which are tapped on referring to the menu panel position information 523. In case any menu panel 134 is tapped on (YES in step S122), the menu item selector 22 changes the selected menu number 531 to the menu number of the menu panel 134 (step S124). Execution then proceeds to activation of an application described later.

Selection of a menu item is executed in this way by following the steps S104 through S124.

In case the specified menu number 532 has been changed (YES in step S130), the processor 20 performs moving display of the menu, or scrolls through the menu.

FIG. 14 is a flowchart specifically illustrating the flow of moving display of the item. As shown in FIG. 14, a menu display controller 24 turns off the selection display on the menu panel 134 currently in the selection state (step S132). The menu display controller 24 then references the display position information 522 in accordance with display mode information 521 (step S134) to execute drawing processing on the menu panel 134 (step S136).

FIG. 16 is a flowchart illustrating the flow of drawing processing on the menu panel 134. As shown in FIG. 14, the display position setting section 240 determines the direction (upward or downward) in which the menu display is to be moved from the specified menu number 532 and the selected menu number 531 (step S202).

Next, the menu display controller 24 moves the position of the local origin of the menu panel 134 up to the next display position P in the travel direction determined along the travel locuss Lf1 through Lf3 (step S204). To be more specific, for example, the menu display controller 24 divides the angle θx of the current display position P and the rotation angle θx of the next display position P into equal portions by a predetermined number of pitches and moves the position of the local origin. The menu display controller 24 then updates the menu panel position information 523 so that the normal to the menu panel 134 will face the virtual camera C (step S206). By following the steps S302 through S206, arrangement of menu panels 134 in a virtual space is determined.

Then, the camera setting section 245 sets the arrangement of the virtual camera C in the virtual space (step S208). To be more specific, for example, the camera setting section 245 determines the position of the menu panel 134 assumed when the menu panel 134 having the specified menu number 532 is located in the home position. Then, the camera setting section 245 makes a division by the total number of pitches obtained by multiplying the difference between the specified menu number 532 and the selected menu number 531 by the number of pitches, and moves the virtual camera C in units of pitches, same as the movement of the menu panel 134. Similarly, the camera setting section 245 sets the rotation angle θx and the viewing angle δ.

When the position of each menu panel 134 and the position of the virtual camera C have been set, the display form setting section 242 sets the display contents of the menu panel 134. That is, the character drawing section 243 executes scaling of a character to be displayed and the border processing on the character described referring to FIG. 6 based on the distance between the menu panel 134 and the virtual C to set character display (step S210). The display form setting section 242 also sets the size of the icon 130 (step S212). The transparency setting section 344 sets the transparency of the menu panel 134 based on the distance between the menu panel 134 and the virtual camera C, as described referring to FIG. 7 (step S214).

By following the steps S210 through S214, the display contents of the menu panel 134 are set.

The menu display controller 24 executes the steps S202 through S214 for all menu panels 134 (step S216).

When the position coordinates of all menu panels 134 and the virtual camera C and display contents of all menu panels 134 have been set, the image generator 26 generates image data to display the menu screen (step S218). Execution then returns to the flow of FIG. 14.

In FIG. 14, menu drawing processing is executed until any of the menu panels 134 is located in the home position (display position P0) (NO in step S138). In case any of the menu panels 134 is located in the home position (YES in step S138), the selected menu number 531 is changed to the menu number of the menu panel 134 (step S140), and the selection display appears (step S142).

FIG. 15 is a flowchart specifically illustrating the flow of processing from determination of a selected item to activation of an application program and the flow of screen switchover.

As shown in FIG. 15, in case determination of a selected item is input by way of a push on the side controller 108 or a tap using the stylus pen 106 (YES in step S150), the processor 20 references the menu item information 524 in accordance with the selected menu number 531 (step S152) to retrieve the corresponding splash image data 536 and displays the data on the screen (step S154). After that, the processor 20 loads and activates the application (step S156).

In case the application is terminated or a launcher screen is displayed (YES in step S158), the menu display controller 24 references the animation pattern data 540 (step S160) to provide zoom-back display of the menu screen (step S162).

In case the background switching icon 137 is selected (YES in step S170), the processor 20 turns off the menu display (step S172) and displays the current background image on the screen (step S174).

Selection of next background image, for example an input in the upward/downward direction by way of the side controller 108 is made (NO in step S176 then YES in step S178), the processor 20 reads the next background image from the background image data 542 (step S180), then switches over the display image by overlaying the next background image on the current background image in the transient processor 261 (step S182).

In case a return operation is input (for example the escape button 100 is pressed) (YES in step S176), the processor 20 determines the displayed image as a background image.

The processor 20 executes the above processing until the power button 112 is pressed (NO in step S190). When the power button is pressed, the processor 20 executes the shutdown operation and terminates the processing (step S192).

While the desired menu panel 134 is selected on the screen and the selected menu panel 134 is determined then an application is activated in this example, the application may be automatically activated when the desired menu panel 134 has moved to the display position P0 and selected on the screen. To be more specific, a step of comparing the specified menu number 532 with the selected menu number 531 is added before step S142 in FIG. 14. In case the specified menu number 532 is the same as the selected menu number 531, a step of checking the attribute of a registered menu item by referencing the menu item information 524 and a step of proceeding to step S152 (FIG. 15) in case the attribute is an applications are executed.

By following the above steps, menu display and selection processing which is third-dimensional unlike the related art can be provided.

FIGS. 17 and 18 show screens of examples of menu display in the mode "1".

In FIG. 17A, a menu item in the middle of the menu is in the selection state. Menu items preceding and following the item are three-dimensionally represented in arc both in the upward and downward directions in the screen. Dragging with the stylus pen 106 in the upward direction to rotate the menu display arc clockwise causes the menu panel 134 to appear while rotating clockwise along the arc, for example, as shown in FIG. 17B. In FIG. 17B, the last menu item is in the selection state. Menu items preceding this menu item are represented in arc in the upward direction in the screen.

Referring to FIG. 17, selection display is given at the bottom of the screen thus allowing efficient use of the entire screen. Unlike FIG. 17A, menu items are not displayed in arc in the downward direction in the screen so that the user can visually recognize that the last menu item is selected.

Similarly, in FIG. 18A, a menu item in the middle of the menu is in the selection state. Dragging with the stylus pen 106 in the downward direction provides a display screen like one in FIG. 18B.

FIG. 19 and FIG. 20 show screens of examples of menu display in the mode "2".

In FIG. 19A, a menu item in the middle of the menu is in the selection state. Menu items preceding and following the item are three-dimensionally represented in one-point perspective in the upward direction in the screen. Dragging with the stylus pen 106 in the upward direction so as to slide the menu display in the upward direction causes the menu panel 134 to move in the upward direction along the one-point perspective, for example, as shown in FIG. 19B.

Similarly, In FIG. 20A, a menu item in the middle of the menu is in the selection state. Dragging with the stylus pen 106 in the downward direction provides such a display screen as shown in FIG. 20B. Unlike FIG. 20A, the menu panel 134 is not displayed in the upper area of the menu panel 134. The user takes only a little time to visually recognize which menu item is in the selection state.

While an embodiment of the invention has been described hereinabove, the invention may be applied to other embodiments. Components may be added or changed as appropriate without departing from the spirit of the invention.

For example, menu items include a folder and a document as well as an application software program.

For example, concerning the display position of the menu panel 134, the user may set the home position. To be more specific, for example, the user may, as appropriate, the value of the display position P0 in the display position information 522 or initial setting of the camera setting information 530.

While the display position P is predetermined in the example, the position coordinates of the menu panels 134 may be corrected so that the menu panels 134 will not overlap each other in proximity of the virtual camera C before drawing on the display screen, after the menu panels 134 have been arranged equidistantly. To be more specific, for example, a step of determining, by way of the display position setting section 240, the overlapping of the menu panels 134 in the screen V for an appropriate number of display positions P adjacent to the display position P0, after the position coordinates of the destination of the menu panel 134 is calculated (step S204 in FIG. 16) and the arrangement of the virtual camera is determined (step S208 in FIG. 16). In case overlapping is found, the menu display controller 24 changes, as appropriate, the position coordinates of the menu panels 134.

Movement of the menu panel 134 is not limited to a method for moving a plurality of menu panels 134 separately. For example, a transparent virtual entity is set by the menu display controller 24 and the menu panels 134 are arranged on the virtual entity to set a parent-child relationship. By moving the virtual entity, the plurality of menu panels 134 are moved at a time.

Figure 21:
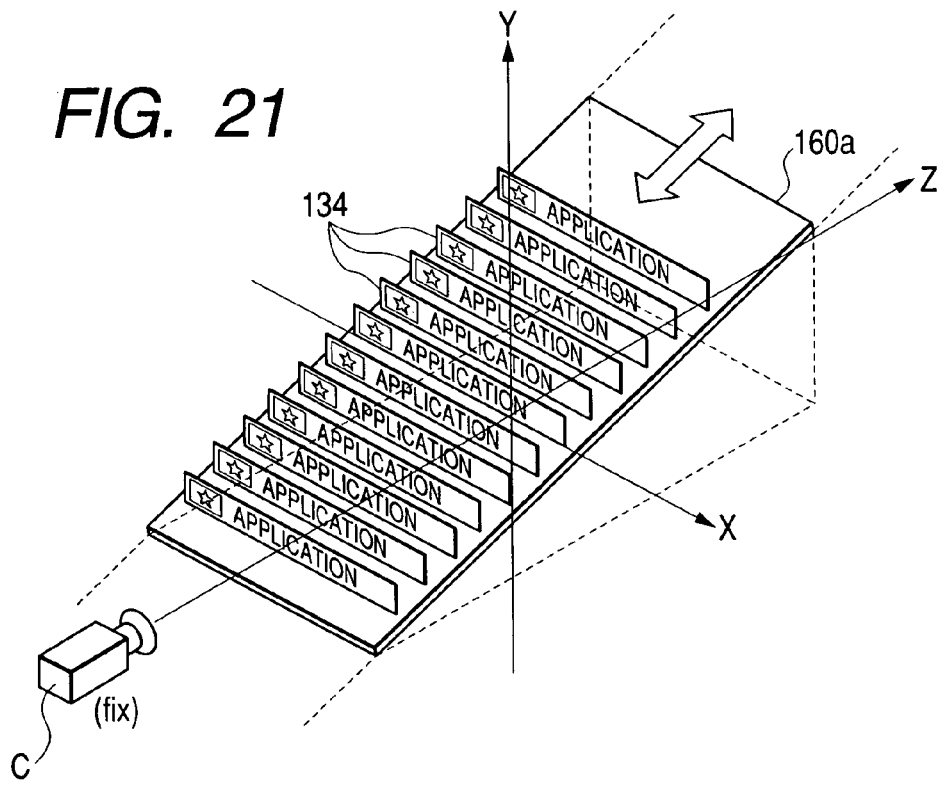
FIG. 21 is a conceptual drawing illustrating an example where menu panels are arranged on a virtual entity.
Figure 22:
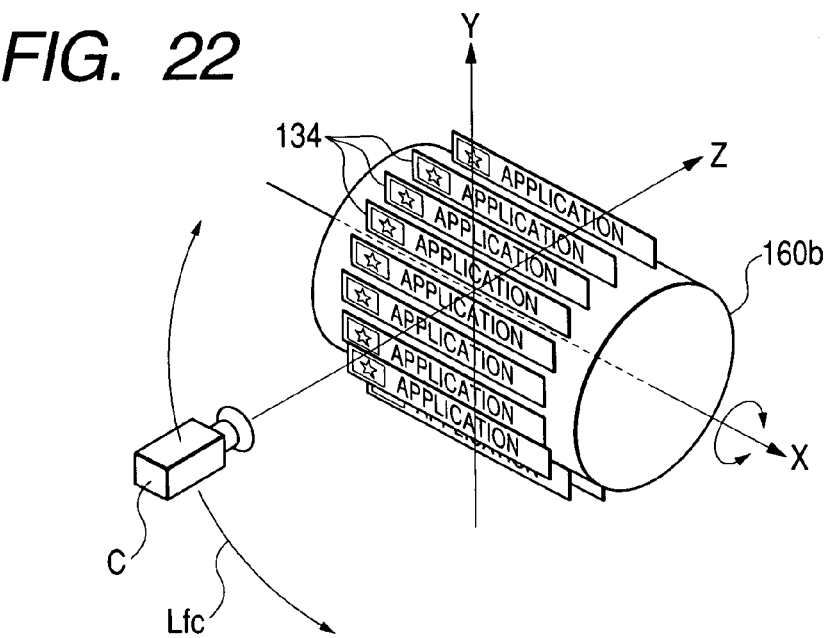
FIG. 22 is a conceptual drawing illustrating an example where menu panels are arranged on a virtual entity.
Figure 23:
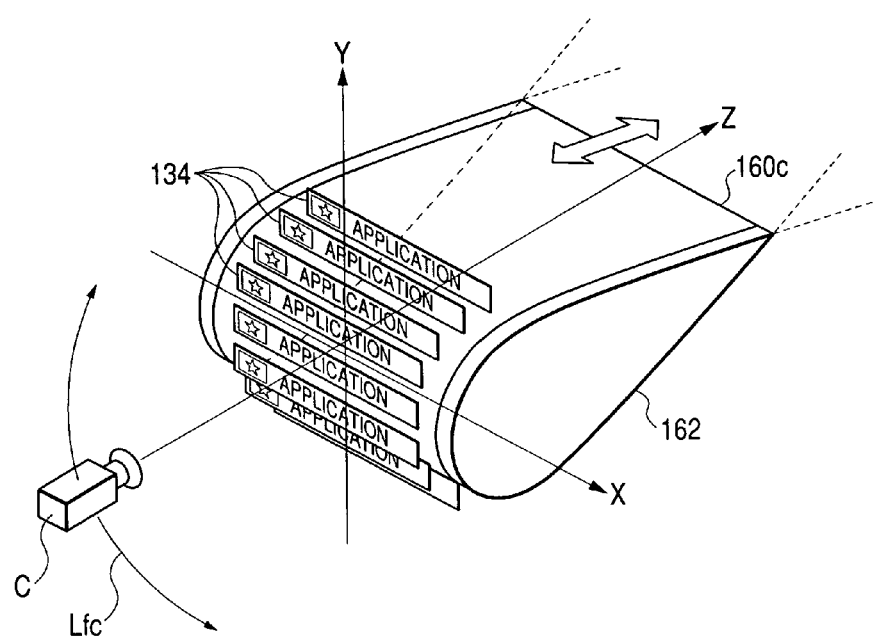
FIG. 23 is a conceptual drawing illustrating an example where menu panel are arranged on a virtual entity.

FIGS. 21 through 23 are conceptual drawings illustrating examples of arrangement of menu panels 134 on a virtual entity. For example, in FIG. 21, a virtual entity 160a has a shape of a flat plate and the menu panels 134 are arranged in the travel direction (the arrow in the figure) of the virtual entity 160a, thus providing a menu display similar to the mode "2".

In FIG. 22, a virtual entity 160b is a body of rotation and the menu panels 134 are arranged on the rotational face or lateral face of the virtual entity 160b in the direction of rotation of the virtual entity 160b. This provides a menu display similar to the mode "1".

In FIG. 23, a virtual entity 160c has a shape of a sheet and is arranged on a virtual base entity 162 which is another virtual entity. The virtual entity 160c is sequentially deformed in accordance with the shape of the virtual base entity 162 and the menu panels 134 are arranged in arranged in the travel direction (the arrow in the figure) on the virtual entity 160c. Moving the virtual entity 160c along the surface of the virtual base entity 162 in a sliding way provides a menu display similar to the mode "1".

While the menu display arrangement is made in a column in this example, the menu display arrangement may be made in a plurality of columns as well. For example, a sphere may be set in a virtual space and a menu display in a plurality of lines may be provided along the sphere. In this case, for example, a left-scroll icon and a right-scroll icon are newly provided on the display screen to rotate the menu display lines counterclockwise or clockwise, as well as the scroll-up icon 136 and the down-scroll icon 138. Further, dragging the stylus pen 106 rightward or leftward causes the lines of menu display arrangement to be rotated clockwise or counterclockwise, same as the scroll operation through a drag with the stylus pen 106 rightward or leftward. A menu item is selected wile the lines of menu display are slid upward or downward, or rightward or leftward along the sphere.

Setting of transparency is not limited to setting in accordance with the distance between the menu panel 134 to the virtual camera C but may be made in accordance with, for example, the difference in the lightness of a background image.

To be more specific, for example, after the transparency setting section 224 has set the transparency in accordance with the distance between the menu panel 134 to the virtual camera C, an weight amount for correcting the transparency is set to correct the transparency based on the lightness of the background image and the menu item displayed on the menu panel 134 (for example the lightness of the icon 130 and the menu name 132). For example, in case the lightness of the background is low (that is, dark) and the lightness of the information display entity is high (that is, bright), the weight amount is set to raise the transparency. In case the lightness of each of the background and the information display entity is high, the weight amount is set so as to reduce the transparency. This avoids a state where the menu panel 134 is more prominent than the desired appearance against the background or a case where the menu panel 134 is less visible against the background.

According to the invention, an information display entity is three-dimensionally arranged in a virtual space and the information display entity always faces a virtual camera. This efficiently displays more information display entities on the display screen. It is possible to provide easy-to-see information displayed on the information display entity at any time, thus allowing easy identification of an information display entity even in a relatively small screen.

Second Embodiment

A second embodiment of the invention will be described referring to drawings.

The following descriptions assumes a portable information terminal (hereinafter referred to as the PDA) as an example, although the invention may be applied elsewhere.

Figure 24A:
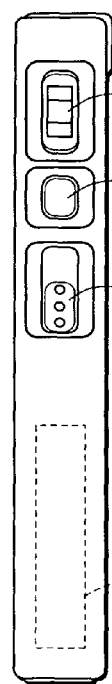
FIGS. 24A and 24B are external views of a PDA according to the second embodiment of the invention.
Figure 24B:
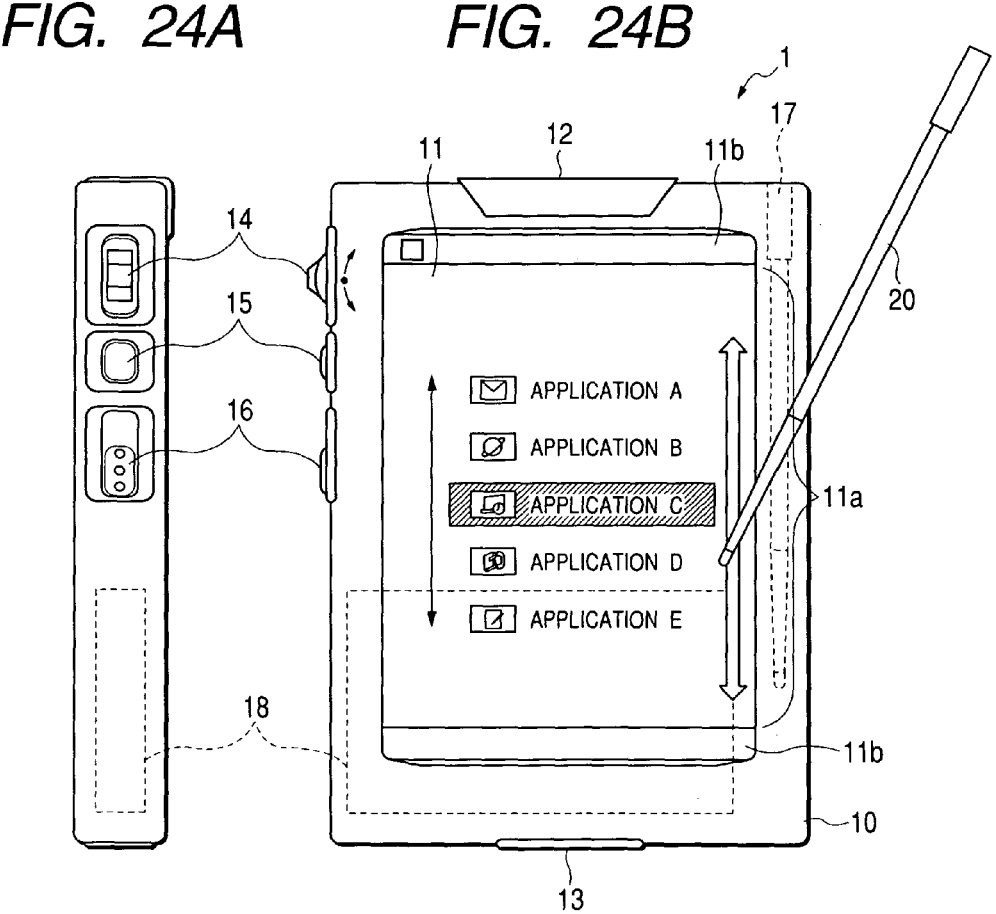

FIG. 24 is an external view of a PDA1 of this embodiment. FIG. 24A shows the side view and FIG. 24B shows the front view, respectively.

According to FIG. 24, the PDA1 comprises an enclosure 10 in the shape of an approximate rectangular parallelepiped and a stylus pen 20.

The enclosure 10 is equipped with an LCD panel 11, a CompactFlash® card slot 12, an interface connector 13, a side controller 14, an escape key 15, and a power key 16. In the enclosure 10 is provided a stylus pen storage unit 17. These components except the stylus pen storage unit 17 are connected to a control unit 18 housed in the enclosure 10 and controlled by the control unit 18.

The LCD panel 11 comprises an LCD display panel integral with a transparent touch panel overlaid on the LCD display panel. The LCD panel 11 provides a display screen such as a menu screen 30 described later on the LCD display panel in accordance with a display control signal from the control unit 18. The LCD panel 11 also detects the position on the transparent touch panel indicated (pressed) by the stylus pen 20, and outputs as an operation signal the detected position signal to the control unit 18.

The display screen which appears on the LCD panel 11 comprises a main display area 11a for selectively displaying various screens such as a main screen and a sub display screen 11b for displaying switching indication icons for various screens displayed in the main display area 11a.

The Compact Flash® card slot 12 is a connector for inserting an external information storage medium such as a memory card and performing read/write of data from/to the external information storage medium inserted.

The interface connector 13 is an interface for performing data communications with an external device by way of a wireless/wired system.

The side controller 14 is a switch for the user to input various instructions. In case an "upward" operation indicated by an arrow 14a, a "downward" operation indicated by an arrow 14b, or a "push" operation toward the inside of the enclosure 10 is made, the side controller 14 outputs an operation signal corresponding to the operation to the control unit 18.

The escape key 15 is a switch for the user to input various instructions. In case a "push" operation toward the inside of the enclosure 10 is made, the side controller 14 outputs an operation signal corresponding to the operation to the control unit 18.

The power key is used to input an instruction to turn ON/OFF the power of the PDA1. In case the power key 16 is slid upward along the lateral face of the enclosure 10, the side controller 14 outputs an operation signal corresponding to the operation to the control unit 18.

Figure 25:
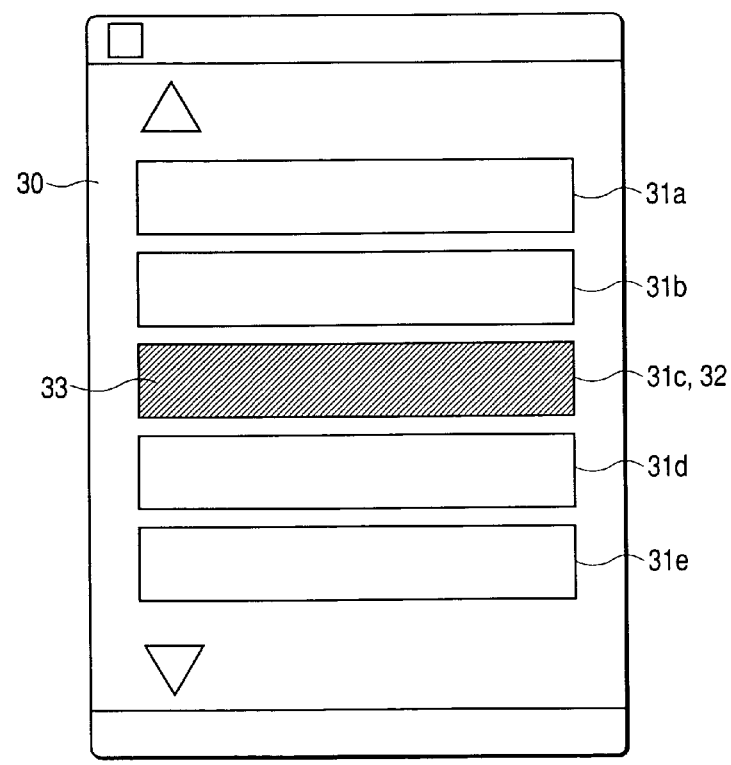
FIG. 25 shows a structure of a menu screen.

FIG. 25 shows a configuration of a menu screen 30 displayed in the main display area 11a of the LCD panel 11.

According to FIG. 25, the menu screen 30 comprises five menu display areas 31a through 31e (hereinafter comprehensively referred to as the "menu display area 31").

The menu display area 31 displays a menu display entity as an information display entity. For example, each menu display area 31a through 31e displays a menu display entity as shown in FIG. 25.

The "menu display entity" comprises an icon specifying an application and a menu name. In the following description, the menu name of each menu display entity is used to identify the menu entity.

A menu display area 31c is also used as a "selection candidate display area 32". In the selection candidate display area 32, a focus 33 (cross-hatching) is shown. The menu display entity displayed in the area is a "candidate for selection".

FIGS. 26A through 26C show examples of the menu screen 30.

In FIG. 26A, the menu display area 31a displays "Application B", the menu display area 31b displays "Application C", the menu display area 31c displays "Application D", the menu display area 31d displays "Application E", and the menu display area 31e displays "Application F", respectively.

In the selection candidate display area 32, that is, in the menu display area 31c, the focus 33 is overlaid on Application D. The Application D is a candidate for selection.

In the menu screen 30, dragging the stylus pen 20 in the upward direction scrolls through the menu display entities in the menu screen 30 as shown in FIG. 26B.

In FIG. 26B, the menu display area 31a displays "Application D", the menu display area 31b displays "Application E", the menu display area 31c displays "Application F", the menu display area 31d displays "Application G", and the menu display area 31e displays "Application H", respectively.

The menu display entities on the screen are scrolled though in the upward direction by two rows.

On the menu display entity displayed in the selection candidate display area 32, that is, on Application F, is overlaid the focus 33. The Application F is a candidate for selection.

Dragging with the stylus pen 20 refers to an operation (including standstill state) of sliding the stylus pen 20 on the LCD panel 11 with the tip of the stylus pen 20 in contact with the LCD panel 11.

In FIG. 26B, further dragging in the upward direction further scrolls through the menu entities on the screen in the upward direction. As shown in FIG. 26C, when the lowermost menu display entity (Application K in the figure) reaches the selection candidate display area 32, the scroll comes to a halt.

In FIG. 26C, the menu display area 31a displays "Application I", the menu display area 31b displays "Application J", and the menu display area 31c displays "Application K", respectively.

On the menu display entity displayed in the selection candidate display area 32, that is, on Application K, is overlaid the focus 33. The Application K is a candidate for selection.

While a drag is made in the upward direction in FIGS. 26A through 26C, the same applies to a drag in the downward direction.

That is, as shown in FIG. 27A, dragging in the downward direction scrolls through the menu display entities in the downward direction. As shown in FIG. 27B, when the uppermost menu display entity (Application A in the figure) reaches the selection candidate display area 32, that is, the menu display area 31c, the scroll comes to a halt.

Figure 31:
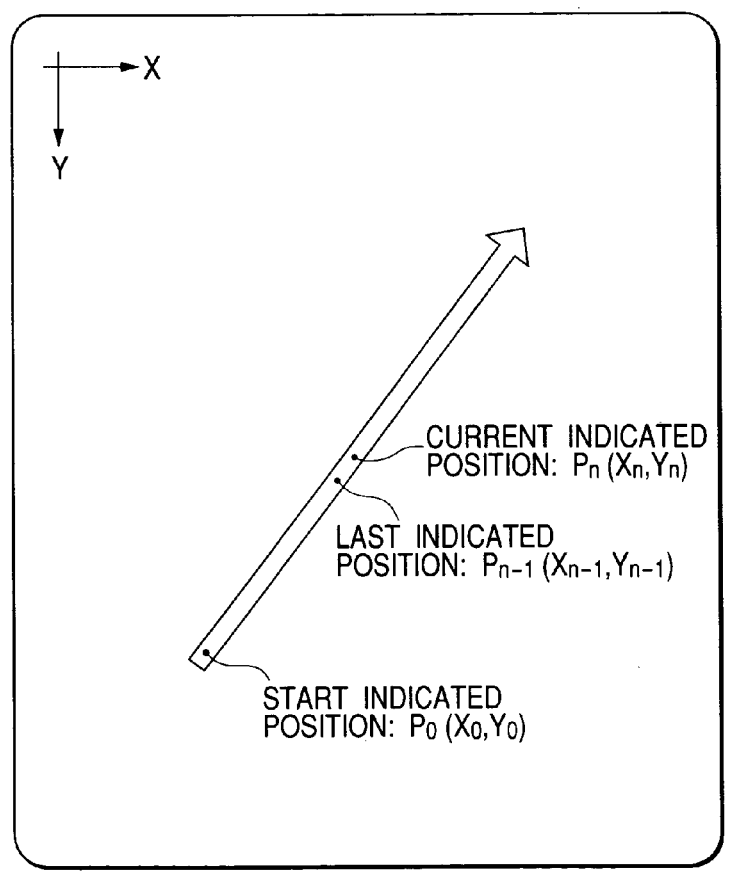
FIG. 31 illustrates a drag input with a stylus pen.

While the drag operation is made in the rightmost area of the menu screen 30 for clarity in FIGS. 26A through 26C and FIGS. 27A and 27B, the drag operation is allowed across the menu screen 30 as shown in FIG. 31 in practice.

Figure 28:
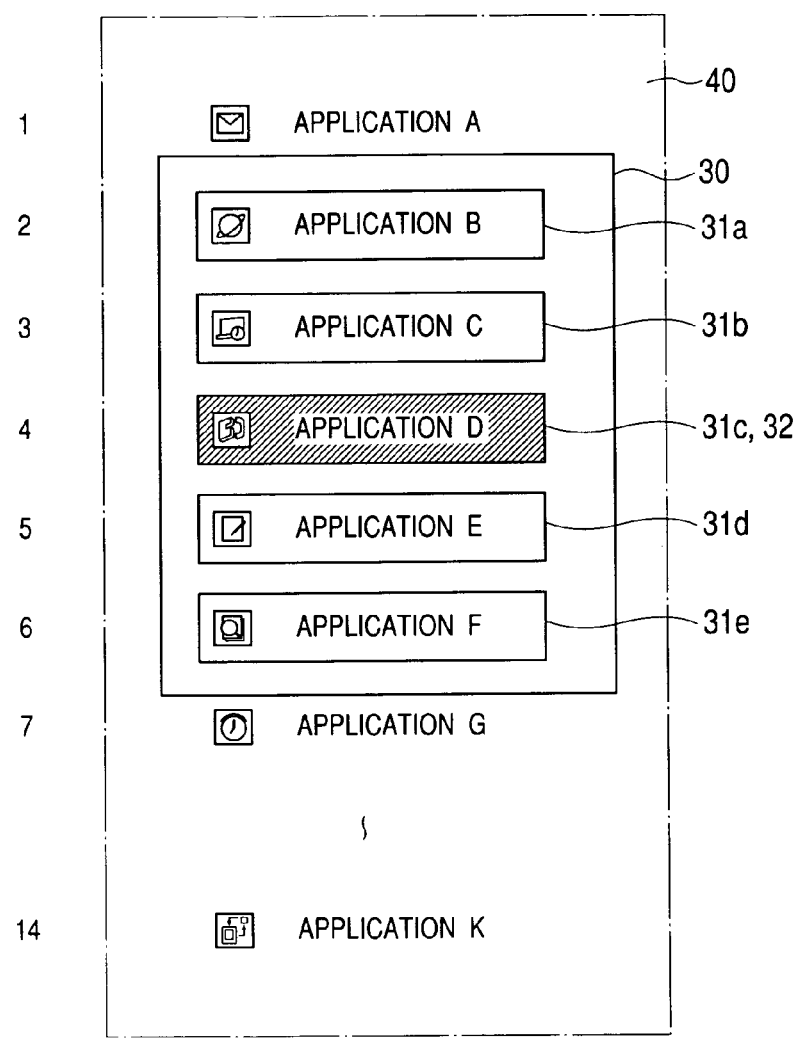
FIG. 28 illustrates the concept of scroll.

FIG. 28 illustrates the concept of scrolling through menu display entities.

In FIG. 28, the concept of scrolling through menu display entities on the menu screen 30 is illustrated with a menu display entity group 40 and the menu screen 30.

The menu display entity group 40 refers to a plurality of menu display entities arranged in a column in a virtual plane in accordance with menu numbers assigned to respective menu display entities.

The menu numbers refer to numbers to identify the plurality of menu display entities and are serial numbers from "1" to "N" (total number of the menu display entities).

Among the menu display entities in the menu display entity group 40, a menu display entity matching the menu display area 31 of the menu screen 30, to be more specific, five menu display entities whose menu numbers are in succession are displayed in the menu screen.

The menu display entity group 40 may be moved in the upward/downward direction in the screen. The menu screen 30 is arranged in a fixed location. As the menu display entity group 40 moves in the upward/downward direction, the menu display entities matching the menu display area 31 of the menu screen 30 changes. Accordingly, the menu display entities in the menu screen 30 are scrolled in the same direction as that of the menu display entity group 40.

The above scroll is executed in accordance with two parameters, the scroll direction and the scroll velocity v.

The scroll direction is the scroll direction of the menu display entities in the menu screen 30, that is, the direction of travel of the menu display entity group 40, either "upward", "downward" or "N/A".

The scroll velocity v us a velocity at which the menu display entities in the menu screen are scrolled in the above scroll direction, that is, a velocity at which the menu display entity group 40 is scrolled in the above scroll direction. To be more specific, the scroll velocity v is represented in the number of rows of the menu display entities scrolled per unit time.

For example, as shown in FIG. 26, in case the areas where Application D is displayed changed from the menu display area 31a to the menu display area 31c per unit time, the scroll velocity is "2".

The scroll direction and the scroll velocity v are determined as described below.

Figure 29:
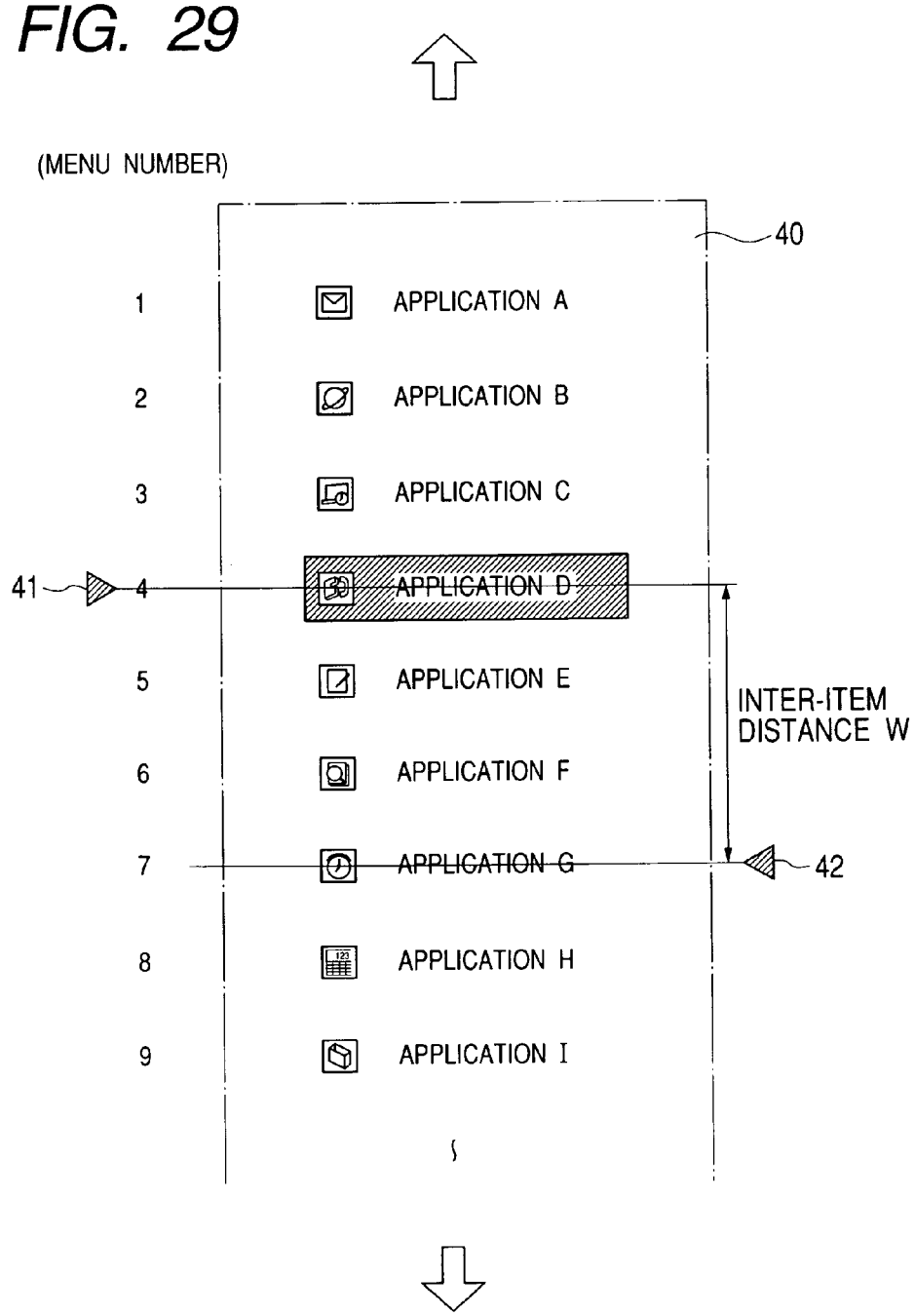
FIG. 29 illustrates scroll directions and calculation of a scroll velocity v.

FIG. 29 illustrates the scroll direction and the scroll velocity v.

In FIG. 29, the scroll direction and the scroll velocity v are determined by the menu display entity indicated by a current position pointer 41 and a destination pointer 42.

The current position pointer 41 indicates the menu display entity as a candidate for selection, that is, the menu display entity displayed in the selection candidate display area 32. Thus, the menu display entity indicated by the current position pointer 41 changes in accordance with the scroll, that is, the movement of the menu display entity group 40.

The destination pointer 42 indicates the menu display entity to be determined as a candidate for selection, that is, the menu display entity to be displayed in the selection candidate display area 32.

The menu display entity group 40 moves so that the menu display entity indicated by the destination pointer 42 will be displayed in the selection candidate display area 32, or to be more specifically, so that the menu display entity indicated by the current position pointer 41 will match the menu display entity indicated by the destination pointer 42.

In this figure, the current position pointer 41 indicates Application D and the destination pointer 42 Application G, respectively. Thus the scroll direction is "upward" and the menu display entity group 40 moves in the upward direction.

In this practice, the menu display entity group 40 moves at a scroll velocity corresponding to the inter-item distance w.

The inter-item distance w indicates the distance between the menu display entity indicated by the current position pointer 41 and the menu display entity indicated by the destination pointer 42. To be more specific, the inter-item distance w is represented in the difference between the menu number of the menu display entity indicated by the current position pointer 41 and the menu number of the menu display entity indicated by the destination pointer 42. Note that the inter-item distance w is an integer of 0 or more.

In the figure, the menu number of the menu display entity indicated by the current position pointer 41 is "4" while menu number of the menu display entity indicated by the destination pointer 42 is "7". Thus, the inter-item distance w is "3".

The scroll velocity v is given by the following expression based on the inter-item distance w:

$$v = f1(w) \tag{1}$$

where $w \geqq 0$, $v \geqq 0$.

According to this expression, the travel velocity v is given by a function f1 whose variable is the inter-item distance w. The function f1 may be any function but desirably a function where the scroll velocity v increases as the inter-item distance w increases. Conversely, in case the inter-item distance w decreases as a result of scroll operation, the resulting scroll velocity becomes lower, which will give the user a feel of a smooth halt.

Figure 30:
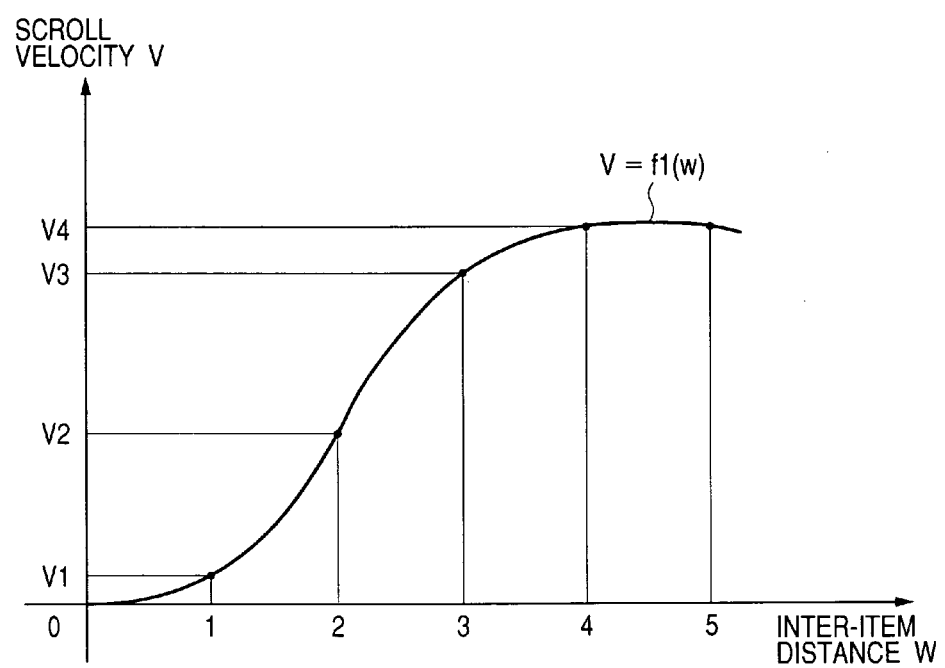
FIG. 30 shows the relationship between an inter-item distance w and the scroll velocity v.

Thus, the function f1 shown in FIG. 30 is adopted as the function f1.

FIG. 30 shows a relationship between the inter-item distance w and the scroll velocity v (function f1). In FIG. 30, values of the inter-item distance w and values of the scroll velocity v are laid off as abscissas and ordinates, respectively.

According to FIG. 30, the scroll velocity v increases with an increase in the inter-item distance w. When the inter-item distance w reaches "4", the scroll velocity v becomes "v4". Above this point, the scroll velocity v may be the constant value "v4" irrespective of the value of inter-item distance w.

The menu display entity indicated by the destination pointer 42 gradually changes with a drag by the stylus pen 20.

FIG. 31 shows the drag operation using the stylus pen 20. In this example, the menu screen 30 as an input screen follows the X-X Cartesian coordinate system whose origin is at the upper left corner of the screen.

In FIG. 31, the coordinate values of the indicated position (hereinafter referred to as the "start indicated position" as appropriate) P0 assumed when the user caused the stylus pen 20 to come in contact with the LCD panel 11 (hereinafter referred to as "tap-in") and started the drag operation are (x0, y0). The coordinate values of the indicated position (hereinafter referred to as the "current indicated position" as appropriate) Pn at time tn are (xn, yn). The coordinate values of the indicated position (hereinafter referred to as the "last indicated position" as appropriate) Pn−1 at time tn−1 preceding time tn by Δt are (xn−1, yn−1).

The direction of drag (hereinafter simply referred to as the "drag direction") at time tn is determined based on whether yn is greater than, equal to, or smaller than yn−1. As shown in FIG. 32, the drag direction is "downward" in case yn>yn−1, "upward" in case yn<yn−1, and "N/A" in case yn=yn−1.

Thus, for example in FIG. 31, yn<yn−1 and the drag direction at time tn is "upward".

Based on the drag direction, the travel direction of the destination pointer 42 is given as shown in FIG. 33.

While a drag operation is made in the rightmost area of the menu screen for clarity in other drawings, the drag operation is allowed across the menu screen 30 as shown in FIG. 8 in reality.

FIG. 33 shows a relationship between the drag direction and the travel direction of the destination pointer 42. According to FIG. 33, the travel direction of the destination pointer 42 is "upward" in case the drag direction is "downward", "downward" in case the drag direction is "upward", and "N/A" in case the drag direction is "N/A".

According to FIG. 32, the travel distance Δy of drag in the period from time tn−1 to time n, that is, Δt, is given by the following expression:

$$\Delta y = |yn - yn - 1| \quad (2)$$

where $\Delta y \geq 0$.

According to this expression, the travel distance Δy of drag is given by the displacement in the direction of the Y axis at the time interval Δt.

Based on the travel distance Δy of drag, the travel distance Δw of the destination pointer 42 is given by the following expression:

$$\Delta w = f2(\Delta y) \quad (3)$$

where $\Delta w \geq 0$.

According to this expression, the travel distance Δw of the destination pointer 42 is given by the function whose variable is the travel distance Δy of drag. The function f1 may be any function but desirably a function where the travel distance Δw of the destination pointer 42 increases as the travel distance Δy of drag increases.

Figure 34:
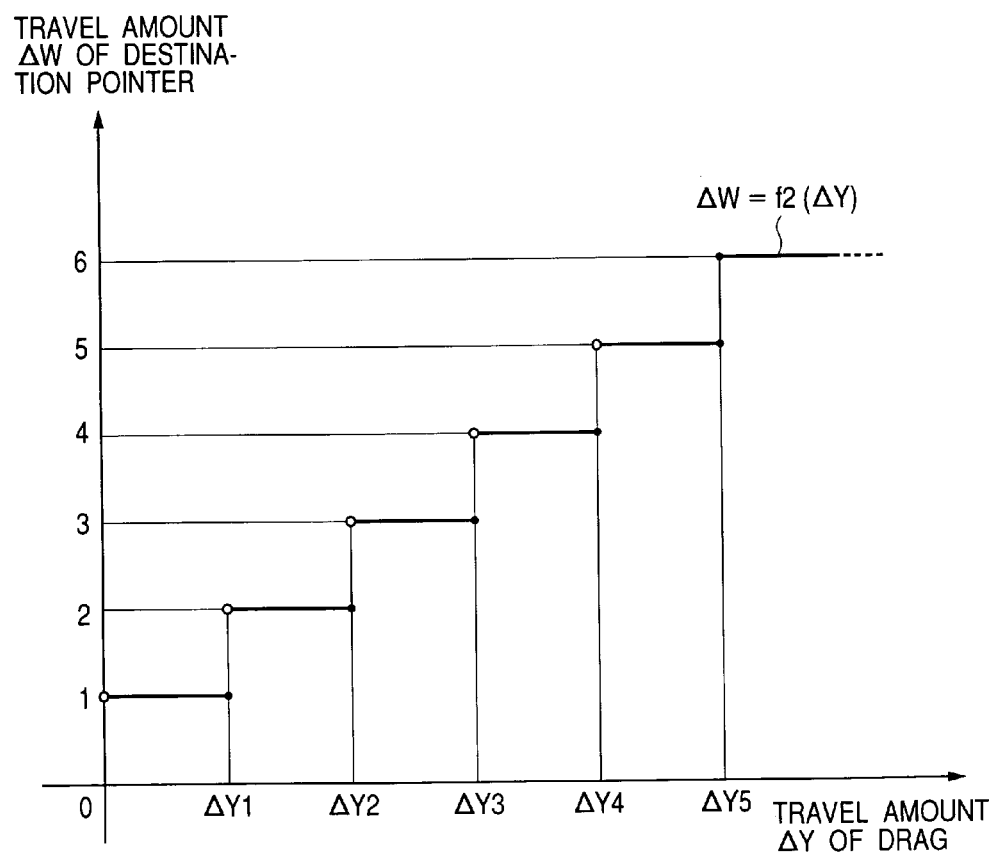
FIG. 34 shows the relationship between a drag travel distance Δy and the travel distance Δw of the destination pointer.

Thus, the function f2 shown in FIG. 34 is adopted as the function f2.

FIG. 34 shows a relationship between the travel distance Δy of drag and the travel distance Δw of the destination pointer 42 (function f2). In FIG. 34, values of the travel distance Δy of drag and values of the travel distance Δw of the destination pointer 42 are laid off as abscissas and ordinates, respectively.

According to FIG. 34, the travel distance Δw of the destination pointer 42 increases with an increase in travel distance Δy of drag. When the travel distance Δy of drag reaches "Δy5", the travel distance Δw of the destination pointer becomes "6". Above this point, the travel distance Δw is a constant value "6" irrespective of the value of the travel distance Δy.

The expression (3) may be replaced with the following expression:

$$\Delta w = f2(\Delta y) + k \times (\Delta y / \Delta t) \quad (3)$$

where k is a constant.

According to this expression, in the course of calculating the travel distance Δw, a change in the travel distance Δy of drag, that is, a velocity component of the drag can be added. This makes it possible to obtain the scroll velocity reflecting the influence of the drag velocity.

In this way, based on the travel direction and the travel distance Δw of the destination pointer 42 given in accordance with the drag, the destination pointer 42 moves and the menu display entity indicated by the destination pointer 42 changes.

Figure 35:
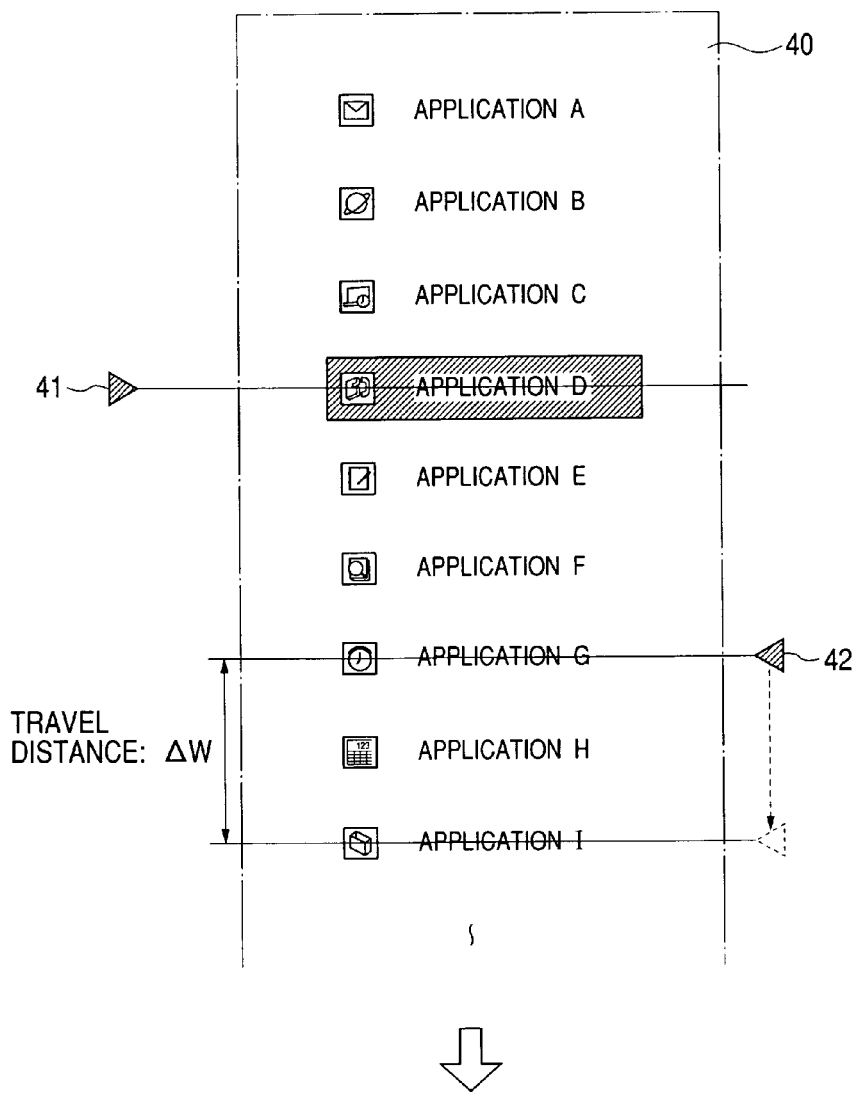
FIG. 35 illustrates the movement of the destination pointer.

FIG. 35 shows how the menu display entity indicated by the destination pointer 42 changes. According to FIG. 35, the destination pointer 42 indicates Application G. Assuming that "downward" and "2" are given as the travel direction of the destination pointer 42 and the travel distance Δw of the destination pointer 42 respectively, the destination pointer 42 moves in the downward direction by two rows in the figure. The menu display entity indicated by the destination pointer 42 changes from Application G to Application I.

In this way, the destination pointer 42 moves by the number of rows corresponding to the travel distance Δw in a given travel direction. The menu display entity indicated by the destination pointer 42 changes by the number of rows corresponding to the travel distance Δw in the given travel direction.

While scroll through menu display entities displayed in the menu screen 30 is made by way of a drag with the stylus pen 20, operation input by way of the side controller 14 is also allowed.

To be more specific, in accordance with the input of "upward/downward" by way of the side controller 14, the menu display entity indicated by the destination pointer 42 changes as described below.

When an input is made in the "upward/downward direction" by way of the side controller 14, the travel direction of the destination pointer 42 is given as shown in FIG. 13.

Figures 36, 37:
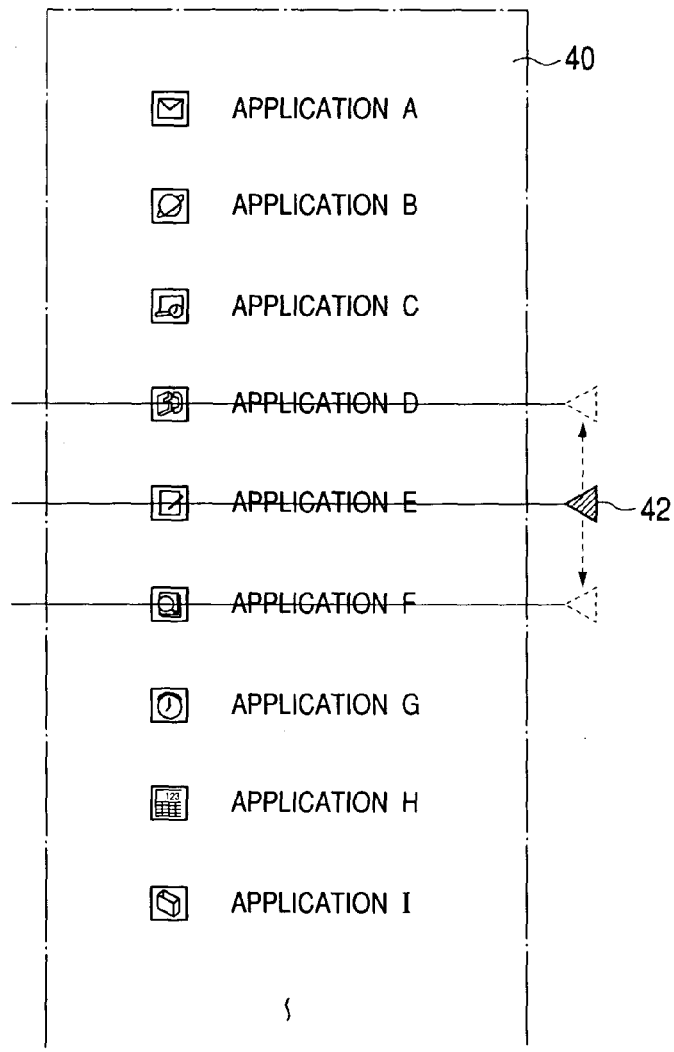
FIG. 36 shows the relationship between the input direction of a side controller and the travel direction of the destination pointer.
FIG. 37 illustrates the movement of the destination pointer.

FIG. 36 shows a relationship between the input direction by way of the side controller 14 and the travel direction of the destination pointer 42. According to FIG. 36, in case the input direction by way of the side controller 14 is "downward", the travel direction of the destination pointer 42 is "upward" while in case the input direction by way of the side controller 14 is "upward", the travel direction of the destination pointer 42 is "downward".

Based on the travel direction of the destination pointer 42 given in this way, the menu display entity indicated by the destination pointer 42 changes as shown in FIG. 37.

FIG. 37 shows how the menu display entity indicated by the destination pointer 42 changes in accordance with the operation input by way of the side controller 14. According to FIG. 37, the destination pointer 42 indicates Application E.

When an input is made in the "downward direction" by way of the side controller 14, the destination pointer 42 moves in the downward direction by one row. The menu display entity indicated by the destination pointer 42 changes from Application E to Application F.

When an input is made in the "upward direction" by way of the side controller 14, the destination pointer 42 moves in the upward direction by one row. The menu display entity indicated by the destination pointer 42 changes from Application E to Application D.

In this way, when an input is made in the "upward/downward direction" by way of the side controller 14, the destination pointer 42 moves in the same direction as the input direction by one row. The menu display entity indicated by the destination pointer 42 changes by one row in the direction opposite to the input direction.

When a hold-down input is made in the "upward/downward direction", the menu display entity indicated by the destination pointer 42 changes as described below.

The "hold-down input" refers to a continuous input in the "upward/downward direction" by way of the side controller 14. To be more specific, it refers to an operation of holding down the side controller 14 in the "upward direction" or "downward direction" for at least a predetermined period.

FIG. 38 shows how the menu display entity indicated by the destination pointer 42 changes in accordance with hold-down of the side controller 14. In this practice, the travel direction of the destination pointer 42 follows the relationship in FIG. 36.

In FIG. 38, the destination pointer 42 indicates Application E. According to FIG. 38A, holding down the side controller 14 in the "upward direction" causes the destination pointer 42 to move continuously in the upward direction. When hold-down operation of the side controller 14 is terminated, the destination pointer 42 halts. The menu display entity indicated by the destination pointer 42 changes from Application E to Application C.

According to FIG. 38B, holding down the side controller 14 in the "downward direction" causes the destination pointer 42 to move continuously in the downward direction. When hold-down operation of the side controller 14 is terminated, the destination pointer 42 halts. The menu display entity indicated by the destination pointer 42 changes from Application E to Application I.

Movement of the destination pointer 42 caused by hold-down operation of the side controller 14 is determined in accordance with the duration of the hold-down operation.

Figure 39:
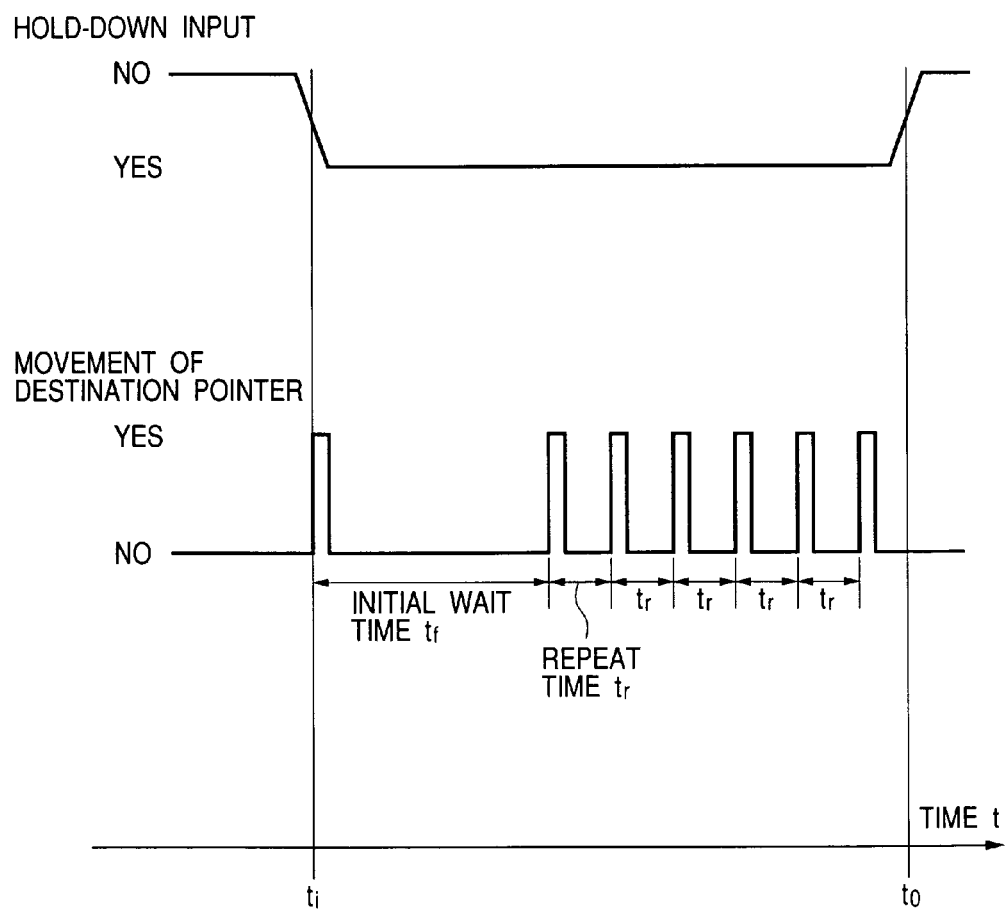
FIG. 39 illustrates the movement timing of the destination pointer.

FIG. 39 shows a relationship between the hold-down operation of the side controller 14 and the movement of the destination pointer 42. In FIG. 39, the avis of abscissa represents the time, presence/absence of hold-down operation of the side controller 14, that is, whether an input in the "upward/downward direction" is continued is shown in the upper area of the figure, and presence/absence of the movement of the destination pointer 42 is shown in the lower area of the figure, respectively.

According to FIG. 39, when hold-down operation of the side controller 14 is initiated at time ti, the destination pointer 42 moves in the travel direction corresponding to the input direction by one row. The menu display entity indicated by the destination pointer 42 changes in the travel direction by one row.

Next, when an initial wait time Tf has elapsed, the destination pointer 42 further moves in the travel direction by one row. The menu display entity indicated by the destination pointer 42 further changes in the travel direction by one row.

After that, each time the repeat time Tr has elapsed, the destination pointer 42 moves in the travel direction by one row. The menu display entity indicated by the destination pointer 42 changes in the travel direction by one row each time.

When the hold-down operation of the side controller 14 is terminated at time to, the destination pointer 42 no longer moves.

In case the menu display entity indicated by the destination pointer 42 has reached the uppermost of lowermost menu display entity even though the hold-down operation of the side controller 14 is ON, the destination pointer 42 no longer moves.

As mentioned above, in accordance with the operation input of the stylus pen 20 or side controller 14, the menu display entity displayed in the menu screen scrolls.

Next, the method for activating an application program corresponding to the menu display entity will be described. The application program corresponding to the menu display entity is activated by way of the operation input using (1) the stylus pen 20 or (2) the side controller 14.

When the application is activated, display on the screen 30 is terminated and the screen of the activated application appears on the LCD panel 11.

(1) Activation Method by Way of the Stylus Pen

Activation of an application program corresponding to each menu display entity by way of the stylus pen 20 is made by way of ①tap or ②drag.

①Activation Method by Way of the Stylus Pen

Tapping the stylus pen 20 on any of the menu display entities displayed in the menu screen 30, or to be more specific, the menu display area 31, the application program corresponding to the menu display entity displayed in the tapped position is activated.

In case, as shown in FIG. 26C for example, the area where no menu display entities are displayed, that is, the menu display area 31d, 31e, is tapped on, no applications are activated.

②Activation Method by Way of a Drag

Figure 40:
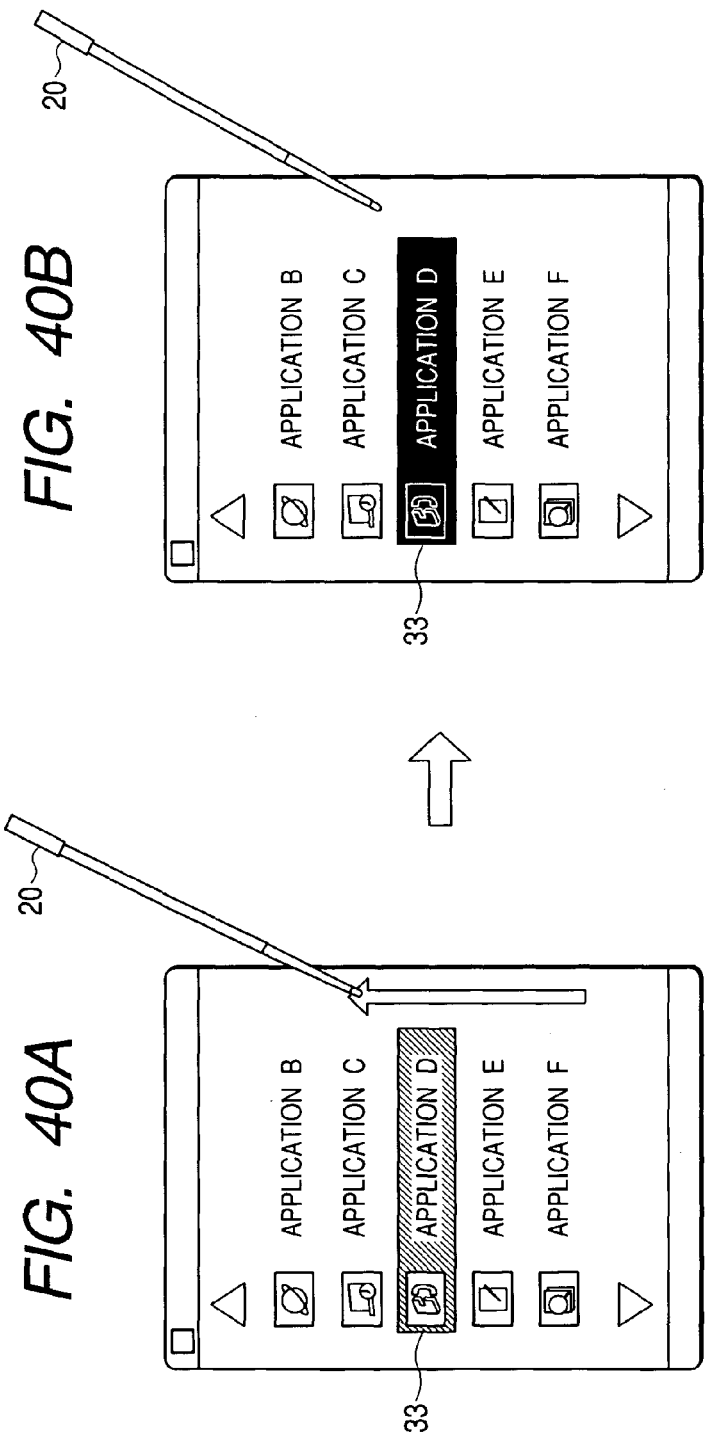
FIGS. 40A and 40B show an example of a menu screen.

FIG. 40 shows how an application is activated by way of a drag.

According to FIG. 40A, when a drag of the stylus pen 20 is terminated, scroll of the menu display entity displayed in the menu screen 30 halts. On Application D displayed in the selection candidate display area 32 is overlaid the focus 33 while the Application D is a candidate for selection. In this practice, the tip of the stylus pen 20 is kept in contact with the LCD panel 11. When a predetermined time has elapsed, the menu screen 30 changes as shown in FIG. 40B.

In FIG. 40B, the focus 33 overlaid on Application D appears in a dark color. At the same time, the Application D changes from "candidate for selection" state to "activation wait" state.

After that, when the stylus pen 20 which has been in contact with the LCD panel 11 is released from the LCD panel 11 (hereinafter referred to as "tap-out" as appropriate), an application program corresponding to Application D awaiting activation is activated.

In FIG. 40A, when the tip of the stylus pen 20 is released from the LCD 11 before the predetermined time elapses, that is, the tap-out operation is made, no applications are activated although Application D is displayed in a dark color.

In this way, a sequence of operation including scroll, selection of a desired menu display entity, and activation of an application may be executed with a single drag, thereby enhancing its operability.

A drag is available as a method for selecting a desired menu display entity as well as a tap. In case a desired menu display entity is not displayed in the menu screen 30, a drag is used, and in case it is displayed, a tap is used, in a selective way. In any case, it is possible to readily select a desired menu display entity thus enhancing its operability.

(2) Activation Method by Way of the Side Controller

Activation of an application program corresponding to each menu display entity by way of the side controller 14 is made as described below.

A "push" on the side controller 14 activates an application program corresponding to the menu display entity currently being a candidate for selection.

For example, in FIG. 40A, Application D is a menu display entity as a candidate for selection. A "push" on the side controller 14 activates an application program corresponding to the Application D.

Figure 41:
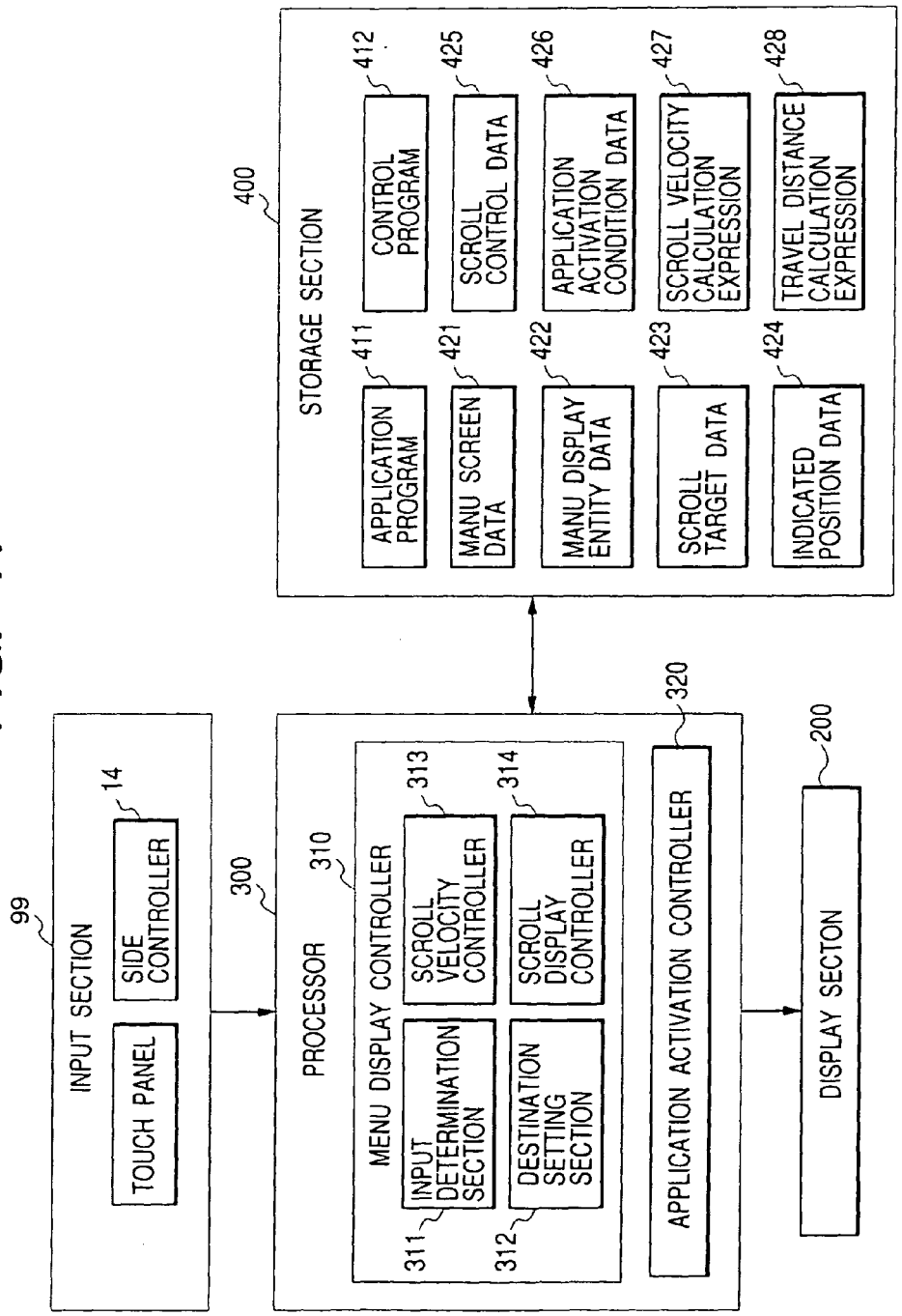
FIG. 41 is block diagram showing the functional configuration of the PDA.

FIG. 41 is a block diagram showing the functional configuration of a PDA1. As shown in FIG. 41, the PDA1 comprises an input section 99, a display section 200, a processor 300, and a storage section 400.

The input section 99 is a functional block for the user of the PDA1 to input various operation instructions. To be more specific, the input section 99 comprises a touch panel of the LCD panel 11 in FIG. 24, a side controller 14, an escape key 15, and a power key 16. In case these components are operated, the input section 99 outputs an operation signal corresponding to the operation to the processor 300. For example, the input section 99 outputs an operation signal indicating the coordinate values of the touch panel indicated (pressed) with the tip of the stylus pen 20, "upward/downward direction" of the side controller 14, or a "push" to the processor 300.

The display section 200 is a functional block for displaying the display screen in accordance with a display signal input from the processor 300 and to be more specific, corresponds to the LCD panel 11 in FIG. 24. The display section 200 displays the menu screen 30 in the main display area 11a formed on the LCD panel 11.

The processor 300 is a functional block for performing centralized control of the components of the PDA1 and implementing the functions of the PDA1. The processor 300 corresponds to the control unit 18 in FIG. 24.

The processor 300 comprises a menu display section 310 and an application activation controller 320.

The menu display controller 310 performs various types of control related to display of the menu screen 30. For example, the menu display controller 310 displays the menu screen shown in FIG. 26 in the display section 200.

The menu display controller 310 comprises an input determination section 311, a destination setting section 312, a scroll velocity controller 313, and a scroll display controller 314.

The input determination section 311 determines the presence/absence of an operation input from the input section 100 and determines the type of an operation corresponding to an operation input, if any. For example, the input determination section 311 determines whether the operation input is received from the LCD panel 11 (touch panel) or the side controller 14.

The destination setting section 312 moves the destination pointer 42 in accordance with an input signal from the input section 100 and updates the destination number.

The scroll velocity controller 313 calculates the scroll direction and the scroll velocity v based on the menu display entity indicated by the current position pointer 41 and the destination pointer 42, that is, scroll target data 423 and updates scroll control data 425.

The scroll display controller 314 moves the menu display entity group 40 based on the scroll control data 425 and scrolls through the menu display entities displayed in the menu screen 30 and updates the current position number.

The application activation controller 320 calls the application program from the storage section 400 based on application activation condition data 426 and executes the application program. Also, in response with a tap by way of the stylus pen 20 or a "push" on the side controller 14, the application activation controller 320 calls the application program from the storage section 400 and executes the application program.

The storage section 400 stores an application program 411, a control program as display control information, and control data in order to implement the functions of various programs and data related to PDA1 and the functions in this embodiment as well as temporarily stores processing data related to execution of these programs and input data from the input section 100.

The application program 411 is for example a program related to various applications to be implemented on the PDA1 including "mail software", "browser software" and "scheduling software". A specific program s provided per menu display entity.

The control data includes menu screen data 421, menu display entity data 422, scroll target data 423, indicated position data 424, scroll control data 425, application activation condition data, a scroll velocity calculation expression 427, and a travel distance calculation expression 428.

The menu screen data 421 is data for the menu display section 200 to display the menu screen 30 and includes for example the position coordinates of the menu display area 31.

The menu display entity data 422 is data on a plurality of menu display entities to be displayed in the menu display area 31. The data structure of the menu display entity data is shown in FIG. 42.

FIG. 42 shows the data structure of the menu display entity data. As shown in FIG. 42, the menu display entity data comprises menu numbers, icons, and menu names keyed to a plurality of menu display entities.

Figure 43A:
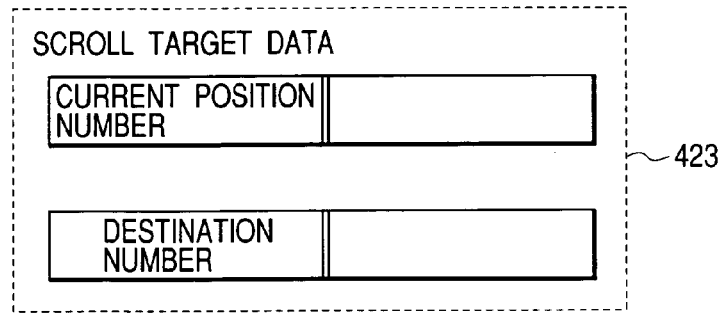
FIG. 43A shows the structure of scroll target data.

The scroll target data 423 is data used as scroll target and includes current position numbers and destination numbers, as shown in FIG. 43A. The scroll velocity controller 313 calculates the scroll direction ad the scroll velocity v based on the scroll target data 423.

The current position number is the menu number of the menu display entity as a candidate for selection, that is, the menu display entity indicated by the current position pointer 41.

The destination number is the menu number of a menu display entity which should match the menu display entity indicated by the current position pointer 41 that is, the menu number of the menu display entity indicated by the destination pointer 42.

Figure 43B:
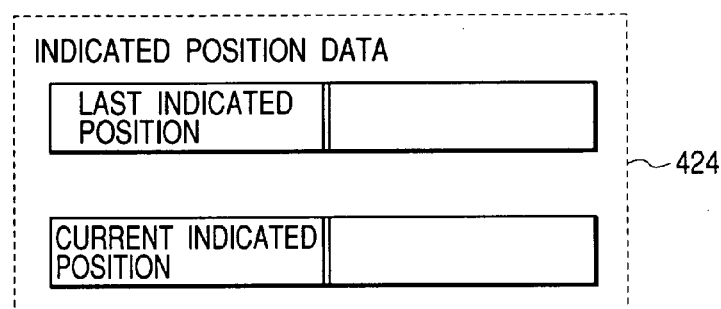
FIG. 43B shows the structure of indicated position data.

The indicated position data 424 is data on the position on the LCD panel 11 indicated by the stylus pen 20. As shown in FIG. 43B, the indicated position data 424 includes the current indicated position Pn and the last indicated position Pn−1. The destination setting section 312 moves the destination pointer 42 based on the indicated position data 424.

Figure 43C:
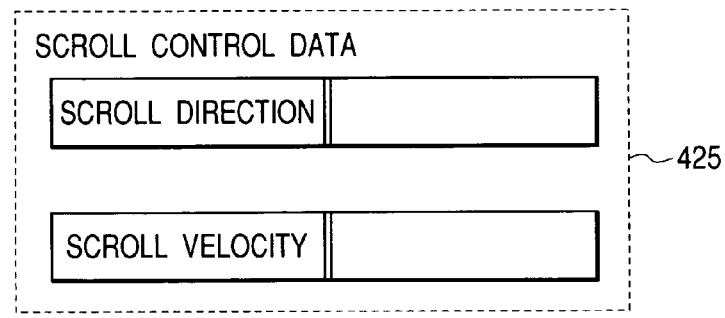
FIG. 43C shows the structure of scroll control data.

The scroll control data 425 is data for controlling the scroll of a menu display entity. As shown in FIG. 43C, the scroll control data 425 includes the scroll direction and the scroll velocity v. The scroll display controller 314 moves the menu display entity group 40 based on the scroll control data 425 and scrolls the menu display entities displayed in the menu screen.

Figure 43D:
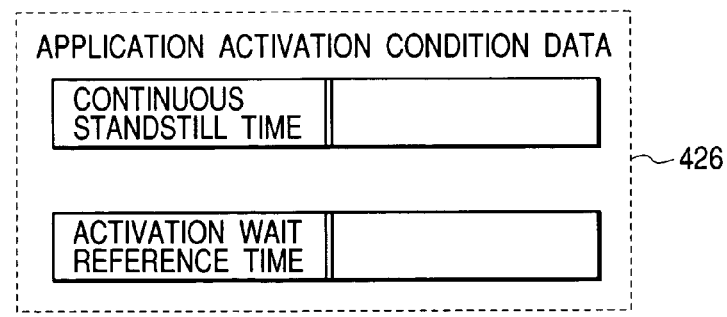
FIG. 43D shows the structure of application activating conditions.

The application activation condition data 426 refers to conditions for a menu display entity as a candidate for selection being placed in the activation wait state. As shown in FIG. 43D, the application activation condition data 426 includes the continuous standstill time and the activation wait reference time.

The continuous standstill time is a duration a drag is halted without being tapped out. The activation wait reference time is the upper limit of the continuous standstill time.

The application activation controller 320 places the menu display entity currently being a candidate for selection into the activation wait state based on the application activation condition data, or to be more specific, when the continuous standstill time exceeds the continuous wait reference time.

The scroll velocity calculation expression 427 is an expression used to calculate the scroll velocity v from the inter-item distance w. To be more specific, the scroll velocity calculation expression 427 is represented in the expression (1) or a graph shown in FIG. 30.

The travel distance calculation expression 428 is an expression used to calculate the travel distance Δw of the destination pointer 42 from the travel distance Δy of a drag. To be more specific, the travel distance calculation expression 428 is represented in the expression (3) or a graph shown in FIG. 34.

Next, the operation of the PDA1 in this embodiment will be described.

Figure 44:
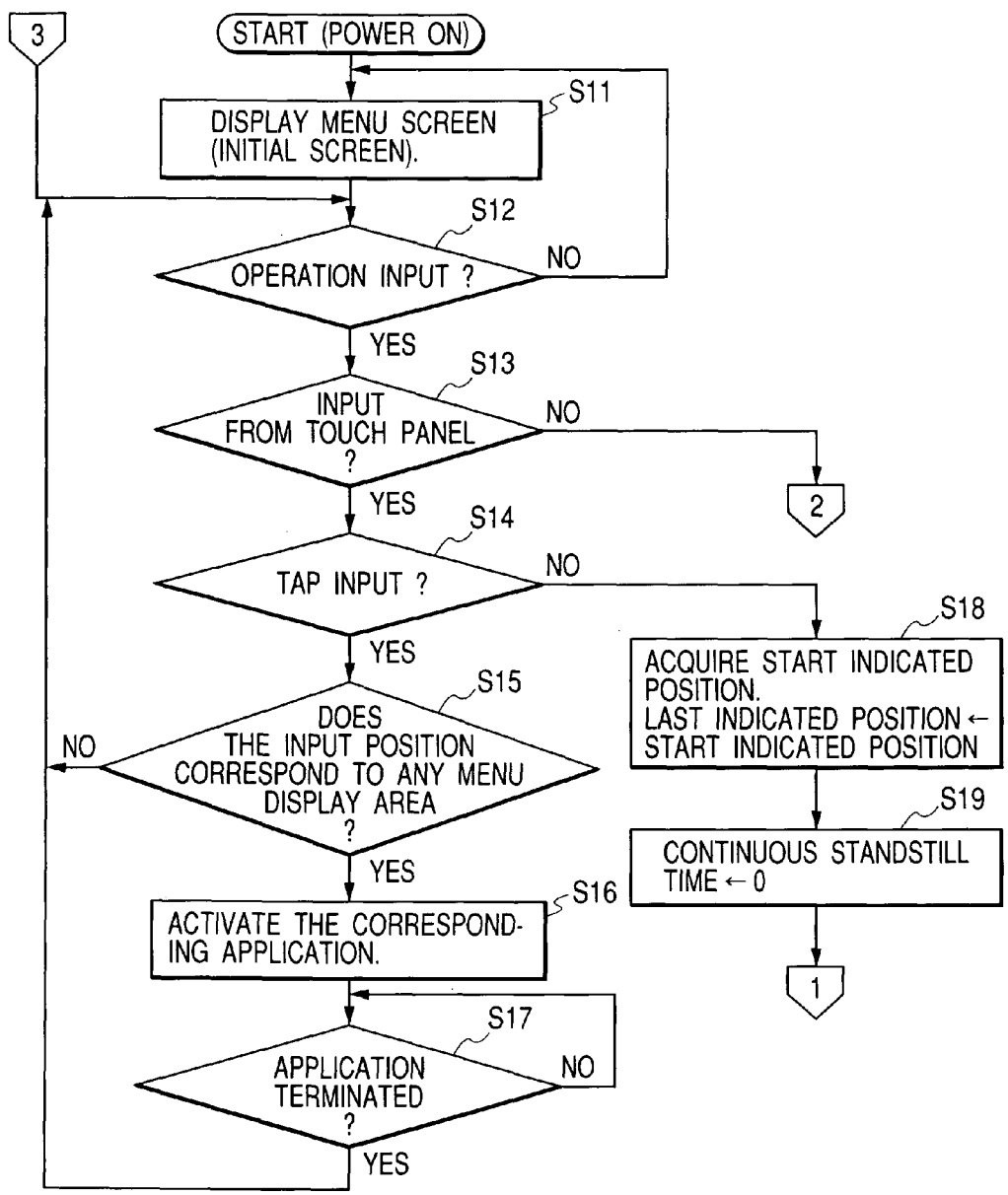
FIG. 44 is a flowchart showing the operation of the PDA.
Figure 45:
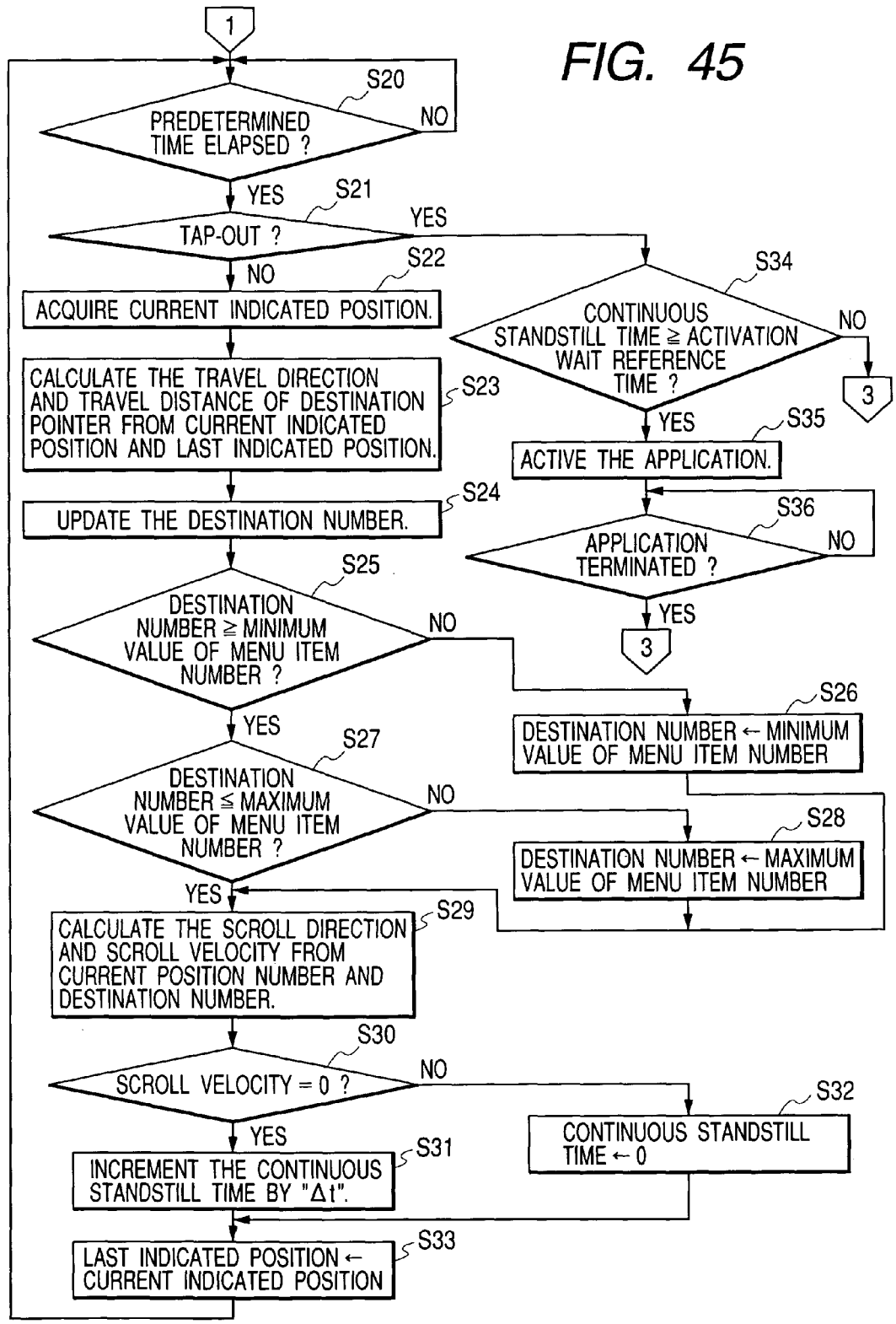
FIG. 45 is a continuation of FIG. 44.
Figure 46:
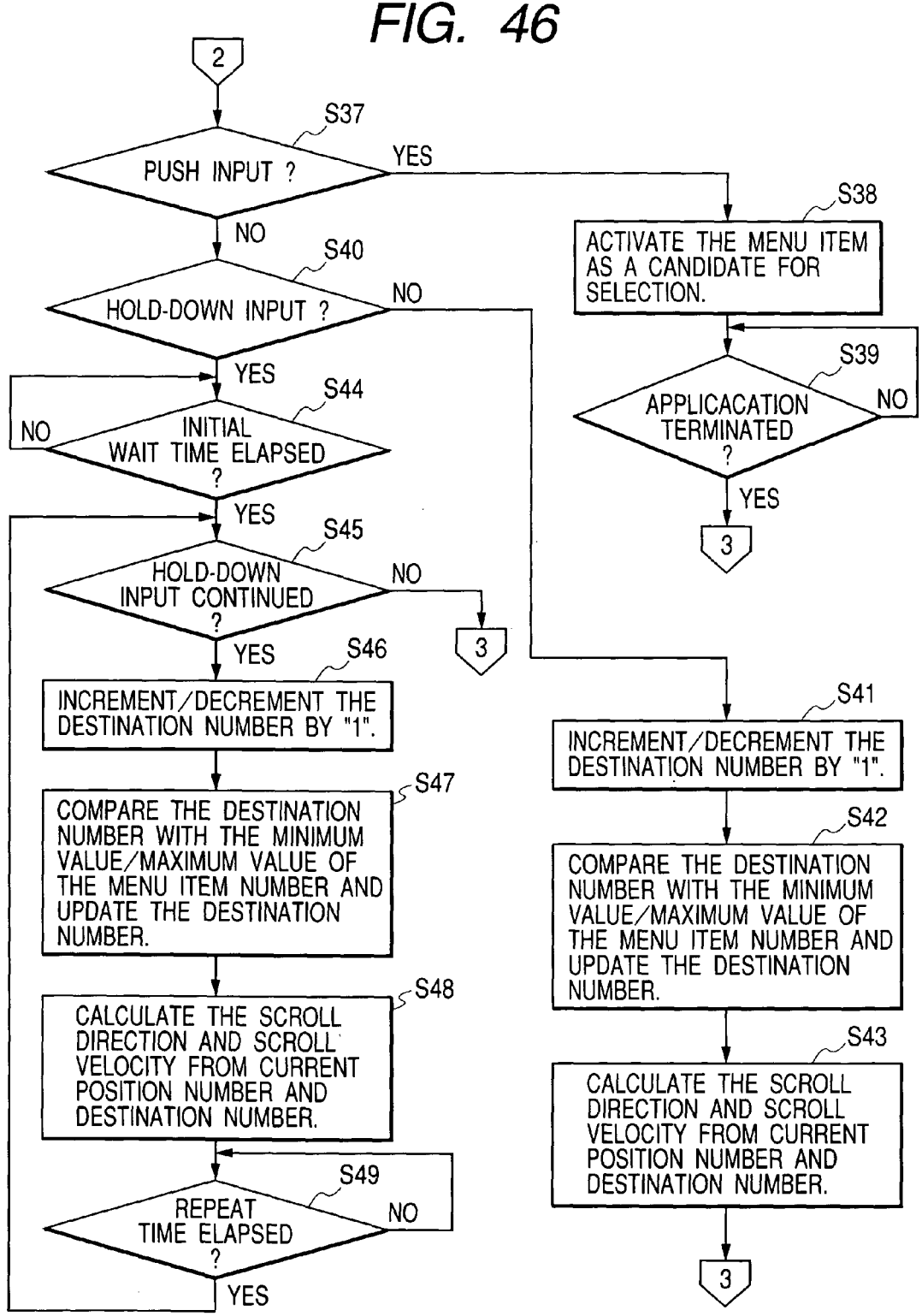
FIG. 46 is a continuation of FIG. 45.

FIGS. 44 through 46 are flowcharts showing the operation of the PDA1. This operation is executed in accordance with the control program 412 stored by the processor 300 into the storage section 400.

As shown in FIG. 44, when the PDA1 is powered by way of the operation of the power key 16, the menu display controller 310 references the menu screen data 421 and the menu display entity data 422 to display the menu screen 30 (initial screen) on the display section 200 (step S11). In this practice, the menu display controller 310 displays the menu display entity whose menu number is "1" in the menu display area 31a.

Then the PDA1 awaits an operation input from the input section 100.

In case any operation input is made from the input section 100 (step S12: YES), the input determination section 311 determines whether the operation is from the LCD panel 11 or from the side controller 14 (step S13).

As a result, in case the input determination section 311 has determined that the operation is from the LCD panel 11 (step S13: YES), the input determination section 311 determines whether the operation is a tap or a drag (step S14).

In case the input determination section 311 has determined that operation is a tap (step S14: YES), the input determination section 311 determines whether the indicated position by the stylus pen 20 is included in which menu display area 31 (step S15).

In case the input determination section 311 has determined that whether the indicated position is included in any menu display area 31 (step S15: YES), the Application activation controller 320 identifies the menu display area 31 which includes the indicated position and calls the application program 411 corresponding to the menu display entity displayed in the identified area and execute the application program (step S16).

Terminating the execution of the application program 411 (step S17: YES), the processor 300 executes step S12 and awaits the next operation input.

In case the processor 300 has determined in step S15 that the indicated position by the stylus pen 20 is not included in any menu display area 31 (step S15: NO), the processor 300 executes step S12 and awaits the next operation input.

In case the input determination section 311 has determined in step S14 that the operation input from the LCD panel 11 is not a tap but a drag (step S14: NO), the input determination section 311 acquires the start indicated position as well as sets the acquired coordinate values as a last indicated position Pn−1 (step S18). The destination setting section 312 sets the continuous standstill time to "0" (step S19).

In FIG. 46, when a predetermined has elapsed (specifically "Δt") (step S20: YES), the input determination section 311 determines whether a tap-out was made (step S21).

In case the input determination section 311 has determined that tap-out was not made, (step S21: NO), the input determination section 311 acquires the current indicated position Pn (step S22. Based on the acquired current indicated position Pn and last indicated position Pn−1, the destination setting section 312 moves the destination pointer 42.

As described referring to FIGS. 31 through 34, based on whether the Y coordinate value of the current indicated position Pn is greater than, equal to, or smaller than the Y coordinate value of the last indicated position Pn−1, the drag direction is calculated. Based on the drag direction, the travel direction of the destination pointer 42 is calculated. Then, the travel distance Δy of a drag is calculated. Referring to the travel distance calculation expression 428, the travel distance Δw of the destination pointer 42 is calculated (step S23).

In this way, having calculated the travel direction and the travel distance Δw of the destination pointer 42, the destination setting section 312 updates the destination number to value obtained by incrementing/decrementing the destination number by the travel distance Δw (step S24).

Then, the destination setting section 312 compares the updated destination number with the minimum value of the menu number ("1") (step S25).

In case the destination number is less than the minimum value of the menu number (step S25: NO), the destination setting section 312 sets the minimum value of the menu number to the destination number (step S26). Then execution proceeds to step S29.

In case the destination number is equal to or greater than the minimum value of the menu number (step S25: YES), the destination setting section 312 compares the destination number with the maximum value of the menu number ("N") (step S27).

In case the destination number exceeds the maximum value of the menu number (step S27: NO), the destination setting section 312 sets the maximum value of the menu display entity to the destination number (step S28). Then execution proceeds to step S29.

When the destination number has been compared with the minimum value/maximum value of the menu number and the destination number has been updated in accordance with the comparison result, the scroll velocity controller 313 calculates the scroll direction and the scroll velocity v based on the current position number and the destination number (step S29).

As described referring to FIGS. 29 and 30, based on whether the current position number is greater than, equal to, or smaller than the destination number, the scroll velocity controller 313 calculates the scroll direction.

The scroll velocity controller 313 also calculates the inter-item distance w, that is, the difference between the current position number and the destination number, reference the Scroll velocity calculation expression 427, and calculates the scroll velocity v based on the obtained inter-item distance w.

Having calculated the scroll direction and the scroll velocity v, the scroll velocity controller 313 determines whether the calculated scroll velocity is "0" (step S30).

In case the scroll velocity controller 313 has determined that the scroll velocity is "0" (step S30: YES), the scroll velocity controller 313 updates the continued standstill time to a value obtained by adding "Δt" to the continued standstill time (step S31).

In case the scroll velocity controller 313 has determined that the scroll velocity is not "0" (step S30: NO), the scroll velocity controller 313 updates the continued standstill time to "0" (step S32).

Having updated the continued standstill time, the scroll velocity controller 313 sets the current indicated position Pn to the last indicated position Pn−1 (step S33). Then the scroll velocity controller 313 executes step S20 and repeats the same processing.

In case a tap-out is determined in step S21 (step S21: YES), the Application activation controller 320 compares the continued standstill time with the activation wait reference time (step S34).

In case the Application activation controller 320 has determined that the continued standstill time is equal to or greater than the activation wait reference time (step S34: YES), the Application activation controller 320 calls the application program 411 corresponding to the menu display entity currently being a candidate for selection and executes the application (step S35).

Having executed the application program 411 (step S36: YES), execution proceeds to step S12, awaiting the next operation input.

In case the processor 300 has determined that the continued standstill time is less than the activation wait reference time (step S34: NO), the processor 300 executes step S12 and awaits the next operation input.

In case it is determined that the operation input by the input section 100 is an input from the side controller 14 (step S13: NO), the input determination section 311 determines whether the operation is a "push" or an input of "upward/downward direction" (step S37) in FIG. 46.

In case the input determination section 311 has determined that the operation is a "push" on the side controller 14 (step S37: YES), the Application activation controller 320 calls the application program 411 corresponding to the menu display entity having the menu number indicated by the current position number, that is, the menu display entity currently being a candidate for selection and executes the application (step S38).

When the application has been executed (step S39: YES), execution proceeds to step S12 and awaits the next operation input.

In case the input determination section 311 has determined that the operation is an input of "upward/downward direction" by way of the side controller 14 (step S37: NO), the input determination section 311 determines whether the input is a hold-down operation (step S40).

In case the input determination section 311 has determined that the operation is not a hold-down input (step S40: NO), the destination setting section 312 moves the destination pointer 42 based on the input direction.

As described referring to FIGS. 35 and 36, the travel direction of the destination pointer 42 is calculated based on the input direction. Then, in accordance with the travel direction, the destination number is updated to a value obtained by incrementing/decrementing the destination number by "1" (step S41).

Next, same as steps S25 through S28, the destination setting section 312 compares the destination number with the minimum value/maximum value of the menu number and updates the destination number based on the comparison result (step S42). The scroll velocity controller 313 calculates the scroll direction and the scroll velocity v based on the current position number and the destination number (step S43).

Then execution proceeds to step S12 and awaits the next operation input.

In case the input determination section 311 has determined that the input of "upward/downward direction" by way of the side controller 14 is a hold-down operation (step S40: YES), the input determination section 311 waits for the initial wait time Tf to elapse (step S44: YES), then determines whether the hold-down operation is continued (step S45).

In case the input determination section 311 has determined that the hold-down operation is continued (step S45: YES), same as steps S41 and S42, the destination setting section 312 calculates the travel direction of the destination pointer 42 based on the input direction as well as updates the destination number to a value obtained by incrementing/decrementing the destination number by "1" in accordance with the travel direction (step S46). Then, the destination setting section 312 compares the destination number with the minimum value/maximum value of the menu number and updates the destination number based on the comparison result (step S47).

Same as step S43, the scroll velocity controller 313 calculates the scroll direction and the scroll velocity v based on the current position number and the destination number (step S48).

When the repeat time Tr has elapsed (step S49: YES), the processor 300 executes step S45 and repeats the same processing.

In case the input determination section 311 has determined that the hold-down operation is not continued (step S45: NO), the processor 300 executes step S12 and awaits the next operation input.

While not shown in FIGS. 44 through 47, this processing terminates as follows. When power off of the PDA1 is instructed by the input section 100, the processor terminates the application under execution as well as terminates the display of the menu screen 30 then terminates this processing.

With such a configuration, a drag is allowed across the menu screen 30 where a plurality of menu display entities are displayed, that is, across the main display area 11a of the LCD panel 11. A scroll through the menu display entities is executed by the drag. To make a scroll, the user has only to perform a drag like a process of drawing arbitrary lines.

The menu display entity displayed in the selection candidate display area 32 is a candidate for selection as a result of scroll. Easy operation of a single drag serves as an instruction to scroll and selection of a menu display entity, thereby enhancing its operability.

The invention is not limited to the above embodiments but modification is allowed without departing from the spirit of the invention.

For example, while the menu display entity group 40 comprises a plurality of menu display entities in a row in the above embodiments, the plurality of menu display entities may be arranged in a row, or arbitrary arrays such as in bidirectional column/row directions.

While the travel direction of the menu display entity group 40 is either upward or downward, the travel direction may be an arbitrary direction such as the rightward/leftward direction or diagonal direction. In this case, the scroll direction of a menu display entity is the arbitrary direction.

While the menu screen 30 is fixed and the menu display entity group 40 moves in the concept of scroll shown in FIG. 28, the menu display entity group 40 may be fixed and the menu screen 30 may move. Both the menu screen 30 and the menu display entity group 40 may move.

As shown in FIG. 47, the menu display entity group 40 may be arranged in a virtual space and the menu display entity group 40 seen from an arbitrary virtual camera F in the virtual space may be used as the menu screen 30.

Figure 47A:
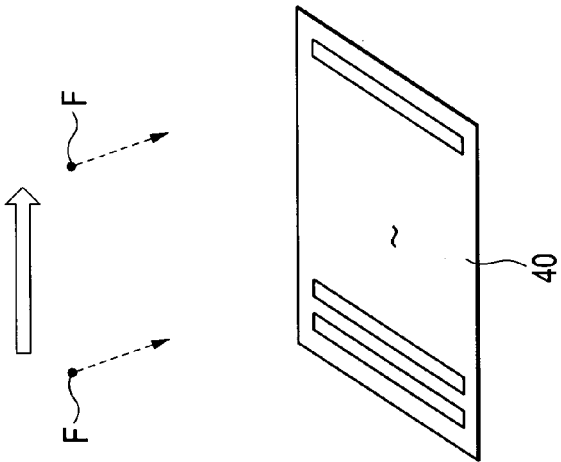
FIGS. 47A and 47B illustrate a variation of this embodiment.

As shown in FIG. 47A, by moving the virtual camera F in parallel with the arrangement direction of the menu display entity group 40, the menu display entity group 40 displayed in the menu screen 30 scrolls. Conversely, the virtual camera R may be fixed and the menu display entity group 40 may move in parallel with the arrangement direction.

Figure 47B:
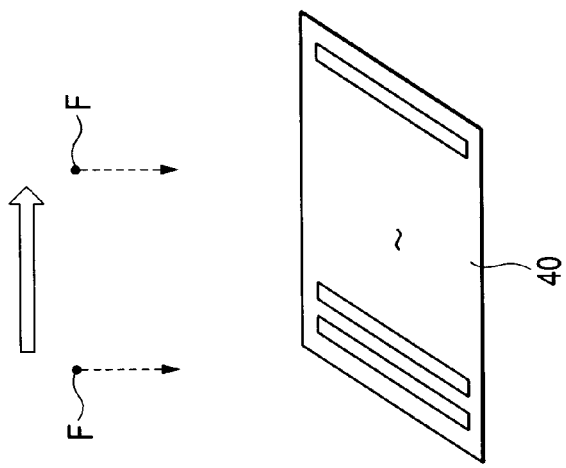
Figure 48:
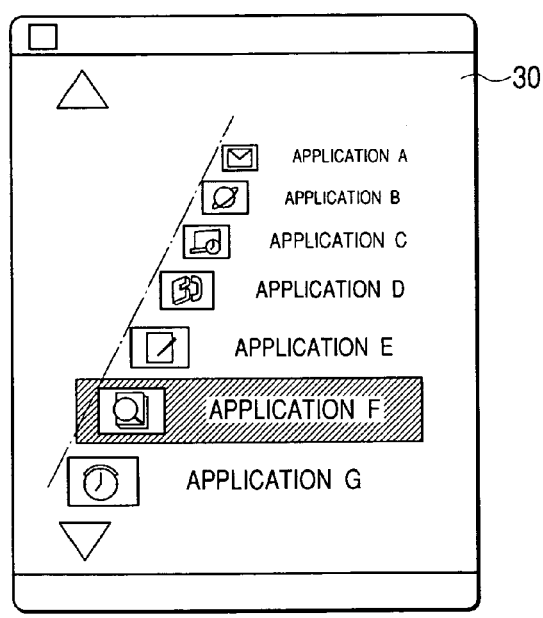
FIG. 48 illustrates another variation of this embodiment.

As shown in FIG. 47B, in case the light of sight of the virtual camera F is slanted against the menu display entity group 40, the menu screen 30 having a depth is displayed.

In this way, by moving the virtual camera F whose light of sight is oriented toward the virtual face where the menu display entity is arranged, that is, the menu display entity group 40, scroll display is allowed. This simplifies the control of scroll in a virtual space.

Figure 49A:
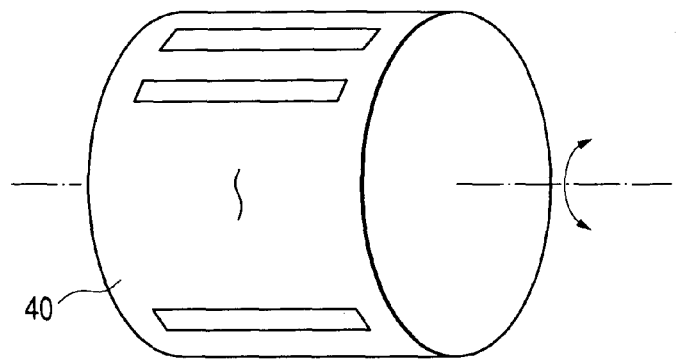
FIGS. 49A and 49B illustrate another variation of this embodiment.

While the menu display entity group 40 comprises a plurality of menu display entities arranged in a virtual plane, the virtual plane may be a curved surface such as a lateral face of a cylinder, as shown in FIG. 49A.

Figure 49B:
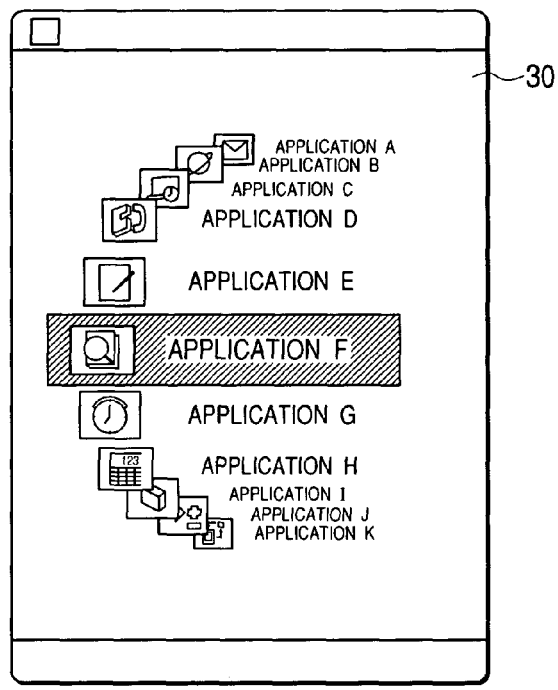

In this case, by rotating the cylinder about its axis or moving the virtual camera F along the lateral face of the cylinder, the menu screen 30 is displayed as shown in FIG. 49B. That is, the size of the menu display entity to be displayed changes thus displaying a three-dimensional menu screen.

While the selection candidate display area 32 is fixed on the menu screen in this embodiments, the selection candidate display area 32 may be variable.

In this case, the selection candidate display area 32 may be associated with scroll. As shown in FIG. 50, in case the uppermost menu display entity of the menu display entity group 40 matches the menu display area 31a in the menu screen 30, the selection candidate display area 32 is changed to the menu display area 31a. In accordance with an upward scroll, the selection candidate display area 32 is sequentially changed to the menu display area 31b, 31c, . . . and so on.

When a scroll has reached a menu display entity located approximately in the middle of the menu display entity group 40, the selection candidate display area 32 is changed to the approximate center of the menu display area 31, that is, the menu display area 31c, as shown in FIG. 50B.

In case the lowermost menu display entity matches the menu display area 31e after a further upward scroll as shown in FIG. 50C, the selection candidate display area 32 is changed to the menu display area 31e.

Further, the selection candidate display area 32 may be arbitrarily changed by way of an instruction input by the user.

While an application program corresponding to a menu display entity which shifted to the activation wait state is activated by halting a drag and performing a tap-out after a predetermined period in that state in the embodiments, an application program corresponding to a menu display entity which is a candidate for selection at the point of tap-out may be activated.

While the current position number is the menu number of the menu display entity indicated by the current position pointer 41, that is, an integer in the embodiments, the current position number may be a positive real number.

For example, for example in FIG. 6, the current position pointer 41 indicates "Application D". As the menu display entity group 40 moves upward, the menu display entity indicated by the current position pointer 41 changes from Application D" to "Application E". That is, the current position number changes from "4" to "8" in a digital fashion. This numeral value is varied as a real number.

Thus, the current position number assumes the value of the real number and the scroll velocity v changes smoothly in a curve like one shown in FIG. 30. This allows a smoother scroll such as smooth deceleration of a scroll immediately after a drag.

While the invention is applied to a PDA in the embodiments, the invention may be applied to other personal information terminals such as a cell phone.

The invention may be further applied to electronic apparatus such as a set-top box or a PC, or a game machine. In this case, the display of a TV connected to the electronic apparatus works as the display section 200.

A portable information terminal equipped with a touch panel according to the invention features the enhanced operability of menu display and provides the user with a feel of operability specific to the touch panel.

Third Embodiment

A second embodiment of the invention will be described referring to drawings. The dimensions, materials, shapes and relative arrangement of the components in the examples shown are not intended to limit the invention but illustrated by way of example, unless specifically described.

Figure 51:
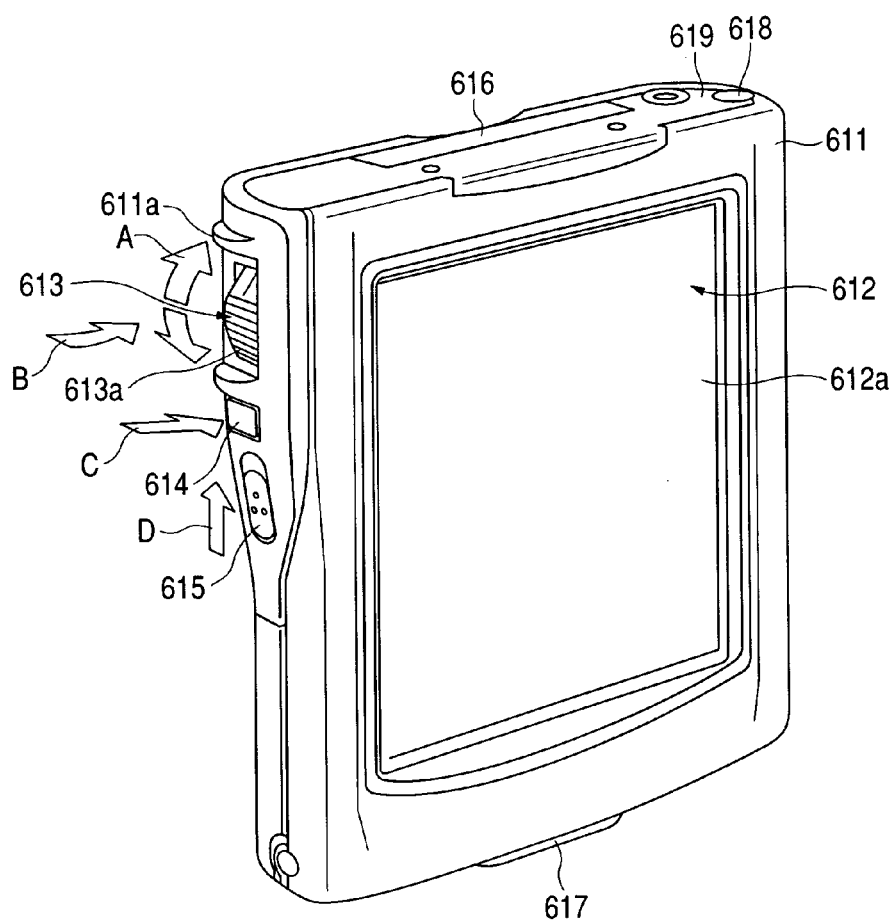
FIG. 51 is a perspective view of an example of personal information terminal device of the invention.

Referring to FIG. 51, the portable information terminal (PDA) shown is of a size the user can hold in his/her hand. ON the front face of an armored case 611 is arranged a liquid crystal panel 612 comprising a touch panel 612a across its entire surface. (The touch pane 612a is arranged for example on the surface of the liquid crystal panel 612.) The armored case 611 comprises, as mentioned later, a control switch (hereinafter referred to as the side controller) 613, an escape switch 614, a power on/off switch (hereinafter referred to as the power switch) 615, an insertion slot 616 where an external memory medium is inserted, an external connection terminal 617 used to perform communications of various data, and a storage unit 619 for storing a touch pen (stylus pen) 618.

As shown in FIG. 51, the side controller 613, the escape switch 614, and the power switch 615 are arranged in an array on the lateral face of the armored case 611. In the example shown, the side controller 613, the escape switch 614, and the power switch 615 are arranged in order from the top of the figure. The side controller 613 is arranged at the position where the thumb of the left hand of the user is most likely to be positioned when the user holds the armored case 611 with his/her left hand so that the liquid crystal panel 614 will face the front.

On the top of the side controller 613 is formed a protrusion 611a extending in the outer direction. Part of the side controller 613 is exposed out of the lateral face of the armored case 411. The side controller 611 is supported by a shaft body (not shown) extending from the front face to the rear face oscillatably (rotatably) in a predetermined range in directions shown by arrows A in solid lines in the figure (upward/downward directions), while allowing a push (an arrow B in a solid line in the figure) in a direction orthogonal to the shaft body (direction from the lateral face to inside). The rotation (oscillation) range is limited to a range where the rotation (oscillation) is allowed with an approximate single push-up or push-down operation by way of the thumb of the user's left hand. On the exposed face of the side controller 613 is formed for example a corrugated protrusion 613a.

As mentioned earlier, the side controller 613 is rotated (oscillated) or pushed for example with the thumb of the user's left hand. In this practice, the thumb of the user's left hand comes in touch with the protrusion 613*a*. When not operated, the side controller 613 is located in a predetermined position (hereinafter referred to as the reference position). Under a push-up operation with the thumb of the user's left hand in the upward direction from the reference position, the side controller 613 rotates (oscillates) a predetermined rotation amount (oscillation amount) and does not rotate (oscillate) any further. When the thumb of the user's left hand is released from the side controller 613 (that is, removing the force to rotate (oscillate) the side controller 613), the side controller 613 automatically returns to the reference point.

Similarly, Under a push-down operation with the thumb of the user's left hand in the downward direction from the reference position, the side controller 613 rotates (oscillates) a predetermined rotation amount (oscillation amount) and does not rotate (oscillate) any further. When the thumb of the user's left hand is released from the side controller 613, the side controller 613 automatically returns to the reference point. The push operation is allowed only in the reference point. The side controller 613 is operated with the thumb of the user's left hand holding the PDA itself as mentioned earlier. Thus the movement of the thumb is limited and a complicated operation is difficult. As a result, the oscillating operation is easier than the rotating operation which requires a more complicated operation process. Thus, the side controller 613 is preferable subject to oscillating operation.

The side controller 613 sends an operation signal in accordance with the rotating operation (oscillating operation) or push operation, and various processing is executed in accordance with this operation signal as mentioned later.

As mentioned earlier, below the side controller 613 is arranged an escape switch 614. Below the escape switch 614 is arranged a power switch 615. On the surface of the power switch 615 is formed a plurality of point-shaped protrusions. The side controller 613, the escape switch 614, and the power switch 615 are arranged in positions for example where they can be operated with the thumb of the left hand of the user.

In the example shown, the escape switch 614 is pushed (an arrow C in a solid line) which sends an escape (ESC) signal and triggers an escape operation as mentioned later. The power switch 615 undergoes a slide operation (an arrow D in a solid line) (sliding the power switch 615 in the upward direction shown in the figure turns on the power and places the power switch 615 in the original position. Sliding the power switch 615 in the upward direction with power on turns off the power and places the power switch 615 in the original position.)

When connected to a dedicated recharging unit (a so-called cradle unit) for example equipped with a communications function via the external connection terminal 617, the PDA shown can perform data communications with a personal computer. The LCD panel 612 is for example a color liquid crystal display unit and comprises a backlight as required. The touch panel 612*a* has a touch sensor for detecting the contact position (touch position) and the contact locus of the touch pen 618 which touched (tapped on) the touch panel 618*a*.

Figure 52:
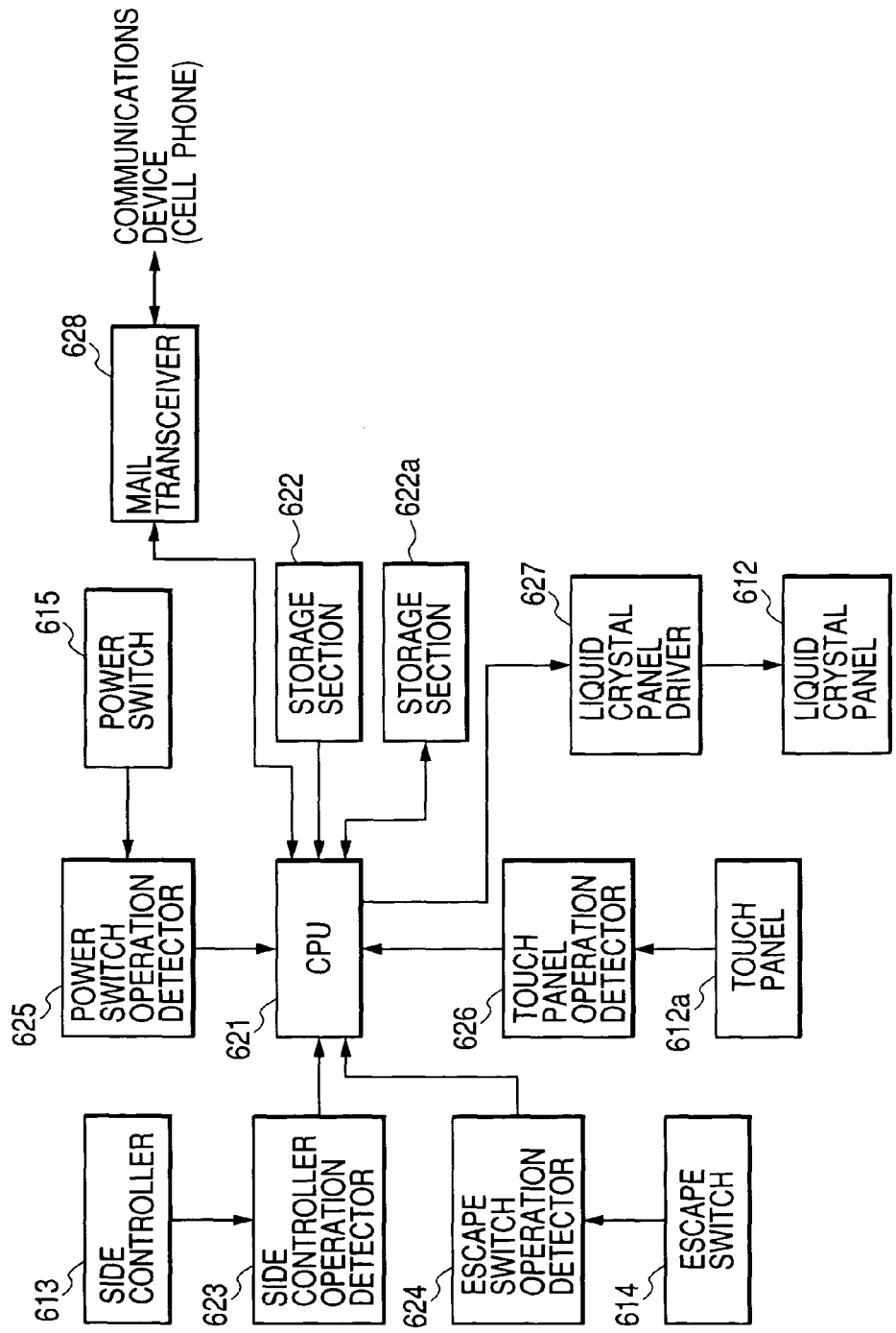
FIG. 52 is a block diagram showing an example of a control system used in a portable information terminal device shown in FIG. 51.

Referring to FIG. 52, the PDA shown comprises a comprises a central processing unit (CPU) 621 and controls the entire PDA in accordance with a control program stored in a storage section 622 such as a ROM and execute various processing mentioned later in accordance with application programs stored in the storage section 622. An application program may be loaded from an external memory medium inserted into the insertion slot 616. To the CPU 621 is connected a read-/write-enable storage section 622*a* such as a RAM (the storage section 622*a* is nonvolatile and its contents are not lost after power is turned off).

As shown in the figure, the side controller 613 is connected to the CPU 621 via a side controller operation detector 623 and the escape switch 614 is connected to the CPU 621 via an escape switch operation detector 624. The CPU 621 is further connected to the power switch 615 via a power switch operation detector 625. The CPU 621 is connected to the touch panel 612*a* via a touch panel operation detector 626. Also, the CPU 621 is connected to the crystal liquid panel 612 via a crystal panel driver 627.

The PDA shown comprises a mail transceiver (mail communications function) 628. The mail transceiver 628 is connected to the CPU 621. The mail transceiver 628 is connected to a communications card unit (not shown) such as a cell phone via the insertion slot 616 and performs mail communications via the communications unit. Each time a mail is sent or received, the CPU 621 records a sent mail or a received mail into the storage section 622*a*. The sent mails and received mails may be read from the storage section 622*a* for later browsing.

In case the power switch 615 is pushed up while the PDA is powered off, the power switch operation detector 625 detects this operation and supplies a signal to operate the power switch 615 to the CPU 621. The CPU 621 responds to the power switch operation signal to turn on the power of the PDA. When the power is turned on, the CPU 621 performs drive control of the liquid crystal panel driver 627 to display an initial screen (menu screen; hereinafter referred to as the launcher screen) as one of the application programs on the liquid crystal panel 612.

Figure 53A:
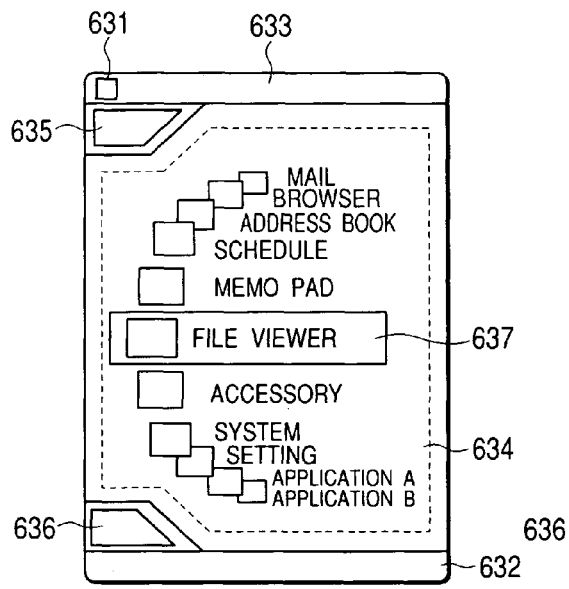
FIG. 53A shows an example of a launcher screen displayed on the portable information terminal device shown in FIG. 1 in the first mode.

Referring to FIG. 53A, on the launcher screen are displayed, as menu items, for example, application programs related to Mail, Browser, Address book, Schedule, Memo pad, File viewer, Accessory, System, and Setting, together with icons. In the storage section 622 are stored application programs (application software) related to theses menu items.

Figure 53B:
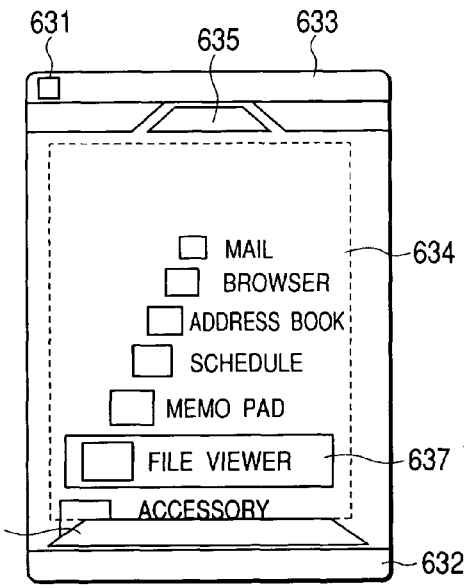
FIG. 53B shows an example of a launcher screen displayed on the portable information terminal device shown in FIG. 1 in the first mode.
Figure 53C:
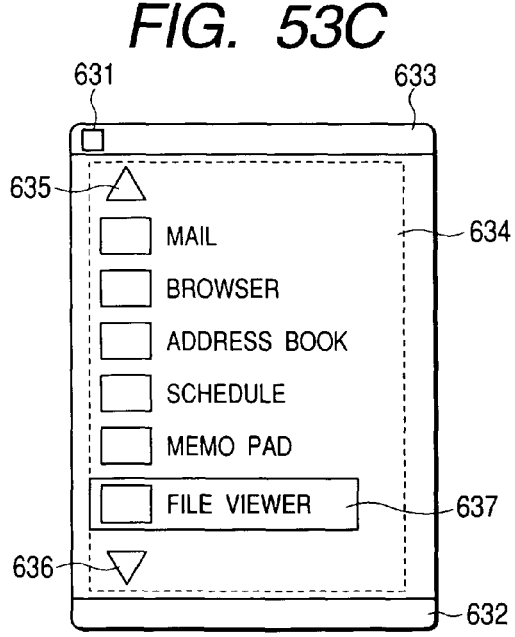
FIG. 53C shows an example of a launcher screen displayed on the portable information terminal device shown in FIG. 1 in the first mode.

FIG. 53A shows a first display mode where menu items are three-dimensionally displayed in an approximate cylinder (approximate arc). FIG. 53B shows a second display mode where menu items are three-dimensionally displayed in approximate flat plates slanted toward the direction of depth in the screen with a three-dimensional feel of depth. FIG. 53C shows a third display mode where menu items are displayed in a plane. FIGS. 53A and 53B display menu items almost three-dimensionally and FIG. 53C displays menu items two-dimensionally.

To switch between these display modes, the user taps on a mode switching icon 631 to sequentially select the first display mode, the second display mode, and the third display mode.

In any of the first to third display modes, a task bar 632 is displayed in the lower area of the launcher screen, and a title bar 633 is displayed in the upper area of the screen. The mode switching icon 631 is provided in the title bar 633. Between the task bar 632 and the title bar 633 is specified a window display section (menu item display section) 634.

When the side controller 613 is operated in the upward direction (rotated or oscillated) from the reference point, the side controller operation detector 623 detects the upward operation and supplies an upward operation signal to the CPU 621. In response to this, the CPU 621 moves a cursor in the upward direction in the launcher screen.

When the side controller 613 is operated in the downward direction from the reference point, the side controller operation detector 623 detects the downward operation and supplies a downward operation signal to the CPU 621. In response to this, the CPU 621 moves a cursor in the downward direction in the launcher screen.

When a cursor 637 is positioned on one of the menu items and the side controller 613 is pushed, the side controller operation detector 623 detects this push operation and supplies a push operation signal to the CPU 621. In response to this, the CPU 621 selects a menu item where the cursor 637 is positioned and activates an application program corresponding to the selected menu item. Then the system makes a transition to the operation screen corresponding to the menu item.

As shown in FIG. 53A, in the first mode, upward and downward scroll buttons 635 and 636 are respectively displayed in the upper left area and lower left area of the launcher screen. In the second mode, the upward and downward scroll buttons 635 and 636 are respectively displayed in the upper center area and lower center area of the launcher screen. In the third mode, the upward and downward scroll buttons 635 and 636 are respectively displayed in the upper left area and lower left area of the launcher screen.

Tapping on the upward or downward scroll buttons 635 or 636 scrolls through the launcher screen in the upward or downward direction and positions the cursor on a desired menu item. When the cursor 637 is positioned on the uppermost menu item (mail) in the launcher screen, the upward scroll button 635 disappears from the screen. Similarly, when the cursor 637 is positioned on the lower most menu item (Application B) in the launcher screen, the downward scroll button 636 disappears from the screen.

Referring to FIG. 53 and FIG. 44, in launcher screen of FIGS. 53A through 53C, when the side controller 613 is oscillated and a cursor (focus) is positioned on the menu item: accessory, then the side controller 613 is pushed or a predetermined time has elapsed, the CPU 621 displays the accessory operation screens (menu screens) shown in FIGS. 54A through 54G on the liquid crystal panel 612 in order. That is, when the cursor is positioned on the accessory and for example a predetermined time has elapsed in a launcher screen as a higher-layer menu screen, the CPU 621 makes a transition to the accessory operation screen as a lower-layer menu screen.

In the accessory operation screen, the take bar 632 is displayed in the lower area and the title bar in the upper area. The mode switching icon 631 is provided in the title bar 633. Tapping on the mode switching icon 631 switches between the display modes of the accessory operation screen, same as the first to third modes of the launcher screen (switching between display modes is not directly related to the invention so that the description is omitted). Between the task bar 632 and the title bar 633 is specified a window display section (menu item display section) 641.

To the left of the window display section 641 are arranged icons 640 representing the menu items in the launcher screen (Mail, Browser, Address book, Schedule, Memo pad, File viewer, Accessory, and System) in the vertical direction, and are displayed the upward and downward scroll buttons 635 and 636. Tapping on the upward or downward scroll button 635 or 636 moves a cursor 37 (not shown in FIG. 54) between the icons 640.

While the accessory operation screen is displayed, the cursor 637 (not shown in FIG. 54) is positioned on the icon indicating the accessory.

At the top and bottom of the window display section 641 are respectively displayed an upward scroll button 641a and a downward scroll button 641b. Tapping on the upward or downward scroll button 641a or 641b moves a cursor 651 between window frames mentioned later in the upward or downward direction.

The CPU 621 displays at least one window frame two sides of which are concave. In the example shown, total eight window frames 642 are arranged at predetermined intervals in the vertical direction in the figure. Each window frame 642 has a first display frame 642a and a second display frame 642b whose width is smaller than that of the first display frame.

The CPU 21, after displays the accessory operation screen of FIG. 54A as mentioned above, sequentially shifts the accessory operation screen to the display state shown in FIG. 54C via the display state shown in FIG. 54B. In the display state shown in FIG. 54C, menu items (lower-layer menu item) which belong to the accessory appear in faint relief together with their icons and menu item names. The size of each of the icons and the menu items is small. In the state shown in FIG. 54C, lower-layer menu items appear in relief in the window display section 641, free from the window frames 642.

The lower-layer in this accessory operation screen includes Hand-written note, Alarm clock, World clock, Calculator, and Tutorial.

The CPU 621 places the accessory operation screen in the state shown in FIG. 54D. In the state shown in FIG. 54D, the lower-layer menu items (icons and menu items names) are gradually scaled up (zoomed in) while the display appears a little crisper.

The CPU 621 zooms in on the lower-layer menu items (icons and menu items names) as well as moves each menu item in the direction of the window frame 642. In this practice, zoom-in operation is complete and the icons 652 and the menu items names 653 are substantially crisp (see FIG. 54E).

The CPU 621 makes crisp the icons 652 and the menu items names 653 and positions lower-layer menu items on the window frames 642 starting with the top of the accessory operation screen (see FIG. 54F) and finally displays the accessory operation screen shown in FIG. 54G. In the state shown in FIG. 54G, an icon is displayed in the first display frame 642a and a menu item name is displayed in the second display frame 642b.

In the state shown in FIG. 54G, oscillating the side controller 613 moves the cursor 651 between window frames 642. Positioning the cursor 651 on a desired window frame 642, that is, a desired lower-layer menu item and pushing the side controller 613 causes the CPU 621 to activate an application program corresponding to the menu item where the cursor 651 is positioned, then makes a transition to the operation screen of the application program.

While display control of lower-layer menu items in a transition from the launcher screen as a higher-layer menu screen to the accessory operation screen as a lower-layer menu screen has been described in the above example, display control of lower-layer menu items is executed in a transition from the launcher screen to a lower-layer menu screen other than the accessory operation screen as well as a transition to the accessory operation screen, as long as the lower-layer menu screen has a plurality of lower-layer menu items.

For example, tapping on the upward or downward scroll button 635 or 636 while the accessory operation screen is displayed to position a cursor on an icon other than the icon 640 indicating the accessory causes the CPU 621 to switch over the screen display.

TO be more specific, as long as the lower-layer menu screen corresponding to the menu items in the launcher screen has a plurality of lower-layer menu items, display control of lower-layer menu items is executed as mentioned above.

In case the lower-layer menu screen corresponding to the menu items in the launcher screen does not have a plurality of lower-layer menu items, the CPU 621 promptly actives an application program corresponding to the menu item and makes a transition to the operation screen of the application program.

Menu items may be displayed in displaying the launcher screen, same as the accessory operation screen. When the third mode is selected in the launcher screen, menu items may be subjected to display control, same as the accessory operation screen, when the power is turned on.

As mentioned earlier, when the cursor is positioned on the menu item: accessory and a predetermined time has elapsed in a launcher screen, the CPU 621 executes display control of lower-menu items as described referring to FIGS. 54A through 54G. For example, in case the side controller 613 is pushed within a predetermined time, the CPU 621 may skip display control described referring to FIGS. 54A through 54G and promptly display the accessory operation screen shown in FIG. 54G on the liquid crystal panel 612.

In this way, window frames are specified in the menu screen and menu items are gradually scaled up to appear in a window frame. This enhances the visibility. The menu items are positioned in a window frame. This enhances the visibility in selection of menu items thus upgrading the operability in cursor movement.

Menu items are gradually made crisper as they are scaled up. Thus the user can enjoy the display of menu items.

In a transition to a lower-layer menu screen, when a predetermined time has elapsed, the lower-layer menu items are gradually scaled up and are displayed in a window frame as mentioned earlier. Within the predetermined time, the lower-layer items are promptly displayed in a predetermined size without scaling up. The user can selectively use display control. When the user is in a hurry, he/she can promptly display a lower-layer menu screen including lower-layer menu items in a predetermined size.

As mentioned above, according to the invention, window frames are specified in the menu screen and menu items are gradually scaled up and displayed in a window frame. This enhances the visibility and upgrades the operability in selection and activation of menu items.

Fourth Embodiment

Referring to FIG. 55, in the state where the third display mode is selected, oscillating the side controller 613 causes the CPU 621 to display windows (focus sections) 641 as well as displays on the screen the menu items along a virtual curved surface having a predetermined curvature in accordance with the position of the windows 641.

For example, assume that Mail, Browser, Address book, Schedule, Memo pad, File viewer, Accessory, and System as well as other applications A and B are provided as menu items and the items are displayed in the order of Mail, Browser, Address book, Schedule, Memo pad, File viewer, Accessory, System, and other applications A and B from the top in the window display section 634, and seven menu items are displayed in the window display section 634. Assume that the window (cursor) is positioned in location the menu item: mail is positioned (the window 641 is displayed in the uppermost position of the window display section 634).

In this case, the CPU 621 specifies, in the first step, virtual curved surface extending at a predetermined curvature from the surface of the screen to the rear side (innermost area) in the window display section 634 with its lowermost opposition being the start point, then displays the menu item: Application B which is most distant from the mail in the lower area of the window display section 634 and sequentially displays Application A, Setting, System, Accessory, File viewer in the upward direction along the virtual curved surface.

As mentioned earlier, the virtual curved surface extends at a predetermined curvature from the surface of the screen to the rear side in the window display section 634 with its lowermost opposition being the start point, so that Application B is appears largest and the display size of a menu item is sequentially reduced in the upward direction in the screen.

Figure 56:
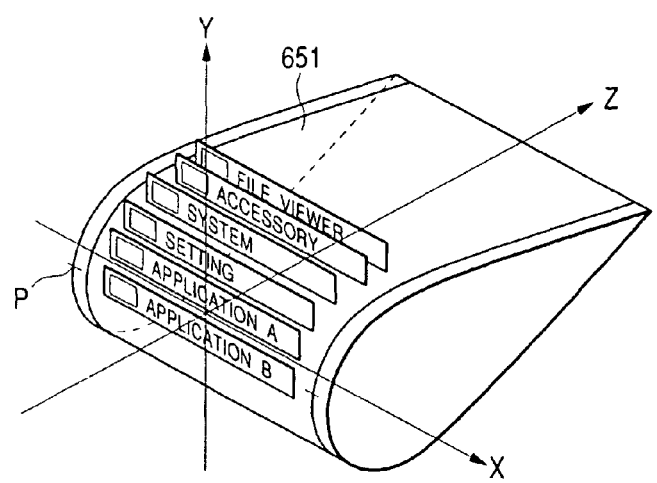
FIG. 56 shows one example of an arrangement relationship between a virtual curved surface and menu items.

For example, as shown in FIG. 56, along the surface of the virtual curved surface 651, menu items (Mail, Browser, Address book, Schedule, Memo pad, File viewer, Accessory, System, and Setting) are arranged in predetermined intervals and the virtual curved surface 651 is rotated about the X axis. As a result, the menu item in the lowermost position (start point P) in the window display section 634 appears largest. The display size of a menu item is sequentially reduced in the upward direction in the screen.

File Viewer appears smallest on the screen and the menu items above File Viewer are hidden and are not displayed on the screen. In the example shown, this virtual curved surface has a curvature to allow six menu items to be displayed on the screen.

The above menu items moves on the virtual curved surface from top to bottom. In the second step shown in FIG. 55B, the menu item: System is in the lowermost position. In this state, the menu items System, Accessory, file viewer, Memo pad, and Schedule are displayed from the bottom in the window display section 634.

In the third step, the CPU 621 puts up the virtual curved surface toward the screen surface with respect to the start point mentioned earlier. The CPU 621 performs as if to reduce the curvature of the virtual curved surface and put up the virtual curved surface toward the screen surface. As a result, as shown in FIG. 55C, the menu items above Schedule (Address book, Browser and Mail) are displayed in the window display section 634.

In this practice, the virtual curved surface is gradually put up. Menu items in the upper area of the window display section 634 gradually increases their sizes and appear in the state shown in FIG. 55D. As the display size becomes larger, the menu items may be gradually displayed in a darker color.

In this way, the CPU 621 gradually decreases the curvature of the virtual curved surface and performs as if to put up the virtual curved surface toward the surface of the screen with respect to the start point, and finally reduces the curvature of the virtual curved surface to zero. That is, the virtual curved surface becomes a plane. As a result, in the fifth through eighth steps, as shown in FIGS. 55E through 55H, a menu item displayed in the upper area of the screen (for example Mail) changes its display position and increases its size as the virtual curved surface is put up. When the curvature of the virtual curved surface becomes zero, that is, when the virtual curved surface finally becomes a plane, the menu item: Mail is positioned in the window section 641, as shown in FIG. 53C.

Then, oscillating the side controller 613 moves the windows 641 to move in the vertical direction. A push on the side controller 613 activates an application program corresponding to the menu item where the window 641 is positioned.

While the window 641 is in the position of the menu item: Mail in the foregoing example, that is, the window 641 is displayed in the uppermost position of the window display section 634, the window 641 may be displayed in the position another menu item is finally located.

In this case also, the position most distant from the window 641 in the window display section 643 is assumed as a start point and a virtual curved surface is formed. As mentioned above, the curvature of the virtual curved surface is gradually reduced and the virtual curved surface is gradually put up toward the surface of the screen, until the curvature of the virtual curved surface reaches zero, meaning that the virtual curved surface is a plane.

As shown in FIG. 53A or 53B, when menu items are displayed quasi-third-dimensionally, oscillating the side controller 613 may perform the display control mentioned above and enter the state shown in FIG. 53C.

The CPU 621 may perform the display control mentioned above in case the frequency of scroll operation is monitored and the frequency is below a predetermined value.

In this way, a predetermined point is assumed as a start point, and when a scroll operation is made, the menu items are gradually scaled up toward the start point on the surface of the screen from the innermost area of the screen. This enhances the visibility.

The start point is position on the surface of the screen and a virtual curved surface having a predetermined curvature is specified from the surface of the screen to the innermost area of the screen. When a scroll operation is made, menu items are moved along the surface of virtual curved surface and the curvature of the virtual curved surface is reduced with the scroll operation until the curvature of the virtual curved surface reaches zero, meaning that the virtual curved surface is a virtual plane. This gives the user a joy of providing screen display.

While menu items as a plurality of items are arranged in a virtual plane in the example, the invention is not limited thereto. For example, a configuration is allowed where, a plurality of items are displayed in a predetermined size and, on a scroll operation, at least part of the plurality of items are gradually scaled up from a size smaller than the predetermined size to the predetermined size, or scaled up in stages and displayed, or scaled up to the predetermined size and displayed.

In this case, all items displayed on the screen may be uniformly scaled up or zoomed in each time a scroll operation is made.

This gives the user an image where all items show up against the innermost area of the screen each time a scroll operation is made, thus providing various on-screen representations.

Only part of all the items may be scaled up or zoomed in each time a scroll operation is made. In this case, for the items in the direction opposite to the scroll direction, for example a single item or approximately half of all the items, or an arbitrary number of items may be subjected to scale-up or zoom-in display.

This gives the user an image where an item shows up against the innermost area of the screen each time a scroll operation is made, thus providing various on-screen representations.

While the upward/downward scroll is shown in the embodiments, a rightward/leftward scroll or a scroll of another form may be used.

The items displayed on the screen may be subjected to different scale-up display or zoom-in display depending on the scroll direction. In this case, for an upward/downward scroll, as an item is displayed in a higher position on the screen, magnification for scale-up/zoom-in display may be higher while an item in the lower area of the screen may be subjected to scale-up/zoom-in display with smaller magnification, or may be displayed in the original size. In this case, for example, for a rightward/leftward scroll, an item closer to the right/left edge of the screen may be subjected to a higher magnification and an item in the center of the screen may be subjected to a lower magnification or displayed in the original size.

This gives the user an image where only the items in the upper/lower area of the screen show up against the innermost area of the screen or only the items in a specific position (for example center) of the screen show up against the innermost area of the screen, each time a scroll operation is made, thus providing various on-screen representations.

A configuration is allowed where a plurality of items are arranged in a virtual space and an image of the plurality of items reflected on a predetermined plane is displayed, and the above-mentioned scale-up or zoom-in display is provided by moving the items in the virtual space closer to the predetermined plane.

This gives the user an image where the items show up against the innermost area of the screen in a more real fashion than display by way of changing the size of the character fonts used for the items to be displayed.

A configuration is allowed where a plurality of items are arranged in a virtual space and an image of the plurality of items is shot with a virtual camera arranged in the same virtual space and then the above-mentioned scale-up or zoom-in display is provided by moving the items in the virtual space closer to the virtual camera, moving the virtual camera in the virtual space closer to the items, or moving the items and the virtual camera closer to each other in the virtual space. This gives the user an image where the items show up against the innermost area of the screen in a more real fashion than the above-mentioned projected image.

Arrangement of items or a camera in a virtual space, or shooting with a virtual camera may be executed by way of calculation processing by the CPU and memory in a portable information terminal, or may be calculated on other device and only the resulting image data may be displayed on the portable information terminal.

While scale-up display or zoom-in display is provided each time a scroll is made in the above example, the invention is not limited thereto.

Another embodiment is allowed where functional buttons for scroll operation are displayed on the screen. For example, see the scroll button in FIG. 55. While only the down-scroll button is shown in the figure, an up-scroll button should be displayed also if scroll is available in both upward and downward directions, same as the launcher screen in FIG. 53.

In an operation using the scroll button, the above scale-up or zoom-in display the above scale-up or zoom-in display may be provided in a scroll on a separate operation unit such as a side controller, without using the above scale-up or zoom-in display while the scroll button is operated.

With such a configuration, the user can selectively operate a scroll which accompanies the scale-up or zoom-in display, or a simple scroll. When wishing to quickly scroll through items, the user may instruct a simple scroll. When wishing to enjoy various screens while operating, the user may instruct a scroll accompanied by scale-up or zoom-in display, thus enhancing the operability.

Another embodiment is allowed where it is monitored whether scroll operations are successively performed in a predetermined time, instead of the monitoring of the frequency of scroll by way of a side controller by the CPU 621, and in case scroll operations are not successively performed in the predetermined time, the above scale-up or zoom-in display (hereinafter simply referred to as display control) may be performed.

Whether the above scale-up or zoom-in display is to be performed is selected from the result of the monitor of the frequency or successive operations. When wishing to quickly scroll through items, the user may perform scroll display. Otherwise, the user may perform the above display control, thus enhancing the operability.

The above display control may be performed, only in case a plurality of items are scrolled, and a cursor is positioned on the item at the end of the list, or the item at the end of the list is displayed on the screen. In this case, for example, in the example of FIG. 55, the item at the upper end of the list is an item of Schedule. FIG. 55 does not illustrate the lowermost item. In case the lowermost item is displayed on the screen, the lowermost item is subjected to display control, unlike FIG. 55 where the uppermost item is subjected to display control such as scale-up display and zoom-in display.

With this configuration, the user can recognize that a scroll is performed up to the item at the end of the list of items, from display control such as scale-up display and zoom-in display, thus enhancing operability.

In FIG. 55, the screen displays menu items as a plurality of items, for example, Schedule, Browse, Address book, and Schedule, as well as icons corresponding to the menu items to the left of these menu items. For these icons, various display control mentioned above will be performed as well as handling of items.

As mentioned hereabove, according to the invention, a predetermined point on the screen is assumed as a start point, and when a scroll operation is made, the menu items are gradually scaled up toward the start point on the surface of the screen from the innermost area of the screen. This enhances the visibility and operability in selection and activation of a menu item.

What is claimed is:

1. A display control device for performing display control of a display section, said display control device comprising:
   mode setting means for setting either one of a first display mode and a second display mode;
   virtual space setting means for setting a virtual space in the display section;
   orbit setting means for setting an orbit in said virtual space;
   display entity arrangement means for arranging a plurality of information display entities at least in a column on the orbit in the first display mode;
   first display means for displaying the plurality of information display entities in said virtual space in the display section in accordance with the first display mode;
   second display means for displaying the plurality of information display entities in a plane manner in the display section in accordance with the second display mode;
   input means; and
   control means responsive to the input means for controlling movement of the plurality of information display entities along the orbit in the virtual space in the first display mode,
   wherein, for each information display entity of the plurality of information display entities being displayed at a predetermined position in the display section, the control means enables said information display entity displayed at said predetermined position to activate an application corresponding to said information display entity displayed at said predetermined position in response to an input command from the input means,
   wherein a location of the predetermined position is based on the display mode, either the first display mode or the second display mode, and
   wherein in one of the first display mode and the second display mode, the predetermined position is fixed at a first display location and is changed from the first display location to a second display location only when said second display location is associated with an endmost information display entity of the plurality of information display entities, said first and second display locations being different, in response to an input command from the input means.

2. A display control device according to claim 1, further comprising a transparency setting means for setting a transparency of each of the plurality of information display entities.

3. A display control device according to claim 2, wherein the transparency setting means controls the transparency of each of the plurality of information display entities to make a transparency of at least one information display entity different from a transparency of each of the other plurality of information display entities so that said at least one information display entity is displayed differently from the other information display entities.

4. A display control device according to claim 2, wherein said transparency setting means sets the transparency of each of the information display entities in accordance with a display position of the plurality of information display entities.

5. A display control device according to claim 4, wherein said transparency setting means increase a transparency of an information display entity which is positioned back from a predetermined position.

6. A display control device according to claim 5, wherein display faces of the information display entities are parallel with each other.

7. A display control device according to claim 5, wherein the information display entities indicate menu information display.

8. The display control device according to claim 1, further comprising display change means for displaying at least one information display entity of the plurality of information display entities differently from other information display entities displayed on the orbit in the display section of said display control device,
   wherein said display change means changes the at least one information display entity to be displayed differently from other information display entities in accordance with the movement of the plurality of information display entities under the control of the control means.

9. A display control device according to claim 8,
   wherein said display change means limits a display of a part of each of the information display entities other than an information display entity displayed at the forefront.

10. The display control device according to claim 1,
    wherein at least one of said plurality of information display entities is representative of a plurality of other information display entities, and
    wherein a spacing between adjacent information display entities of said plurality of information display entities is varied within said virtual space.

11. The display control device according to claim 1,
    wherein the input means is configured to further input a scroll velocity, and
    wherein said control means gradually accelerates the movement of the plurality of information display entities if the scroll velocity of said input means exceeds a predetermined velocity.

12. The display control device according to claim 1,
wherein the predetermined position corresponds to a frontmost position in the virtual space.

13. The display control device according to claim 1,
wherein at least one of the information display entities indicates a folder.

14. A display control device for performing display control of a display section having a virtual space, said display control device comprising:
mode setting means for setting either one of a first display mode and a second display mode;
orbit setting means for setting an orbit having a rotation axis and defined as an arbitrary line in the virtual space, the arbitrary line being a locus of an arbitrary curve obtained when said arbitrary curve orthogonal to the rotation axis moves in parallel with said rotation axis;
display entity arrangement means for arranging a plurality of information display entities at least in a column on the orbit in the first display mode;
first display means for displaying the plurality of information display entities on the orbit in the virtual space in the display section in accordance with the first display mode;
second display means for displaying the plurality of information display entities in a plane manner in the display section in accordance with the second display mode;
input means for inputting a scroll direction and a scroll velocity; and
control means responsive to the input means for controlling the movement of the plurality of information display entities along the orbit in the virtual space in the first display mode,
wherein, for each information display entity of the plurality of information display entities being displayed at a predetermined position in the display section, the control means enables said information display entity displayed at said predetermined position to activate an application corresponding to said information display entity displayed at said predetermined position in response to an input command from the input means,
wherein a location of the predetermined position is based on the display mode, either the first display mode or the second display mode, and
wherein in one of the first display mode and the second display mode, the predetermined position is fixed at a first display location and is changed from the first display location to a second display location only when said second display location is associated with an endmost information display entity of the plurality of information display entities, said first and second display locations being different, in response to an input command from the input means.

15. A display control device according to claim 14, further comprising a transparency setting means for setting a transparency of each of the plurality of information display entities.

16. A display control device according to claim 15, wherein the transparency setting means controls the transparency of each of the plurality of information display entities to make a transparency of at least one information display entity different from a transparency of each of the other plurality of information display entities so that said at least one information display entity is displayed differently from the other information display entities.

17. A display control device according to claim 15, wherein said transparency setting means sets the transparency of each of the information display entities in accordance with a display position of the plurality of information display entities.

18. A display control device according to claim 17, wherein said transparency setting means increase a transparency of an information display entity which is positioned back from a predetermined position.

19. A display control device according to claim 18, wherein display faces of the information display entities are parallel with each other.

20. A display control device according to claim 18, wherein the information display entities indicate menu information display.

21. The display control device according to claim 14, further comprising display change means for displaying at least one information display entity of the plurality of information display entities differently from other information display entities displayed on the orbit in the display section of said display control device,
wherein said display change means changes the at least one information display entity to be displayed differently from other information display entities in accordance with the movement of the plurality of information display entities under the control of the control means.

22. A display control device according to claim 21,
wherein said display change means limits a display of a part of each of the information display entities other than an information display entity displayed at the forefront.

23. A display control method for controlling a display section, said display control method comprising the steps of:
setting either one of a first display mode and a second display mode;
when the first display mode is set, setting a virtual space;
setting an orbit in said virtual space;
arranging a plurality of information display entities at least in a column on the orbit;
displaying the plurality of information display entities in said virtual space in the display section;
inputting a scroll direction; and
controlling the movement of said plurality of information entities along the orbit in the virtual space in response to the input scroll direction,
wherein, for each information display entity of the plurality of information display entities being displayed at a predetermined position in the display section, enabling said information display entity displayed at said predetermined position to activate an application corresponding to said information display entity displayed at said predetermined position in response to an input command,
wherein a location of the predetermined position is based on the display mode, either the first display mode or the second display mode,
wherein when the second display mode is set, displaying the plurality of information display entities in a plane manner on the display section, and
wherein in one of the first display mode and the second display mode, the predetermined position is fixed at a first display location and is changed from the first display location to a second display location only when said second display location is associated with an endmost information display entity of the plurality of information display entities, said first and second display locations being different, in response to an input command.

24. The display control method according to claim 23, comprising the further step of displaying at least one information display entity of the plurality of information display entities differently from other information display entities displayed on the orbit in the display section, wherein said at least one information display entity to be displayed differently from other information display entities is changed in accordance with the movement of the plurality of information display entities along the orbit in the virtual space.

25. The display control method according to claim 23, wherein the predetermined position corresponds to a frontmost position in the virtual space.

26. The display control method according to claim 23, wherein at least one of the information display entities indicates a folder.

27. A display control method for controlling a display section having a virtual space, said display control method comprising:
 setting either one of a first display mode and a second display mode;
 when the first display mode is set; setting an orbit having a rotation axis and defined as an arbitrary line in the virtual space, the arbitrary line being a locus of an arbitrary curve orthogonal to said rotation axis obtained when said arbitrary curve orthogonal to the rotation axis moves in parallel with said rotation axis;
 arranging a plurality of information display entities at least in a column on the orbit;
 displaying the plurality of information display entities in said virtual space in the display section;
 inputting a scroll direction; and
 controlling movement of said plurality of information entities along the orbit in the virtual space,
 wherein, for each information display entity of the plurality of information display entities being displayed at a predetermined position in the display section, enabling said information display entity displayed at said predetermined position to activate an application corresponding to said information display entity displayed at said predetermined position in response to an input command,
 wherein a location of the predetermined position is based on the display mode, either the first display mode or the second display mode, and
 when the second display mode is set, displaying the plurality of information display entities in a plane manner on the display section, and
 wherein in one of the first display mode and the second display mode, the predetermined position is fixed at a first display location and is changed from the first display location to a second display location only when said second display location is associated with an endmost information display entity of the plurality of information display entities, said first and second display locations being different, in response to input command.

28. The display control method according to claim 27, comprising the further step of displaying at least one information display entity of the plurality of information display entities differently from other information display entities displayed on the orbit in the display section,
 wherein the at least one information display entity to be displayed differently from other information display entities is changed in accordance with the movement of the plurality of information display entities along the orbit in the virtual space.

29. A display control program stored on a non-transitory computer readable storage medium and used for controlling a display section, said program comprising program instructions that when executed, perform the steps of:
 setting either one of a first display mode and a second display mode;
 when the first display mode is set, setting a virtual space;
 setting an orbit in said virtual space;
 arranging a plurality of information display entities at least in a column on the orbit;
 displaying the plurality of information display entities in said virtual space in the display section;
 inputting a scroll direction; and
 controlling movement of said plurality of information entities along the orbit in the virtual space in response to the input scroll direction,
 wherein, for each information display entity of the plurality of information display entities being displayed at a predetermined position in the display section, enabling said information display entity displayed at said predetermined position to activate an application corresponding to said information display entity displayed at said predetermined position in response to an input command,
 wherein a location of the predetermined position is based on the display mode, either the first display mode or the second display mode,
 when the second display mode is set, displaying the plurality of information display entities in a plane manner on the display section, and
 wherein in one of the first display mode and the second display mode, the predetermined position is fixed at a first display location and is changed from the first display location to a second display location only when said second display location is associated with an endmost information display entity of the plurality of information display entities, said first and second display locations being different, in response to an input command.

30. The display control program according to claim 29, comprising the further step of displaying at least one information display entity of the plurality of information display entities differently from other information display entities displayed on the orbit in the display section,
 wherein the at least one information display entity to be displayed differently from other information display entities is changed in accordance with the movement of the plurality of information display along the orbit in the virtual space.

31. A display control program stored on a non-transitory computer readable storage medium and used for controlling a display section having a virtual space, said program comprising program instructions that when executed, perform the steps of:
 setting either one of a first display mode and a second display mode;
 when the first display mode is set, setting an orbit having a rotation axis and defined as an arbitrary line in the virtual space, the arbitrary line being a locus of an arbitrary curve orthogonal to said rotation axis obtained when said arbitrary curve orthogonal to the rotation axis moves in parallel with said rotation axis;
 arranging a plurality of information display entities at least in a column on the orbit;
 displaying the plurality of information display entities in said virtual space in the display section;
 inputting a scroll direction; and
 controlling movement of said plurality of information entities along the orbit in the virtual space,
 wherein, for each information display entity of the plurality of information display entities being displayed at a predetermined position in the display section, enabling said information display entity displayed at said predetermined position to activate an application corresponding to said information display entity displayed at said predetermined position in response to an input command, wherein a location of the predetermined position is based on the display mode, either the first display mode or the second display mode, wherein when the second display mode is set, displaying the plurality of information display entities in a plane manner on the display section, and wherein in one of the first display mode and the second display mode, the predetermined position is fixed at a first display location and is changed from the first display location to a second display location only when said second display location is associated with an endmost information display entity of the plurality of information display entities, said first and second display locations being different, in response to an input command.

32. The display control program according to claim 31, comprising the further step of displaying at least one information display entity of the plurality of information display entities differently from other information display entities displayed on the orbit in the display section, wherein the at least one information display entity to be displayed differently from other information display entities is changed in accordance with the movement of the plurality of information display entities along the orbit in the virtual space.

33. A display control device comprising:
a processor;
a display mode switching unit configured to switch between a virtual space display mode and a plane display mode;
an input unit which receives a command;
a display controller configured to display a plurality of information display entities on a display to move according to a command input to the input unit; and
a controller configured to enable each information display entity of the plurality of information display entities being displayed at a predetermined position in the display to activate an application corresponding to said information display entity displayed at said predetermined position in response to a command input to the input unit command, wherein a location of the predetermined position is based on the display mode, either the virtual space display mode or the plane display mode, wherein in the virtual space display mode, the display controller sets a virtual space in the display and arranges the information display entities along an orbit set in the virtual space in the virtual space display mode, wherein when it is switched from the virtual space display mode to the plane display mode, the display controller controls the display so that the plurality of information display entities displayed along the orbit in the virtual space are arranged into a plane manner, and wherein in one of the virtual space display mode and the plane display mode, the predetermined position is fixed at a first display location and is changed from the first display location to a second display location only when said second display location is associated with an endmost information display entity of the plurality of information display entities, said first and second display locations being different, in response to an input command.

34. The display control device according to claim 33, wherein the predetermined position corresponds to a frontmost position in the virtual space.

35. The display control device according to claim 33, wherein at least one of the information display entities indicates a folder.

* * * * *